US010216271B2

(12) United States Patent
Itani

(10) Patent No.: US 10,216,271 B2
(45) Date of Patent: Feb. 26, 2019

(54) METHOD AND APPARATUS FOR INDEPENDENT CONTROL OF FOCAL VERGENCE AND EMPHASIS OF DISPLAYED AND TRANSMITTED OPTICAL CONTENT

(71) Applicant: Atheer, Inc., Mountain View, CA (US)

(72) Inventor: Sleiman Itani, East Palo Alto, CA (US)

(73) Assignee: Atheer, Inc., Santa Clara, CA (US)

( * ) Notice: Subject to any disclaimer, the term of this patent is extended or adjusted under 35 U.S.C. 154(b) by 80 days.

(21) Appl. No.: 15/430,877

(22) Filed: Feb. 13, 2017

(65) Prior Publication Data

US 2017/0168307 A1    Jun. 15, 2017

Related U.S. Application Data

(63) Continuation-in-part of application No. 14/278,322, filed on May 15, 2014, now Pat. No. 9,606,359.

(51) Int. Cl.
*G02B 7/28* (2006.01)
*G06F 3/01* (2006.01)
*G09G 3/00* (2006.01)
*G02B 27/01* (2006.01)

(52) U.S. Cl.
CPC ............ *G06F 3/013* (2013.01); *G02B 7/287* (2013.01); *G02B 27/0172* (2013.01); *G06F 3/011* (2013.01); *G06F 3/017* (2013.01); *G09G 3/003* (2013.01); *G02B 2027/0127* (2013.01); *G02B 2027/0132* (2013.01);
(Continued)

(58) Field of Classification Search
CPC  G02B 27/0179; G02B 7/287; G02B 27/0172; G02B 2027/0185; G02B 2027/0178; G02B 2027/0118; G06F 3/011; G06F 3/017; G06F 3/013; G09G 3/003; G09G 2354/00
USPC ......................... 359/466, 467, 475, 476, 477
See application file for complete search history.

(56) References Cited

U.S. PATENT DOCUMENTS

2002/0190923 A1    12/2002    Ronzani et al.
2003/0071765 A1    4/2003    Suyama et al.

OTHER PUBLICATIONS

Co-pending U.S. Appl. No. 14/278,322 by Itani, S., filed May 15, 2014.
(Continued)

*Primary Examiner* — Jade R Chwasz
(74) *Attorney, Agent, or Firm* — Mohr Intellectual Property Law Solutions, P.C.

(57) ABSTRACT

A first optic adjusts the focus of environment content in independent regions, and delivers the environment content to a see-through display. The display adds display content, and delivers environment and display content to a second optic. The second optic adjusts the focus of the environment and display contents in independent regions, and delivers the environment and display contents to a viewing point. The focuses of the environment and display contents are adjustable independently of one another and in different regions. Environment content may be similar in focus before and after passing through the first and second optics. Display content may be similar in focus to environment content after the display content passes through the second optic. A modifier also may darken, change opacity, or otherwise modify the environment content, independently in different regions; the display also may brighten, enlarge, or otherwise alter the display content, independently in different regions.

28 Claims, 32 Drawing Sheets

(52) U.S. Cl.
CPC ................ *G02B 2027/0134* (2013.01); *G02B 2027/0178* (2013.01); *G09G 2354/00* (2013.01)

(56) References Cited

OTHER PUBLICATIONS

Restriction Requirement dated Oct. 29, 2014, for Co-Pending U.S. Appl. No. 14/278,322 by Itani, S., filed May 15, 2014.
Non-Final Office Action dated Jan. 20, 2015, for Co-Pending U.S. Appl. No. 14/278,322 by Itani, S., filed May 15, 2014.
Final Office Action dated Aug. 12, 2015, for Co-Pending U.S. Appl. No. 14/278,322 by Itani, S., filed May 15, 2014.
Non-Final Office Action dated Mar. 24, 2016, for Co-Pending U.S. Appl. No. 14/278,322 by Itani, S., filed May 15, 2014.
Notice of Allowance dated Nov. 14, 2016, for Co-Pending U.S. Appl. No. 14/278,322 by Itani, S., filed May 15, 2014.

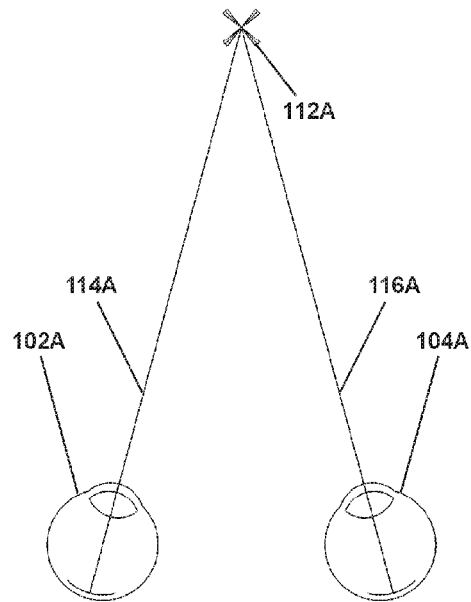
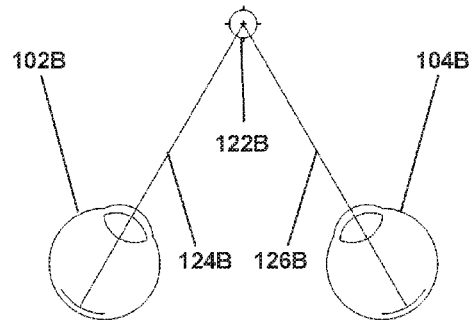
FIG. 1A
FIG. 1B
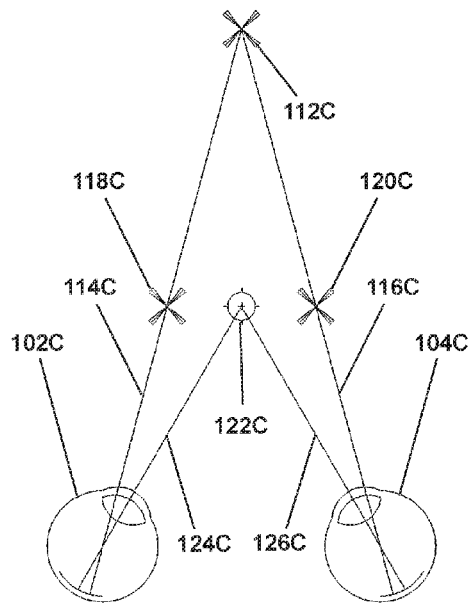
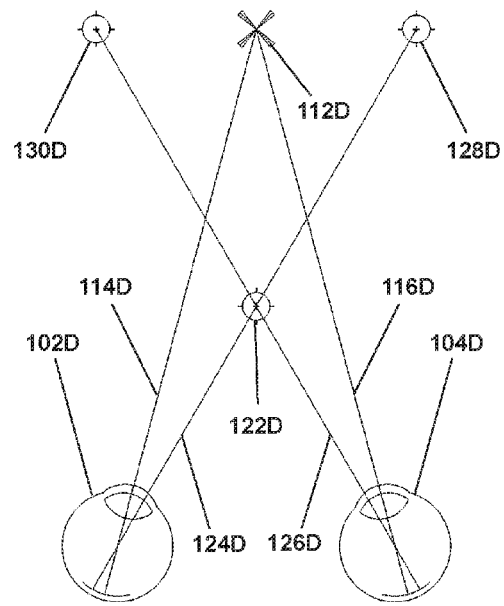
FIG. 1C
FIG. 1D

| 1152C-14 | 1152C-24 | 1152C-34 | 1152C-44 | 1152C-54 | 1152C-64 |
|---|---|---|---|---|---|
| 1152C-13 | 1152C-23 | 1152C-33 | 1152C-43 | 1152C-53 | 1152C-63 |
| 1152C-12 | 1152C-22 | 1152C-32 | 1152C-42 | 1152C-52 | 1152C-62 |
| 1152C-11 | 1152C-21 | 1152C-31 | 1152C-41 | 1152C-51 | 1152C-61 |

| 1252A-14 $F_1$ | 1252A-24 $F_1$ | 1252A-34 $F_1$ | 1252A-44 $F_1$ | 1252D-54 $F_1$ | 1252D-64 $F_1$ |
|---|---|---|---|---|---|
| 1252A-13 $F_1$ | 1252A-23 $F_1$ | 1252A-33 $F_1$ | 1252A-43 $F_1$ | 1252A-53 $F_1$ | 1252A-63 $F_1$ |
| 1252A-12 $F_1$ | 1252A-22 $F_1$ | 1252A-32 $F_1$ | 1252A-42 $F_1$ | 1252A-52 $F_1$ | 1252A-62 $F_1$ |
| 1252A-11 $F_1$ | 1252A-21 $F_1$ | 1252A-31 $F_1$ | 1252A-41 $F_1$ | 1252A-51 $F_1$ | 1252A-61 $F_1$ |

| 1252D-14 | 1252D-24 | 1252D-34 | 1252D-44 $F_2$ | 1252D-54 $F_2$ | 1252D-64 $F_2$ |
|---|---|---|---|---|---|
| 1252D-13 | 1252D-23 | 1252D-33 | 1252D-43 $F_2$ | 1252D-53 $F_1$ | 1252D-63 $F_2$ |
| 1252D-12 | 1252D-22 | 1252D-32 | 1252D-42 $F_2$ | 1252D-52 $F_2$ | 1252D-62 $F_2$ |
| 1252D-11 | 1252D-21 | 1252D-31 | 1252D-41 | 1252D-51 | 1252D-61 |

| 1252E-14 $F_{14}$ | 1252E-24 $F_{24}$ | 1252E-34 $F_{34}$ | 1252E-44 $F_{44}$ | 1252E-54 $F_{54}$ | 1252E-64 $F_{64}$ |
|---|---|---|---|---|---|
| 1252E-13 $F_{13}$ | 1252E-23 $F_{23}$ | 1252E-33 $F_{33}$ | 1252E-43 $F_{43}$ | 1252E-53 $F_{53}$ | 1252E-63 $F_{63}$ |
| 1252E-12 $F_{12}$ | 1252E-22 $F_{22}$ | 1252E-32 $F_{32}$ | 1252E-42 $F_{42}$ | 1252E-52 $F_{52}$ | 1252E-62 $F_{62}$ |
| 1252E-11 $F_{11}$ | 1252E-21 $F_{21}$ | 1252E-31 $F_{31}$ | 1252E-41 $F_{41}$ | 1252E-51 $F_{51}$ | 1252E-61 $F_{61}$ |

FIG. 12E

| 1452A-14 | 1452A-24 | 1452A-34 | 1452A-44 | 1452A-54 | 1452A-64 |
|---|---|---|---|---|---|
| 1452A-13 | 1452A-23 | 1452A-33 | 1452A-43 | 1452A-53 $M_1$ | 1452A-63 |
| 1452A-12 | 1452A-22 | 1452A-32 | 1452A-42 | 1452A-52 | 1452A-62 |
| 1452A-11 | 1452A-21 | 1452A-31 | 1452A-41 | 1452A-51 | 1452A-61 |

| 1452B-14 | 1452B-24 | 1452B-34 | 1452B-44 $M_2$ | 1452B-54 $M_2$ | 1452B-64 $M_2$ |
|---|---|---|---|---|---|
| 1452B-13 | 1452B-23 | 1452B-33 | 1452B-43 $M_2$ | 1452B-53 $M_1$ | 1452B-63 $M_2$ |
| 1452B-12 | 1452B-22 | 1452B-32 | 1452B-42 $M_2$ | 1452B-52 $M_2$ | 1452B-62 $M_2$ |
| 1452B-11 | 1452B-21 | 1452B-31 | 1452B-41 | 1452B-51 | 1452B-61 |

| 1452C-14 $M_1$ | 1452C-24 $M_1$ | 1452C-34 $M_1$ | 1452C-44 $M_1$ | 1452C-54 $M_1$ | 1452C-64 $M_1$ |
|---|---|---|---|---|---|
| 1452C-13 $M_2$ | 1452C-23 $M_2$ | 1452C-33 $M_2$ | 1452C-43 $M_2$ | 1452C-53 $M_1$ | 1452C-63 $M_2$ |
| 1452C-12 | 1452C-22 | 1452C-32 | 1452C-42 | 1452C-52 | 1452C-62 |
| 1452C-11 | 1452C-21 | 1452C-31 | 1452C-41 | 1452C-51 | 1452C-61 |

| 1452D-14 $M_{14}$ | 1452D-24 $M_{24}$ | 1452D-34 $M_{34}$ | 1452D-44 $M_{44}$ | 1452D-54 $M_{54}$ | 1452D-64 $M_{64}$ |
|---|---|---|---|---|---|
| 1452D-13 $M_{13}$ | 1452D-23 $M_{23}$ | 1452D-33 $M_{33}$ | 1452D-43 $M_{43}$ | 1452D-53 $M_{53}$ | 1452D-63 $M_{63}$ |
| 1452D-12 $M_{12}$ | 1452D-22 $M_{22}$ | 1452D-32 $M_{32}$ | 1452D-42 $M_{42}$ | 1452D-52 $M_{52}$ | 1452D-62 $M_{62}$ |
| 1452D-11 $M_{11}$ | 1452D-21 $M_{21}$ | 1452D-31 $M_{31}$ | 1452D-41 $M_{41}$ | 1452D-51 $M_{51}$ | 1452D-61 $M_{61}$ |

| 1652A-14 | 1652A-24 | 1652A-34 | 1652A-44 | 1652A-54 | 1652A-64 |
|---|---|---|---|---|---|
| 1652A-13 | 1652A-23 | 1652A-33 | 1652A-43 | 1652A-53 $A_1$ | 1652A-63 |
| 1652A-12 | 1652A-22 | 1652A-32 | 1652A-42 | 1652A-52 | 1652A-62 |
| 1652A-11 | 1652A-21 | 1652A-31 | 1652A-41 | 1652A-51 | 1652A-61 |

| 1652B-14 | 1652B-24 | 1652B-34 | 1652B-44 $A_2$ | 1652B-54 $A_2$ | 1652B-64 $A_2$ |
|---|---|---|---|---|---|
| 1652B-13 | 1652B-23 | 1652B-33 | 1652B-43 $A_2$ | 1652B-53 $A_1$ | 1652B-63 $A_2$ |
| 1652B-12 | 1652B-22 | 1652B-32 | 1652B-42 $A_2$ | 1652B-52 $A_2$ | 1652B-62 $A_2$ |
| 1652B-11 | 1652B-21 | 1652B-31 | 1652B-41 | 1652B-51 | 1652B-61 |

FIG. 16B

| 1652C-14 | 1652C-24 $A_2$ | 1652C-34 $A_1$ | 1652C-44 $A_1$ | 1652C-54 $A_2$ | 1652C-64 |
|---|---|---|---|---|---|
| 1652C-13 | 1652C-23 $A_2$ | 1652C-33 $A_1$ | 1652C-43 $A_1$ | 1652C-53 $A_2$ | 1652C-63 |
| 1652C-12 | 1652C-22 $A_2$ | 1652C-32 $A_1$ | 1652C-42 $A_1$ | 1652C-52 $A_2$ | 1652C-62 |
| 1652C-11 | 1652C-21 $A_2$ | 1652C-31 $A_1$ | 1652C-41 $A_1$ | 1652C-51 $A_2$ | 1652C-61 |

| 1652D-14 $M_{14}$ | 1652D-24 $M_{24}$ | 1652D-34 $M_{34}$ | 1652D-44 $M_{44}$ | 1652D-54 $M_{54}$ | 1652D-64 $M_{64}$ |
|---|---|---|---|---|---|
| 1652D-13 $M_{13}$ | 1652D-23 $M_{23}$ | 1652D-33 $M_{33}$ | 1652D-43 $M_{43}$ | 1652D-53 $M_{53}$ | 1652D-63 $M_{63}$ |
| 1652D-12 $M_{12}$ | 1652D-22 $M_{22}$ | 1652D-32 $M_{32}$ | 1652D-42 $M_{42}$ | 1652D-52 $M_{52}$ | 1652D-62 $M_{62}$ |
| 1652D-11 $M_{11}$ | 1652D-21 $M_{21}$ | 1652D-31 $M_{31}$ | 1652D-41 $M_{41}$ | 1652D-51 $M_{51}$ | 1652D-61 $M_{61}$ |

| 1852-14 $M_1$ | 1852-24 $M_1$ | 1852-34 $M_1$ | 1852-44 $M_1$ | 1852-54 $M_1$ | 1852-64 $F_2 M_1 A_2$ |
|---|---|---|---|---|---|
| 1852-13 $F_1 A_1$ | 1852-23 | 1852-33 | 1852-43 | 1852-53 | 1852-63 $F_3 M_2 A_3$ |
| 1852-12 | 1852-22 | 1852-32 | 1852-42 | 1852-52 | 1852-62 $F_4 M_2 A_3$ |
| 1852-11 | 1852-21 | 1852-31 | 1852-41 | 1852-51 | 1852-61 $F_5 M_2 A_3$ |

METHOD AND APPARATUS FOR INDEPENDENT CONTROL OF FOCAL VERGENCE AND EMPHASIS OF DISPLAYED AND TRANSMITTED OPTICAL CONTENT

CLAIM OF PRIORITY

This application is a continuation-in-part of U.S. application Ser. No. 14/278,322 filed May 15, 2014, the contents of which is incorporated by reference for all intents and purposes.

FIELD OF THE INVENTION

The present invention relates to the spatially variable control of optical content, such as focal vergence, display alteration, and background modification. More particularly, the present invention relates to controlling the focal vergence of content generated by and/or transmitted through a display system, without necessarily applying the same changes in focal vergence to both the generated and transmitted optical content; in so controlling focal vergence independently in different regions; and likewise controlling display alterations and/or background modifications independently in different regions.

DESCRIPTION OF RELATED ART

A variety of devices may deliver some form of generated optical content. Such content typically has some degree of focal vergence (e.g. convergent, divergent, parallel) such that content generated and/or displayed exhibits a focus that corresponds to some depth or distance from the viewer. For example, augmented reality content might be generated with a focal vergence corresponding to infinity, even though the display may be only a few millimeters from a viewer's eyes.

Certain optical devices that output content may also transmit external content, for example a see-through display may pass a view of an environment in addition to displaying augmented reality content overlaid on that environment. Thus both content from the display and content from the environment may be visible.

It may be desirable to change the focal vergence of displayed and/or transmitted content, for example so that display content appears to be at the same depth as environment content. It may also be desirable to change the focal vergence of displayed content independently of changing the focal vergence of transmitted environmental content. In addition, it may be desirable to change the focal vergences of displayed content and/or environmental content independently in different regions (e.g. for different areas of the display). Similarly, it may be useful to independently alter content being displayed, and/or modify environmental content being transmitted, and/or to do either or both independently of one another and/or independently in different regions.

BRIEF SUMMARY OF THE INVENTION

The present invention contemplates a variety of systems, apparatus, methods, and paradigms for the independent control of focal vergence and emphasis (or other changes) in displayed optical content and transmitted optical content.

In one embodiment of the present invention, an apparatus is provided that includes a first optic having multiple first optic regions, a see-through display having multiple display regions, a second optic having multiple second optic regions, and an environment sensor adapted to sense the distance to an environment external to the apparatus along a target path.

The first optic regions, display regions, and second optic regions correspond such that if the target path is oriented through a target display region, the target path is also oriented through a corresponding target first optic region and a corresponding target second optic region. The first optic is adapted to receive optical environment content from the environment in the first optic regions and deliver the optical environment content to the see-through display correspondingly in the display regions. The see-through display is adapted to receive the optical environment content from the first optic in the display regions and deliver the optical environment content to the second optic correspondingly in the second optic regions, and to deliver the optical display content in the display regions to the second optic correspondingly in the second optic regions. The second optic is adapted to receive the optical environment content and the optical display content from the display in the second optic regions and deliver the optical environment content and the optical display content to an optical content receiver.

The first optic is adapted to alter a focal vergence of the optical environment content in the first optic regions. The second optic is adapted to alter the focal vergence of the optical environment content and to alter a focal vergence of the optical display content in the second optic regions. The focal vergence of the optical display content as delivered to the optical content receiver by the second optic and the focal vergence of the optical environment content as delivered to the optical content receiver by the second optic are alterable substantially independently of one another.

The first optic may be adapted to alter the focal vergence of the optical environment content in the first optic regions substantially independently among the first optic regions. The second optic may be adapted to alter the focal vergence of the optical environment content and to alter the focal vergence of the optical display content in the second optic regions substantially independently among the second optic regions. The focal vergence of the optical display content and the optical environment content as delivered by the second optic regions to the optical content receiver may be alterable substantially independently among the second optic regions.

The first optic may be adapted to alter the focal vergence of the optical environment content in all of the first optic regions substantially concurrently. The second optic may be adapted to alter the focal vergence of the optical environment content and to alter the focal vergence of the optical display content in all of the second optic regions substantially concurrently. The focal vergence of the optical display content and the optical environment content as delivered by the second optic regions to the optical content receiver may be alterable substantially independently among the second optic regions for all the second optic regions substantially concurrently.

The apparatus may include a receiver sensor adapted to sense an orientation of the sight path of the optical content receiver. The first optic may be adapted to alter the focal vergence of the optical environment content substantially exclusively in one of the first optic regions along the sight path. The second optic may be adapted to alter the focal vergence of the optical environment content and to alter the focal vergence of the optical display content substantially exclusively in one of the second optic regions along the sight path. The focal vergence of the optical display content and the optical environment content as delivered by the second optic regions to the optical content receiver may be alterable substantially exclusively in the one of the second optic regions along the sight path.

The apparatus may include a receiver sensor adapted to sense an orientation of a sight path of an optical content receiver. The first optic may be adapted to alter the focal vergence of the optical environment content in multiple first optic regions including one of the first optic regions along the sight path. The second optic may be adapted to alter the focal vergence of the optical environment content and to alter the focal vergence of the optical display content in multiple second optic regions including one of the second optic regions along the sight path. The focal vergence of the optical display content and the optical environment content as delivered by the second optic regions to the optical content receiver may be alterable for multiple second optic regions including one of the second optic regions along the sight path.

At least one of the second optic regions, the first optic and the second optic may be adapted such that: the focal vergence of the optical environment content as delivered by the second optic regions after alteration by both the first and second optics is substantially equal to the focal vergence of the optical environment content as received by the first optic regions before alteration by either the first or second optics; and the focal vergence of the optical display content as delivered by the second optic regions after alteration by the second optic is substantially equal to the focal vergence of the optical environment content as delivered by the second optic regions after alteration by both the first and second optics.

The first optic may be adapted to alter the focal vergence of the optical environment content in at least one of the first optic regions along a display path from the optical content receiver to the optical display content. The second optic may be adapted to alter the focal vergence of the optical environment content and to alter the focal vergence of the optical display content as delivered by at least one of the second optic regions along the display path.

The first optic may be adapted to alter the focal vergence of the optical environment content in at least one of the first optic regions along an interaction path from the optical content receiver to an interaction entity external to the apparatus. The second optic may be adapted to alter the focal vergence of the optical environment content and to alter the focal vergence of the optical display content as delivered by at least one of the second optic regions along the interaction path.

The apparatus may include a see-through modifier including multiple modifier regions, the modifier being adapted to receive optical environment content from the environment in the modifier regions and deliver the optical environment content to the optical content receiver, and the modifier being adapted to apply a modification to an optical property of the optical environment content in the modifier regions, substantially independently among the modifier regions.

The display regions and the modifier regions may correspond such that when the target path is oriented toward the target display region of the display regions, the target path is also oriented toward a corresponding target modifier region of the modifier regions.

The modification may include a darkening, a change in opacity, a lightening, and/or a color change applied to the optical environment content.

The modifier may be adapted to apply the modification substantially independently among the modifier regions responsive to the optical display content in the display regions corresponding with the modifier regions.

The apparatus may include a receiver sensor adapted to sense an orientation of a sight path of the optical content receiver, wherein the modifier is adapted to apply the modification substantially independently among the modifier regions responsive to whether the sight path is oriented toward the modifier regions.

The apparatus may include an environment sensor adapted to sense a distance to an environment external to the apparatus along the target path, and to determine an initial status of the optical property of the optical environment content, wherein the modifier is adapted to apply the modification substantially independently among the modifier regions responsive to the initial status of the optical property of the optical environment content in the modifier regions.

The apparatus may include an interaction sensor adapted to sense an interaction with the optical display content, wherein the modifier is adapted to apply the modification substantially independently among the modifier regions responsive to whether the interaction with the optical display content is present in the optical display regions.

The see-through display may be adapted to apply an alteration to a display property of said optical display content in said display regions, substantially independently among said display regions.

The apparatus may include a receiver sensor adapted to sense an orientation of a sight path of the optical content receiver, wherein the display is adapted to apply the alteration substantially independently among the display regions responsive to whether the sight path is oriented toward the display regions.

The apparatus may include an environment sensor adapted to sense a status of an optical property of the optical environment content, wherein: the display is adapted to apply the alteration substantially independently among the display regions responsive to the status of the optical property of the optical environment content in the display regions.

The apparatus may include an interaction sensor adapted to sense an interaction with the optical display content, wherein the display is adapted to apply the alteration substantially independently among the display regions responsive to whether the interaction with the optical display content is present in the optical display regions.

In another embodiment of the present invention, a method is provided that includes determining a distance from an optical content receiver to an environment along a target path, receiving optical environment content in a target first optic region of multiple first optic regions of a first optic along the target path, altering a focal vergence of the optical environment content in the target first region of the first optic substantially independently of a remainder of the first optic regions, and delivering the optical environment content from the first optic to a see-through display. The method includes receiving the optical environment content in a target display region of multiple display regions of the see-through display along the target path, and delivering optical display content and the optical environment content from the see-through display to a second optic. The method also includes receiving the optical environment content and the optical display content in a target second optic region of multiple second optic regions of the second optic along the target path, and altering the focal vergence of the optical environment content and a focal vergence of the optical display content in the target second region of the second optic substantially independently of a remainder of the second optic regions, and delivering the optical environment content and the optical display content to the optical content receiver along the target path.

The focal vergence of the optical display content as delivered by the second optic along the target path after alteration by the second optic is alterable substantially independently of the focal vergence of the optical environment content as delivered by the second optic along the target path after alteration by both the first and second optics. The focal vergence of the optical display content and the focal vergence of the optical environment content as delivered by the second optic along the target path are alterable for the target second optic region substantially independently of the remainder of the second optic regions.

The method may include receiving optical environment content in a target modifier region of a plurality of modifier regions of a modifier along the target path, applying a modification to an optical property of the optical environment content in the target modifier region, substantially independently among the modifier regions, and receiving the optical environment content in the target display region of the plurality of display regions of the see-through display along the target path from the modifier.

The see-through display may be adapted to apply an alteration to a display property of the optical display content in the display regions, substantially independently among the display regions, with or without modification in a modifier.

In another embodiment of the present invention, an apparatus is provided that includes means for determining a distance from an optical content receiver to an environment along a target path, means for receiving optical environment content in a target first optic region of multiple first optic regions of a first optic along the target path, means for altering a focal vergence of the optical environment content in the target first region of the first optic substantially independently of a remainder of the first optic regions, and delivering the optical environment content from the first optic to a see-through display. The apparatus includes means for receiving the optical environment content in a target display region of multiple display regions of the see-through display along the target path, and delivering optical display content and the optical environment content from the see-through display to a second optic, means for receiving the optical environment content and the optical display content in a target second optic region of multiple second optic regions of the second optic along the target path and means for altering the focal vergence of the optical environment content and a focal vergence of the optical display content in the target second region of the second optic substantially independently of a remainder of the second optic regions, and delivering the optical environment content and the optical display content to the optical content receiver along the target path.

The focal vergence of the optical display content as delivered by the second optic along the target path after alteration by the second optic is alterable substantially independently of the focal vergence of the optical environment content as delivered by the second optic along the target path after alteration by both the first and second optics. The focal vergence of the optical display content and the focal vergence of the optical environment content as delivered by the second optic along the target path are alterable for the target second optic region substantially independently of the remainder of the second optic regions.

The apparatus may include means for receiving optical environment content in a target modifier region of a plurality of modifier regions of a modifier along the target path, and means for applying a modification to an optical property of the optical environment content in the target modifier region, substantially independently among the modifier regions.

The apparatus may include means for applying an alteration to an optical property of the optical display content in the target display region, substantially independently among the display regions, with or without modifier means.

In another embodiment of the present invention, an apparatus is provided that includes a see-through display including multiple display regions. The see-through display is adapted to receive optical environment content in the display regions and deliver the optical environment content to the optical content receiver, and to deliver optical display content in the display regions to the optical content receiver. The see-through display is adapted to apply an alteration to a display property of the optical display content in the display regions, substantially independently among the display regions.

In another embodiment of the present invention, a method is provided that includes receiving optical environment content in a target display region of multiple display regions of a see-through display along a target path, delivering the optical environment content to an optical content receiver along the target path, delivering optical display content from the see-through display to the optical content receiver along the target path, and applying an alteration to an optical property of the optical display content in the target display region, substantially independently among the display regions.

In another embodiment of the present invention, an apparatus is provided that includes means for receiving optical environment content in a target display region of multiple display regions of a see-through display along a target path, means for delivering the optical environment content to an optical content receiver along the target path, means for delivering optical display content from the see-through display to the optical content receiver along the target path; and means for applying an alteration to an optical property of the optical display content in the target display region, substantially independently among the display regions.

In another embodiment of the present invention, an apparatus is provided that includes a see-through display including multiple display regions, and a see-through modifier including multiple modifier regions. The display regions and the modifier regions correspond such that when a target path is oriented toward a target display region of the display regions, the target path is also oriented toward a corresponding target modifier region of the modifier regions. The modifier is adapted to receive optical environment content from the environment in the modifier regions and deliver the optical environment content to the optical content receiver. The see-through display is adapted to receive the optical environment content in the display regions and deliver the optical environment content to the optical content receiver, and to deliver optical display content in the display regions to the optical content receiver. The modifier is adapted to apply a modification to an optical property of the optical environment content in the modifier regions, substantially independently among the modifier regions. The see-through display is adapted to apply an alteration to a display property of the optical display content in the display regions, substantially independently among the display regions.

In another embodiment of the present invention, a method is provided that includes receiving optical environment content in a target modifier region of multiple modifier regions of a modifier along a target path, applying a modification to an optical property of the optical environment content in the target modifier region, substantially independently among the modifier regions, and receiving the optical environment content in a target display region of multiple display regions of a see-through display along the target path. The method includes delivering the optical environment content to an optical content receiver along the target path; delivering optical display content from the see-through display to the optical content receiver along the target path and applying an alteration to an optical property of the optical display content in the target display region, substantially independently among the display regions.

In another embodiment of the present invention, an apparatus is provided that includes means for receiving optical environment content in a target modifier region of multiple modifier regions of a modifier along a target path, means for applying a modification to an optical property of the optical environment content in the target modifier region, substantially independently among the modifier regions, and means for receiving the optical environment content in a target display region of multiple display regions of a see-through display along the target path. The apparatus also includes means for delivering the optical environment content to an optical content receiver along the target path means for delivering optical display content from the see-through display to the optical content receiver along the target path, and means for applying an alteration to an optical property of the optical display content in the target display region, substantially independently among the display regions.

In another embodiment of the present invention, an apparatus is provided that includes a first optic including multiple first optic regions, a see-through modifier including multiple modifier regions, a see-through display including multiple display regions, a second optic including multiple second optic regions, and an environment sensor adapted to sense a distance to an environment external to the apparatus along a target path.

The first optic regions, the modifier regions. the display regions, and the second optic regions correspond such that if the target path is oriented through a target display region of the display regions, the target path is also oriented through a corresponding target first optic region of the first optic regions, a corresponding modifier region of the modifier regions, and a corresponding target second optic region of the second optic regions. The first optic is adapted to receive optical environment content from the environment in the first optic regions and deliver the optical environment content to the modifier correspondingly in the modifier regions. The modifier is adapted to receive the optical environment content from the first optic in the modifier regions and deliver the optical environment content to the see-through display correspondingly in the display regions. The see-through display is adapted to receive the optical environment content from the modifier in the display regions and deliver the optical environment content to the second optic correspondingly in the second optic regions, and to deliver the optical display content in the display regions to the second optic correspondingly in the second optic regions. The second optic is adapted to receive the optical environment content and the optical display content from the display in the second optic regions and deliver the optical environment content and the optical display content to an optical content receiver.

The first optic is adapted to alter a focal vergence of the optical environment content in the first optic regions substantially independently among the first optic regions. The modifier is adapted to apply a modification to an optical property of the optical environment content in the modifier regions, substantially independently among the modifier regions. The see-through display is adapted to apply an alteration to a display property of the optical display content in the display regions, substantially independently among the display regions. The second optic is adapted to alter the focal vergence of the optical environment content and to alter a focal vergence of the optical display content in the second optic regions substantially independently among the second optic regions. The focal vergence of the optical display content as delivered to the optical content receiver by the second optic and the focal vergence of the optical environment content as delivered to the optical content receiver by the second optic alterable substantially independently of one another and the focal vergence of the optical display content and the optical environment content as delivered by the second optic regions to the optical content receiver are alterable substantially independently among the second optic regions.

In another embodiment of the present invention, a method is provided that includes determining a distance from an optical content receiver to an environment along a target path, receiving optical environment content in a target first optic region of multiple first optic regions of a first optic along the target path, altering a focal vergence of the optical environment content in the target first region of the first optic substantially independently of a remainder of the first optic regions, and delivering the optical environment content to a see-through modifier, receiving the optical environment content from the first optic in a target modifier region of the see-through modifier along the target path, and applying a modification to an optical property of the optical environment content in the target modifier region, substantially independently among the modifier regions, and delivering the optical environment content to a see-through display. The method includes receiving the optical environment content in a target display region of multiple display regions of the see-through display along the target path, and delivering the optical environment content to a second optic. The method also includes applying an alteration to optical display content in the target display region, substantially independently among the display regions, and delivering the optical display content to the second optic, receiving the optical environment content and the optical display content in a target second optic region of multiple second optic regions of the second optic along the target path, and altering the focal vergence of the optical environment content and a focal vergence of the optical display content in the target second region of the second optic substantially independently of a remainder of the second optic regions, and delivering the optical environment content and the optical display content to the optical content receiver along the target path.

The focal vergence of the optical display content as delivered by the second optic along the target path after alteration by the second optic is alterable substantially independently of the focal vergence of the optical environment content as delivered by the second optic along the target path after alteration by both the first and second optics. The focal vergence of the optical display content and the focal vergence of the optical environment content as delivered by the second optic along the target path are alterable for the target second optic region substantially independently of the remainder of the second optic regions.

In another embodiment of the present invention, an apparatus is provided that includes means for determining a distance from an optical content receiver to an environment along a target path, means for receiving optical environment content in a target first optic region of multiple first optic regions of a first optic along the target path, means for altering a focal vergence of the optical environment content in the target first region of the first optic substantially independently of a remainder of the first optic regions, and delivering the optical environment content to a see-through modifier, means for receiving the optical environment content from the first optic in a target modifier region of the see-through modifier along the target path, and means for applying a modification to an optical property of the optical environment content in the target modifier region, substantially independently among the modifier regions, and delivering the optical environment content to a see-through display. The apparatus includes means for receiving the optical environment content in a target display region of multiple display regions of the see-through display along the target path, and delivering the optical environment content to a second optic, means for applying an alteration to optical display content in the target display region, substantially independently among the display regions, and delivering the optical display content to the second optic, means for receiving the optical environment content and the optical display content in a target second optic region of multiple second optic regions of the second optic along the target path, and means for altering the focal vergence of the optical environment content and a focal vergence of the optical display content in the target second region of the second optic substantially independently of a remainder of the second optic regions, and delivering the optical environment content and the optical display content to the optical content receiver along the target path. The focal vergence of the optical display content as delivered by the second optic along the target path after alteration by the second optic is alterable substantially independently of the focal vergence of the optical environment content as delivered by the second optic along the target path after alteration by both the first and second optics. The focal vergence of the optical display content and the focal vergence of the optical environment content as delivered by the second optic along the target path are alterable for the target second optic region substantially independently of the remainder of the second optic regions

BRIEF DESCRIPTION OF THE SEVERAL VIEWS OF THE DRAWINGS

Like reference numbers generally indicate corresponding elements in the figures.

FIG. 1A through FIG. 1D show example arrangements of sight lines associated with targets at different focal depths, in schematic form.

FIG. 11C shows a 4×6 array of second optic regions representing corresponding regions for content.

FIG. 12A through FIG. 12E show examples of focal vergence adjustment in corresponding regions.

FIG. 14A through FIG. 14D show examples of optical environment content modification in corresponding regions.

FIG. 16A through FIG. 16D show examples of optical display content alteration in corresponding regions.

DETAILED DESCRIPTION OF THE INVENTION

With reference to FIG. 1A, therein is shown an arrangement of sight lines for stereo vision of a target 112A. As may be seen, left and right sight lines 114A and 116A may be traced from the left and right eyes 102A and 104A respectively to the target 112A.

FIG. 1B shows an arrangement of sight lines to a target 122B. The arrangement in FIG. 1B is at least somewhat similar to that in FIG. 1A. However, as may be seen by comparison of FIG. 1A and FIG. 1B, the target 122B in FIG. 1B is at a different depth or distance with respect to the viewer (represented by eyes 102B and 104B) than is the target 112A from the viewer (represented by eyes 102A and 104A) in FIG. 1A. That is, the target 122B in FIG. 2B is closer to the viewer than the target 112A in FIG. 1A.

Even though the distance to the target 122B in FIG. 1B is less, a similar general arrangement may be observed: left and right sight lines 124B and 126B may be traced from the left and right eyes 102B and 104B respectively to the target 122B.

Turning to FIG. 1C, an arrangement is shown therein with two targets, 112C and 122C. Target 112C is at a greater distance from the viewer (as represented by eyes 102C and 104C) than is target 122C.

The arrangement in FIG. 1C illustrates a feature of human vision, referred to as physiological diplopia, that may occur when two targets 112C and 122C are visible to a viewer, but are a different depths. In the example of FIG. 1C, it is considered that the viewer is focusing on the nearer target 122C. As may be seen, sight lines 124C and 126C may be traced from the viewer's eyes 102C and 104C respectively to the near target 122C.

However, with the viewer's eyes 102C and 104C focused on the near target 122C—that is, focused at the distance corresponding to the near target 122C—the viewer's eyes are not and cannot be focused also on the far target 112C. As a result, sight lines 114C and 116C traced from the viewer's eyes 102C and 104C to the far target 112C produce the appearance to the viewer of two separate images 118C and 120C of the far target 112C, rather than a single image of the far target 112C.

This phenomenon is referred to as physiological diplopia, as noted previously. When a viewer focuses on a target at one depth, targets at other depths may appear doubled. This is an inherent feature of normal human vision.

With regard to FIG. 1D, another example of physiological diplopia is shown therein. Near and far targets 122D and 112D respectively are present before the left and right eyes 102D and 104D respectively of a viewer. In the example of FIG. 1D, the viewer is focused on the far target 112D, along sight lines 114D and 116D. However, the near target 122D appears to the viewer as two images 128D and 130D along sight lines 124D and 126D respectively.

Figure 2A:
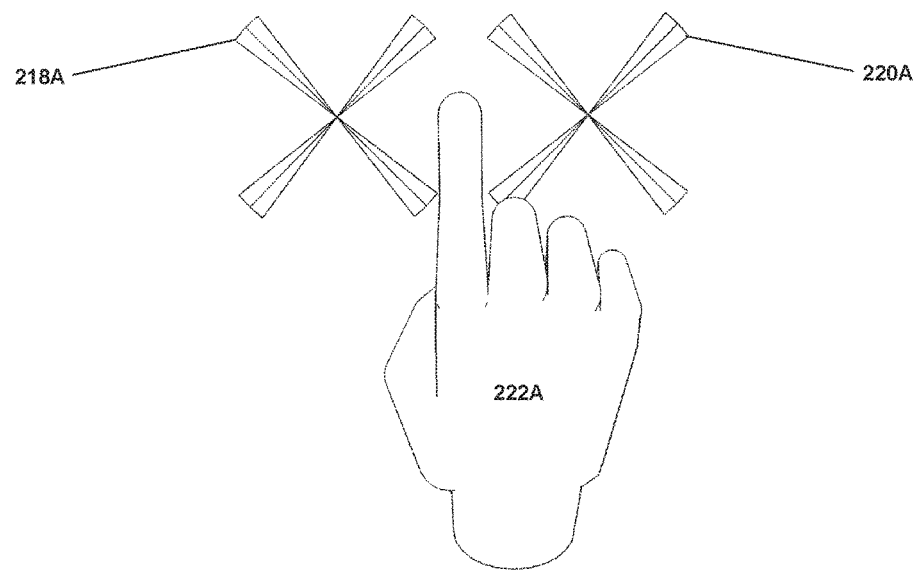
FIG. 2A and FIG. 2B show example arrangements of features associated with targets at different focal depths, as apparent to a viewer thereof.
Figure 2B:
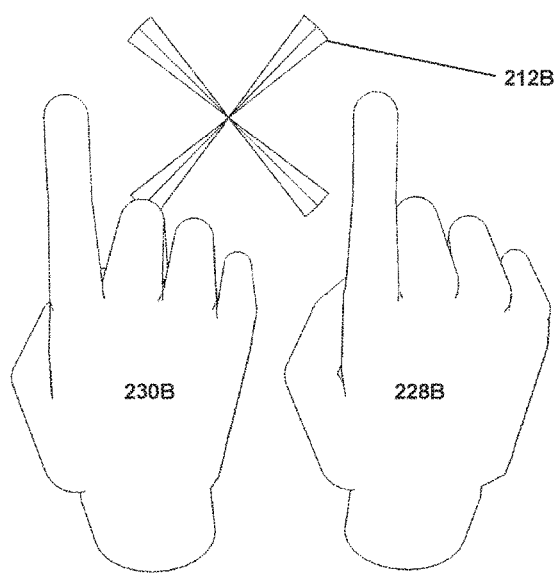

Turning to FIG. 2A, an example arrangement is shown illustrating physiological diplopia from the perspective of a viewer rather than in schematic form. In FIG. 2A a near target 222A is visible in the foreground, the near target 222A in this example taking the form of a hand. It is assumed that a viewer (not shown) is holding up a hand to serve as the near target 222A, and focusing on that hand (near target 222A). Behind the near target 222A, two images 218A and 220A of a far target are visible. The far target is shown as a stylized x-mark, as might represent (for example) an augmented reality marker displayed at infinity by a head mounted display (not shown), though this is an example only. This arrangement in FIG. 2A corresponds at least somewhat to that shown in FIG. 1C, wherein two images 118C and 120C of a far target 112C appear on either side of a near target 122C. (In practice, for the arrangement in FIG. 2A the images 218A and 220A typically may appear out-of-focus if the viewer is focused on the near target 222A, however for clarity the images 218A and 220A are shown herein as sharp line art.)

Now with reference to FIG. 2B, another example arrangement is shown illustrating physiological diplopia from the perspective of a viewer. In FIG. 2B a far target 212B is visible in the background; it is assumed that the viewer is focusing on the far target 212B. In front of the far target 212B, two images 228B and 230B of a near target are visible. This arrangement in FIG. 2B corresponds at least somewhat to that shown in FIG. 1D, wherein two images 128D and 130D of a near target 122D appear on either side of a near target 112D.

In addition, it is noted that physiological diplopia can be conveniently demonstrated by an individual so as to be understood thereby. Holding a pen in one hand at arm's length, and extending a finger of the other hand at a closer distance, a viewer may focus on either the pen or the finger. It may be observed that when the viewer focuses on the pen, two images of the finger are visible, typically on either side of the pen (though the exact position is to at least some degree a function of the relative physical positions and the particulars of each viewer's eyes). Likewise, when the viewer focuses on the extended finger two images of the pen are visible, again typically on either side of the finger.

As noted, physiological diplopia is a natural and inherent feature in human vision, one not readily correctable (nor would correction necessarily even be desirable).

Physiological diplopia is described and illustrated herein to provide an example of issues that may arise if content is displayed to a viewer with different depths (or more precisely, two different apparent depths; this distinction is addressed subsequently herein). If, for example, generated visual content is displayed to a viewer overlaid onto real-world imagery (e.g. a control or virtual object disposed in space in front of the viewer), and the generated visual is at a different depth than the real-world imagery, then physiological diplopia may result; the viewer may see either two images of the generated visual content on either side of the real-world imagery, or two images of the real-world imagery on either side of the generated visual content. Furthermore, typically only one of the generated visual content and the real-world imagery could be in-focus to the viewer at any moment.

Such image-doubling and out-of-focus issues may make utilizing augmented reality content problematic. For example, if the viewer is to interact with the generated visual content by (for example) using a hand to manipulate a virtual object, then if the depths of the hand and virtual object are different the viewer will (because of physiological diplopia) perceive either two images of his or her hand or two images of the virtual object. It will be understood that relying upon visual input to manipulate an object may be severely problematic for a user who cannot clearly determine the proper position of either his or her hand or the object in question. As a more concrete example, if a viewer is expected to grip a virtual object with a hand, and either the hand or the object appear to be in two different positions, the viewer may have difficulty even perceiving whether he or she is gripping the object, much less carrying out some specified manipulation.

It is noted that issues of physiological diplopia are presented as examples only, and that they are not intended to represent all issues that may arise from differences in depth (or apparent depth) of content.

Figure 3A:
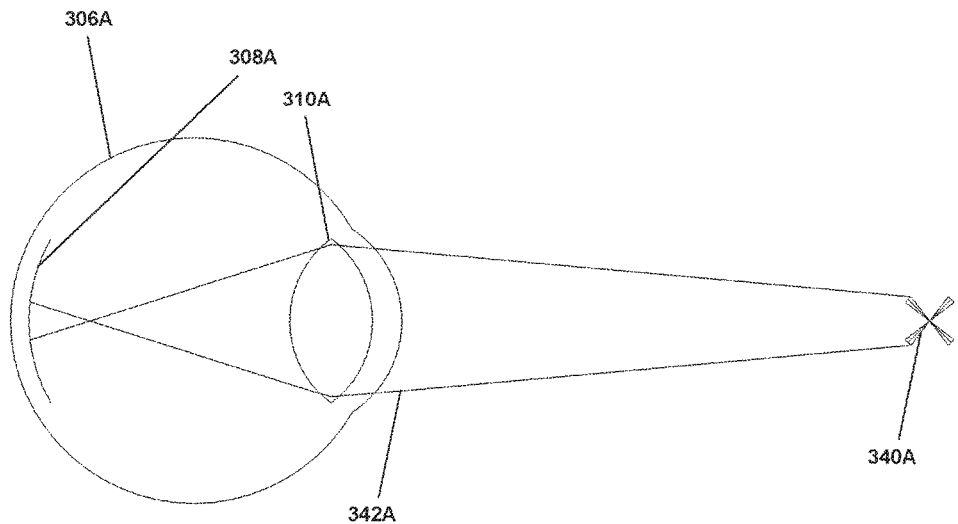
FIG. 3A shows an example of focal vergence for a visual target.

Now with reference to FIG. 3A, therein is shown an example of focal vergence for a visual target. Focal vergence refers to the paths followed by light rays (and/or depicted as sight lines) in moving from one place to another. Focal vergence is a general term encompassing several possible cases; focal convergence refers to light rays/sight lines coming together, focal divergence refers to light rays/sight lines spreading apart, and focal parallel vergence refers to light rays/sight lines remaining parallel without coming together or spreading apart.

It is noted that vergence also may be applied to another feature relating to optics and vision, namely ocular vergence. Ocular vergence should not be confused with focal vergence. Ocular vergence refers to the relative orientation of eyes in binocular vision (or cameras, etc.); typically human eyes for example point at least slightly inward, toward one another, so that sight lines drawn from the center of each retina through the center of each lens and pupil will converge at some distance from the viewer. Ocular vergence is visible (but not numbered or specifically identified) in FIG. 1A through FIG. 1D. However, ocular vergence is distinct from focal vergence; the following discussion refers to focal vergence, and ocular vergence is noted here to avoid potential confusion.

Returning to FIG. 3A, an eye 306A is shown therein. The retina 308A and lens 310A of the eye 306A also are shown therein. In addition, a target 340A is shown in the form of a stylized x-mark. The target 340A may be substantially any visual feature; in certain places subsequently herein the stylized x-mark is used to refer to optical output content, such as virtual reality content, augmented reality content, etc. as might be generated and/or delivered by a display system. However, the arrangement of FIG. 3A is not necessarily specific to only optical output content; the target 340A may represent any optical feature, whether virtual, augmented, physical, etc.

With regard to terminology, it is noted that "optical output content" refers to text, images, video, etc. as may be outputted by a display of an apparatus. It may be equally suitable and/or even equivalent to refer to such output content as "optical display content" or "optical displayed content", in that the content in question is coming from the display/being displayed. Conversely, the term "optical environment content" refers to text, images, video, etc. as may represent light reflected or emitted from an environment external to the apparatus, such as ambient light from objects or other features within the physical environment. It may be equally suitable to and/or equivalent to refer to such environment content as "optical transmitted content", in that the content in question is transmitted through the display rather than being displayed thereby.

Thus, content that is provided from within an apparatus (e.g. a head mounted display) may be referred to as output content, display content, displayed content, etc., while content that is acquired from outside the apparatus may be referred to as transmitted content, environment content, etc. A distinction is made between how optical content is being provided—e.g., being outputted from a see-through display as opposed to passing through that see-through display.

However, the particular terminology used should not be understood as limiting. For example, in certain embodiments optical output content could be provided by disposing a variably-colored filter in front of a white light source; similarly, optical output content could be generated in a display engine and fed to an optical film, plate, prism, etc. In a very strict sense such arrangements might be argued to be transmitting rather than outputting the actual images, text, etc. that a user then sees: the white light is transmitted through the filter, the light from the display engine is transmitted through the optical film, etc. Likewise, the literal light sources in such arrangements—the white light and the display engine—may not be physically disposed between first and second optics, may not be physically see-through, etc. Nevertheless, for purposes of explanation the filter and optical film reasonably may be referred to as "the see-through display", and the term "optical display content" reasonably may be applied to the content from such displays. Similarly, in a strict sense an environment may include in itself content that is technically displayed, such as light from a television, smart phone, etc.; nevertheless such may still be reasonably considered as part of the environment, and thus optical environment content (even if also "displayed" in a strict sense).

Thus, as noted, overall terms such as "see-through", "display", "transmitted", "environment", etc. are used herein and should be understood in a functional, practical sense.

Returning to FIG. 3A, as may be seen, focal vergence lines 342A are shown in FIG. 3A extending from the target 340A to the lens 310A, and then on to the retina 308A. Focal vergence within the eye 306A is determined at least in part by the optical properties of the eye 306A itself, e.g. the curvature of the lens 310A (as controlled by muscles surrounding it). Embodiments do not necessarily address or directly modify focal vergence within the eye 306A, but focal vergence lines are shown within the eye 306A for purposes of explanation.

With regard to focal vergence lines 342A between the target 340A and the eye 306A, it should be understood that the focal vergence for any particular target 340A is in part a function of the distance between the eye 306A and the target 340A. A target 340A that is close will exhibit greater focal divergence (or less focal convergence) than a target 340A that is far away (other factors being equal). A target 340A that is sufficiently distant may exhibit focal vergence that is substantially parallel, that is, light rays from the target 340A may be approximately parallel. (This may be observed with sunlight, which—coming from a source approximately 93 million miles away—typically exhibits very nearly parallel vergence.)

Focal vergence and depth/distance thus are related. In at least some circumstances depth and/or distance may be determined from focal vergence, and vice versa.

Figure 3B:
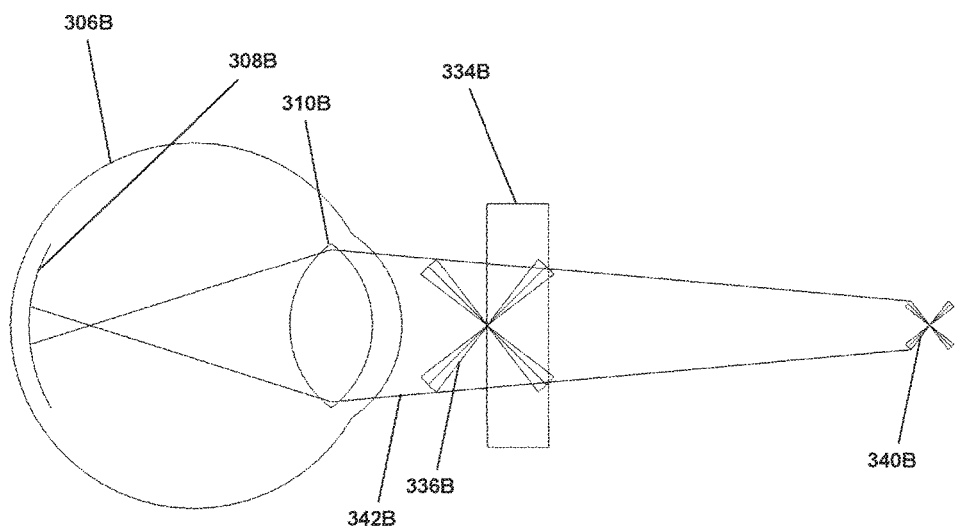
FIG. 3B shows an example of focal vergence for a displayed visual target having an apparent focal depth different from an display depth thereof.

Turning now to FIG. 3B, another example is shown therein of focal vergence for a visual target. In FIG. 3B, an eye 306B is shown with retina 308B and lens 310B thereof. In addition, a display 334B is also shown. As may be seen, a displayed output target 336B is shown being displayed on the display 334B. In practice the displayed output target 336B typically may be flat along the surface of the display 334B, but such would appear (if visible at all) only as an almost-invisibly thin profile; therefor for illustrative purposes the displayed output target 336B is shown as a stylized x-mark centered on the surface of the display 334B closest to the eye 306B.

The displayed output target 336B is displayed with a particular focal vergence, as shown by focal vergence lines 342B. The focal vergence of the displayed output target 336B is such that the displayed output target 336 is in focus, not at the distance corresponding to the surface of the display 334B, but at a greater distance; because of this, to the viewer (whose eye 306B is shown) the content being displayed would appear to be in a position represented by the perceived output target 340B, shown as a smaller stylized x-mark.

More generally, optical content delivered by a display may be delivered with a focal vergence that does not correspond to the actual distance between the viewer and the display. Rather, as shown in FIG. 3B, optical content may be delivered with focal vergence such that the content appears to be at some other distance, up to and including infinity. Put another way, content may be delivered with a degree of focus corresponding to some distance other than the distance at which the screen (or other display system) is physically disposed.

However, although focal vergence may in principle be controlled, not all display systems are necessarily capable of controlling focal vergence in practice. For example, certain display systems require that optical content be delivered with some fixed focal vergence, that is, content is displayed with a fixed focus. Moreover, for certain display systems it may be required not only that optical content have a fixed focal vergence, but that the focal vergence be fixed at a particular value. For example, certain display systems that use optical substrates to deliver image content may function optimally only when that image content has parallel focal vergence; if the focal vergence is not parallel, images may be dispersed, may overlap, or may exhibit other undesired optical effects. For such a system therefor, any image content delivered by the display will have and indeed must have parallel focal convergence; that is, the image content is delivered always and only focused for infinity. In such instance, adjusting the focal vergence within the display itself may not be a viable option, since doing so may severely degrade the image quality.

However, as previously noted with regard to FIG. 1A through FIG. 1D, delivering optical output content from a display with a focal vergence different from that of optical environment content visible through the display may be severely problematic, resulting in double-images of optical output content and/or optical environment content.

As will be described and shown with regard to examples in FIG. 4A through FIG. 4D embodiments enables control of focal vergence of optical content, even when that content may be delivered with a fixed focal vergence (including but not limited to fixed parallel focal vergence) as noted above. Thus issues such as those illustrated in FIG. 1A through FIG. 1D and described with respect thereto may be alleviated or avoided altogether.

Figure 4A:
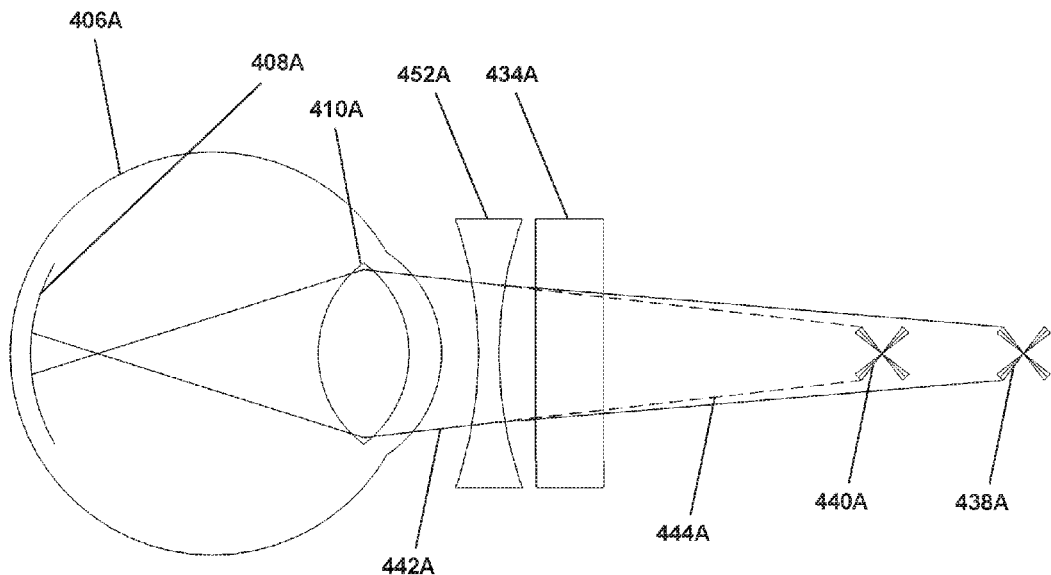
FIG. 4A shows an example of focal vergence for a displayed visual target having an apparent focal depth as modified with a first optic.

With regard to FIG. 4A, a portion of an apparatus is shown therein disposed in relation to a viewer. In FIG. 4A, an eye 406A is shown with a retina 408A and lens 410A thereof. It is emphasized that the eye 406A, retina 408A, and lens 410A are not intended as necessarily being part of embodiments; rather embodiments may be used with a viewer's eye or eyes, and thus an eye is shown for explanatory purposes.

The arrangement in FIG. 4A also shows a display 434A. The display 434A delivers an output target 438A, illustrated in the form of a stylized x-mark (though this form is an example only). The output target 438A is delivered with a focal vergence indicated by focal vergence lines 432A, the focal vergence corresponding to a point in space at some distance from the display 343A and also from the eye 406A. (As noted earlier, the output target 438A may have, and in the example of FIG. 4A does have, a focal vergence such that the output target 483A would be in focus at a position other that the actual display surface of the display 434A. Although the output target may be displayed at a surface of the display 434A, this is not shown in FIG. 4A, or likewise FIG. 4B through FIG. 4D, for purposes of simplicity.)

However, as described earlier, it may be desirable to change the focal vergence of optical content delivered by the display 434A, such as the output target 483A, thus also changing an apparent focal depth of that content. Such control of focal vergence (and thus focal depth) may be desirable even if the display 434A can deliver only fixed focal vergence.

As illustrated in FIG. 4A, a second optic 452A is shown. The second optic 452A adjusts the focal vergence of the output target 438A, so that—as perceived by the viewer—the output appears in the position shown by the perceived output target 440A, rather than in the position shown by the output target 438A. That is, although the display delivers optical content with a focal depth shown by the output target 438A, the viewer would actually perceive that optical content as being at a reduced focal depth shown by the perceived output target 440A.

This may also be understood in comparing the focal vergence lines 442A for the output target 438A as delivered with the perceived focal vergence lines 444A (shown as dashed lines in FIG. 4A) for the perceived output target 440A. As may be seen, the first optic 452A adjusts the path of the focal vergence lines 442A to the path of the perceived focal vergence lines 444A. In the example shown, the first optic 452A is a diverging lens: light rays passing through the lens are made to diverge from their original paths. As shown the focal vergence lines 442A, already divergent, are made to be more strongly divergent as the perceived focal vergence lines 444A. As a result, the apparent position of the output is shifted towards the second optic 452A, and likewise toward the display 434A and the eye 406A.

Thus as shown, the application of a lens, lens assembly, or other optic may adjust the focal vergence of output delivered by a display 434A. This adjustment of focal vergence is external to the display 434A, and thus does not directly affect the inner workings of the display 434A; even if the display is of a sort that is limited to delivering optical content with fixed focal vergence, the focal vergence of the output nevertheless may be adjusted.

Although a diverging lens is shown as the second optic 452A in FIG. 4A, this is an example only. Other lenses, including but not limited to converging lenses, may be equally suitable. Likewise, groups or assemblies of lenses or other optical elements also may be equally suitable; embodiments are not limited only to single lenses or even necessarily to lenses at all, so long as the second optic is adapted to adjust the focal vergence of light and/or imagery passing therethrough. In particular, it is noted that variable optics, for example optical systems adapted to change focal vergence by varying amounts and/or in varying directions (e.g. convergence and divergence), may be suitable for use as the second optic 452A.

Through the use of a suitable second optic 452A as shown in FIG. 4A, optical content delivered by the display 434A may be made to exhibit substantially any focal vergence, and thus may be made to appear to be at substantially any focal depth, regardless of the focal vergence/focal depth at which the display 434A itself delivers the optical content.

Figure 4B:
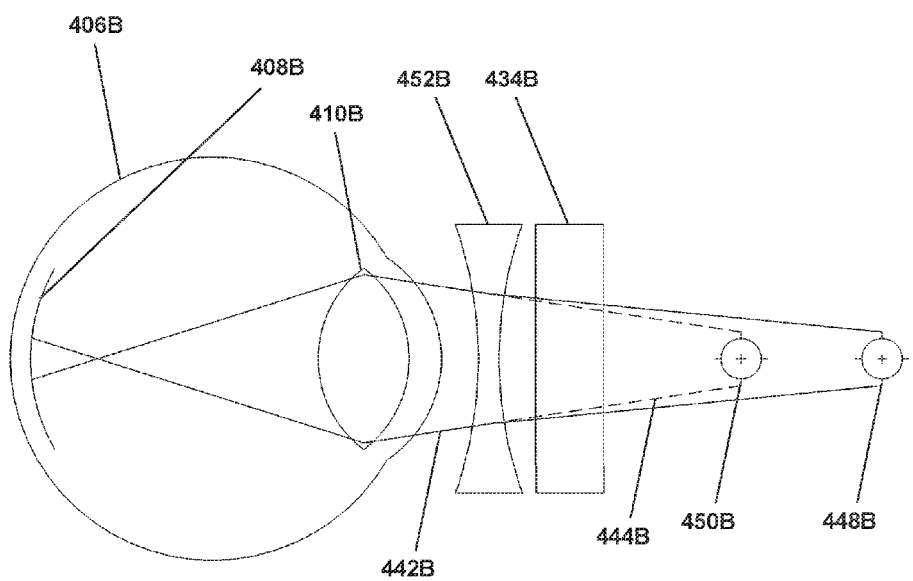
FIG. 4B shows an example of focal vergence for an environmental visual target having an apparent focal depth as modified with a first optic.

However, as may be seen now in FIG. 4B, the effect of a second optic according may not apply only to optical content delivered by a display.

In the arrangement shown in FIG. 4B, an eye 406B with retina 408B and lens 410B are again shown. A display 434B is also shown (though no displayed content is illustrated), along with a second optic 452B.

In addition, an environment target 448B is shown, depicted therein as a stylized crosshair. Where an output target from FIG. 4A may be considered to represent displayed content delivered by the display (e.g. augmented reality data such as text, symbols, position marks, icons, etc.), the environment target 448B in FIG. 4B may be considered to represent visual content external to the display 452B. For example, people, animals, physical objects, horizon lines, etc. might be considered to be optical environment targets. Projected or displayed images that are visible without the display 452B also may be considered environment targets, for example an image displayed on a television, monitor, cellular phone, etc. might be considered an environment target even though such an image may be generated by another display.

As may be seen, the second optic 452B affects an environmental target 448B in much the same way as the second optic 452A in FIG. 4A affects an output target 438A: the focal vergence as represented by the focal vergence lines 442B are diverged, so that the perceived focal vergence lines 444B cause the viewer to perceive the environment target 448B to be in the location of the perceived environment target 450B. That is, just as the second optic causes displayed content to appear at a reduced focal depth, so too the second optic causes external content to appear at a reduced focal depth.

Figure 4C:
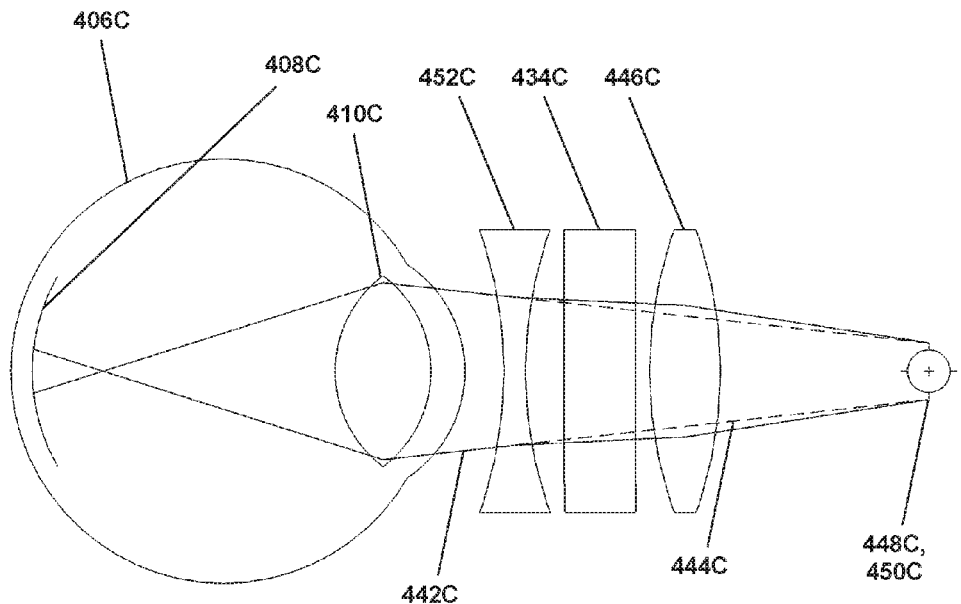
FIG. 4C shows an example of focal vergence for an environmental visual target having an apparent focal depth as modified with a first optic and a second optic.

Now with reference to FIG. 4C, an apparatus is shown therein. FIG. 4C illustrates an eye 406C with retina 408C and lens 410C. A display 434C and second optic 452C are shown, along with a first optic 446C.

As may be seen, in the example of FIG. 4C the first optic 446C serves as a "neutralizing lens" (or lens system, etc.) with respect to the second optic 452C: the first optic 446C provides a counter to the effect of the second optic 452C with regard to focal vergence (and thus apparent focal depth), so that with respect to the viewer the focal vergence for an environment target 448C without considering either the first and second optics 446C and 452C is substantially equal to the focal vergence of a perceived environment target 450C. That is, optical environment content appears to be at substantially the same focal distance when having passed through both the first and second optics 446C and 452C as when having passed through neither the first nor the second optics 446C and 452C.

With regard more specifically to focal vergence, as may be seen the focal vergence lines 442C are first adjusted by the first optic 446C so as to be more convergent (or less divergent, in the particular example shown), pass through the see-through display 434C, and then are made to be more divergent by the second optic 452C. Consequently, the perceived focal vergence lines 444C trace back to substantially the same position as the focal vergence lines 442C. In other words, the locations of the environment target 448C and the perceived environment target 450C are substantially the same. Put colloquially, environmental features may be made appear "where they're supposed to", with the changes applied thereto by the second optic 452C being counteracted or neutralized by the first optic 446C.

However, it will be understood that output content delivered by the display 434C, the display 434C being inward from the first optic 446C (closer to the viewer's eye 406C), would be unaffected by the first optic 446C. Thus the changes in focal vergence to output content produced by the second optic 452C would not be neutralized by the first optic 446C.

Figure 4D:
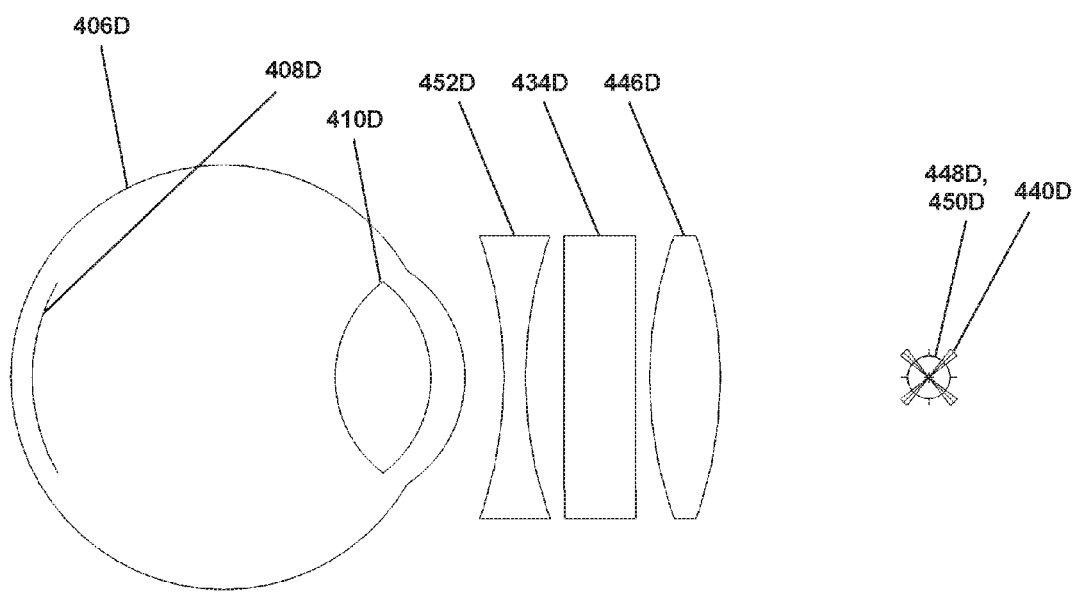
FIG. 4D shows an example arrangement of a displayed visual target and an environmental visual target having substantially equal apparent focal depths.

Turning to FIG. 4D, a result of an example apparatus is shown. Therein is shown an eye 406D with retina 408D and lens 410D. A display 434D, first optic 446D, and second optic 452D are also shown.

In addition, a perceived output target 440D is shown, at a focal depth as would be perceived by the viewer. The output target itself is not shown; as shown and described with regard to FIG. 4A the perceived output target 440D may be disposed at substantially any apparent focal depth, regardless of the focal depth for which the output target is delivered by the display 434D. The output target as delivered by the display 434D might have a focal depth of infinity, which would not be visible in FIG. 4D the output target thus being, apparently at least, an infinite distance to the right from the illustration). Because the focal vergence and thus focal depth of the perceived output target 440D may be controlled substantially at will through selection of a suitable second optic 452D, the original focal depth of the output target as delivered by the display 434D is not particularly limited and thus is not shown in FIG. 4D.

Furthermore, an environment target 448D is shown in FIG. 4D. The stylized crosshair shown therein is identified as both the environment target 448D and as the perceived environment target 450D. As previously described with regard to FIG. 4C, through suitable selection of a first optic 446D (relative to the second optic 452D) the perceived focal vergence to (and thus perceived focal depth of) the perceived environment target 450D may be controlled such that the perceived environment target 450D may appear in substantially the same place as the (unmodified) environment target 448D.

Thus, as shown in FIG. 4D an apparatus may control the apparent focal vergence (and thus focal depth) of content delivered to a display, without affecting the apparent focal vergence of content passing through that display. Consequently, as illustrated in the example of FIG. 4D, displayed content and environmental content may be made to be in-focus at the same depth, in particular the original depth of the environmental content. This may be accomplished in embodiments regardless of the initial focal vergence of the displayed content, or the limitations of the display with regard to delivering such content.

However, although FIG. 4C and FIG. 4D show an arrangement for fully neutralizing the effects of the second optic on environment content through the use of the first optic, this is an example only, and embodiments are not limited only to such neutralization. Rather, embodiments more generally enable control of the focal vergence of displayed content and the focal vergence of environment content, independently of one another. While the arrangements in FIG. 4C and FIG. 4D show a particular example of such independent control, namely to change the focal vergence of the displayed content to substantially equal the focal vergence of the environment content without also changing the focal vergence of the environment content, other arrangements may be equally suitable.

For example, embodiments of an apparatus may—through selection of the first and second optics—apply a net change in focus/focal vergence to both displayed and environmental content. As a more concrete example, the apparatus might serve not only to align the focus of displayed content with the focus of environmental content but also to apply an overall focus correction, e.g. to compensate for nearsightedness, farsightedness, etc.

In summary, an embodiment of an apparatus may independently control focal vergence (and focal depth) for both displayed and environmental content. One example application is to substantially align the focal vergence of displayed content with the focal vergence of environmental content, thus reducing or eliminating issues such as those relating to physiological diplopia. However, embodiments are not limited only to such an application.

Figure 5:
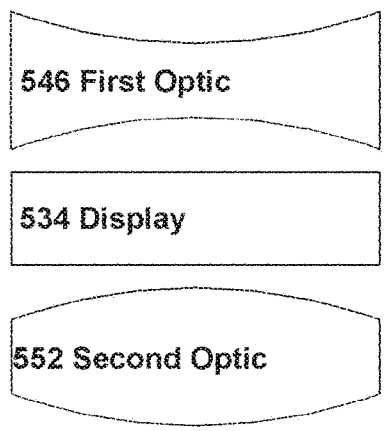
FIG. 5 shows an example arrangement of an apparatus in schematic form.

Turning to FIG. 5, therein an apparatus is shown in schematic form. The apparatus includes a first optic 546, a second optic 552, and a see-through display 534. The see-through display 534 is engaged with the first and second optics 546 and 552 such that light and/or image content from the environment may be received by the first optic 546 and delivered to the display 534, passed through the display, and delivered to the second optic 552. In addition, light and/or image content delivered by the display 534 may be delivered to the second optic 552.

Embodiments are not limited with regard to the specifics of the see-through display 534, a first optic 546, and a second optic 552.

The see-through display 534 is adapted to deliver visual content for receipt by a viewer. The see-through display 534 may be fully transparent, or may filter light in some fashion, block some light, modify some or all light passing therethrough, etc.

As illustrated in FIG. 5, the entire display 534 is disposed geometrically between the first and second optics 546 and 552. However, this is an example only, and other arrangements may be equally suitable. For example, it is noted that certain displays include multiple elements, such as an image generator, a transmission unit for moving the light from the image generator to a position for output, a decoupler to deliver the output in a viewable form, etc. It is not required that the display 534 or any particular physical components thereof be disposed in any particular geometric relationship with regard to the first and second optics 546 and 552. An image generator might be some considerable distance from either the first or the second optics 546 and 552, even if (for example) a decoupler were physically disposed between the first and second optics 546 and 552. Nor is it required that environment imagery physically pass through a display 534 (though this also is not prohibited); an open space carrying (for example) scanning lasers that "draw" images on a retina also may be considered a transparent display.

So long as output light and/or imagery is delivered by the display 534 and passes through the second optic 552 into a viewable position, and environment light and/or imagery passes through the first and second optics 546 and 552 into that viewable position, so as to function as shown and described herein, the physical arrangement of the elements is not particularly limited.

A wide range of devices and systems may be suitable for use as a display 534. For example, optical output content may be generated by systems including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Similarly, optical output content may be delivered to a viewer/viewable position by systems including but not limited to light pipes, optical substrates, direct display (e.g. disposing an active LED screen in the line of sight), scanning lasers, etc.

A wide range of devices also may be suitable for the first and second optics 546 and 552. For example, individual lenses or other optical elements of various forms, materials, etc. may be suitable. Although FIG. 5 shows a first optic 546 as a convex (converging) lens and a second optic 552 as a concave (diverging) lens this is an example only, and other arrangements may be equally suitable.

Assemblies of lenses or other optical elements also may be suitable for use as first and second optics 546 and 552. Although for simplicity the singular term "optic" is used to refer to elements 546 and 552, embodiments are not particularly limited to the number of optical components in either the first or the second optic 546 and 552.

Variable optical elements and/or assemblies may be suitable for use as first and second optics 546 and 552. For example, first and/or second optics 546 and 552 that may vary in their optical properties, such as degree and direction of vergence (e.g. convergence or divergence), may be suitable. In particular, arrangements wherein the first and/or second optics 546 and 552 are variable so as to change the adjustment of focal vergence thereof may be useful for at least some embodiments. Such variability may enable tailoring changes in focal vergence based on local conditions (e.g. distance to environment content), individual viewer characteristics (e.g. nearsightedness), etc.

Suitable optical elements for use as and/or in the first and/or second optics 546 and 552 may include but are not limited to liquid optical elements, deformable optical elements, electrodeformable or otherwise electroresponsive optical elements, and mechanically variable optical assemblies. Also, the first and second optics 546 and 552 are not required to be identical or even similar in form or composition; an apparatus might use a single liquid lens for the first optic 546 but an assembly of multiple rigid lenses for the second optic 552.

It is noted that embodiments may be assembled piecemeal, and/or as an add-on to an existing system. For example, an existing display 534 might be retrofitted with suitable first and second optics 546 and 552.

Figure 6:
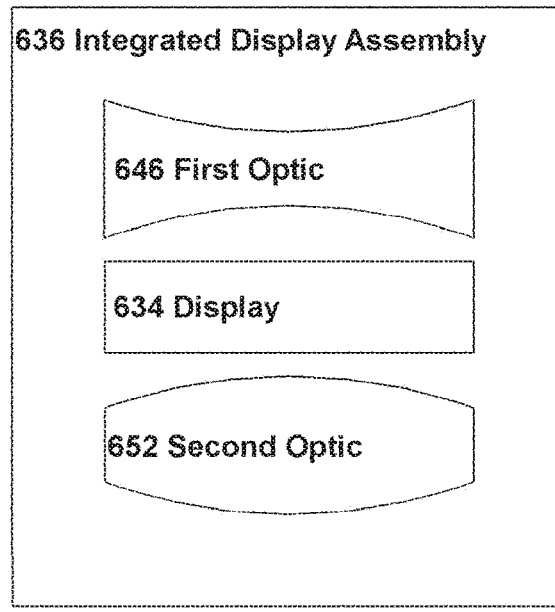
FIG. 6 shows another example arrangement of an apparatus in schematic form, with optical elements thereof integrated into an assembly.

Turning to FIG. 6, although embodiments may be configured using individual elements, and/or as retrofitted elements, embodiments also may be configured as an integrated assembly 636 as shown therein. For example, the first optic 646 and second optic 652 may be physically and/or optically integrated with the display 634 so as to form a single module, optical unit, etc. Such arrangements may enable at least certain embodiments to be made particularly compact, reliable, etc. However, this is an example only, and other arrangements may be equally suitable.

Figure 7:
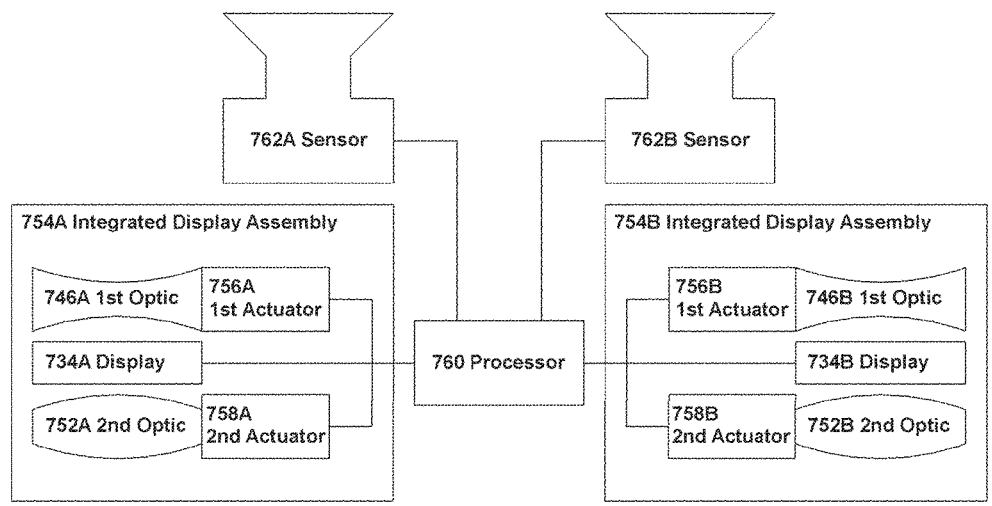
FIG. 7 shows another example arrangement of an apparatus in schematic form, with left and right integrated optical assemblies.

Now with reference to FIG. 7, an apparatus may include numerous elements other than the display, first optic, and second optic as thus far described herein. For example, as shown in FIG. 7 the example apparatus therein includes an integrated display assembly 754A with a first optic 746A, a display 734A, and a second optic 752A, at least somewhat similar to the arrangement shown in FIG. 6. However, the integrated display assembly 754A in FIG. 7 also includes a first actuator 756A adapted to vary the optical properties of the first optic 746A, e.g. changing the focal length thereof (thus changing the degree and/or direction by which the first optic 746A adjusts focal vergence); this presumes the first optic 746A is variable, as noted previously. The integrated display assembly 754A further includes a second actuator 758A adapted to vary the optical properties of the second optic 752A.

In addition, the apparatus in FIG. 7 includes a second integrated display assembly 754B. The integrated display assembly 754B includes a first optic 746B, display 734B, second optic 752B, first actuator 756B, and second actuator 758B similar to the integrated display assembly 754A already described. Such a configuration might be suited for example for an arrangement wherein each of a viewer's eyes is provided with an integrated display assembly 754A and 754B, such as might be the case for a stereo display system.

The arrangement of FIG. 7 also includes a processor 760 in communication with the integrated display assemblies 754A and 754B, and with the first actuators 756A and 756B and second actuators 758A and 758B therein. Such an arrangement may for example facilitate control of the first actuators 756A and 756B and second actuators 758A and 758B, and control of the first optics 746A and 746B and second optics 752A and 752B thereby. The processor 760 may also be in communication with and/or in control of the displays 734A and 734B, depending on the particulars of an embodiment.

Further, the arrangement of FIG. 7 includes sensors 762A and 762B in communication with the processor 760. Sensors may be useful in providing a variety of data for facilitating operation of the apparatus. For example, sensors 762A and 762B may be adapted to determine the distance between the viewer or display 734A and 734B and optical environment content; for embodiments wherein the focal vergence of displayed content is to be matched to the focal vergence of environment content, data on what the focal vergence of the environment might usefully be obtained by such sensors 762A and 762B. In addition or instead, sensors 762A and 762B might be adapted to determine where the viewer is looking within the field of view, or to perform other functions that may be useful in displaying and/or manipulating optical content.

Figure 8:
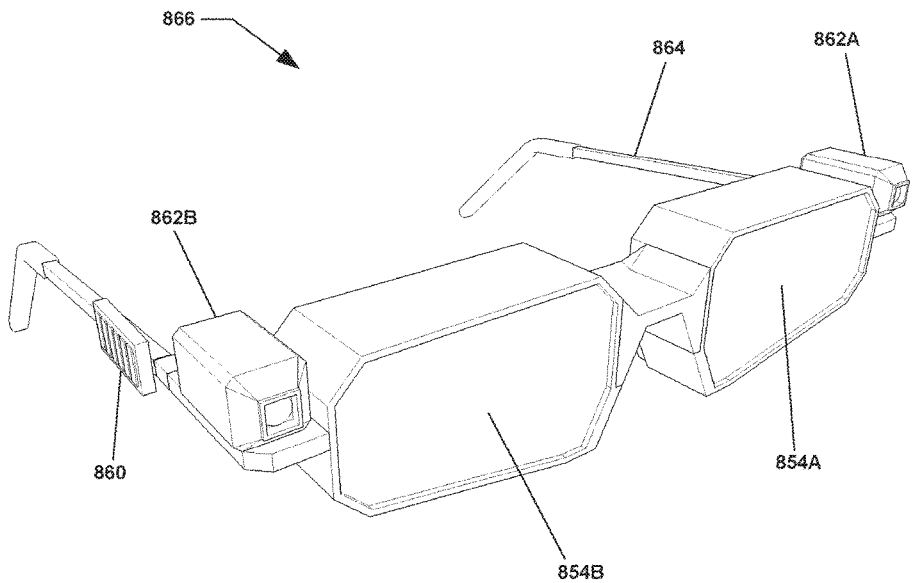
FIG. 8 shows an arrangement of an apparatus in perspective view.

Now with regard to FIG. 8, an apparatus may be implemented in many embodiments taking many forms. One such form is illustrated as an example in FIG. 8, in perspective view. Therein, the apparatus 866 is configured in the form of a head mounted display resembling a pair of glasses. The apparatus shown therein includes integrated display assemblies 854A and 854B, arranged such that when the apparatus 866 is worn the integrated display assemblies 854A and 854B would be disposed near to and in front of a viewer's eyes. Though not visible in FIG. 8, the integrated display assemblies 854A and 854B may include therein first optics, displays, second optics, first and second actuators, etc.

The apparatus 866 also includes a processor 860, and sensors 862A and 862B. A body 864 supports the integrated display assemblies 854A and 854B, processor 860, and sensors 862A and 862B so as to make the apparatus readily wearable in a useful fashion. It is emphasized that the arrangement shown in FIG. 8 is an example only, and that other configurations may be equally suitable.

Figure 9:
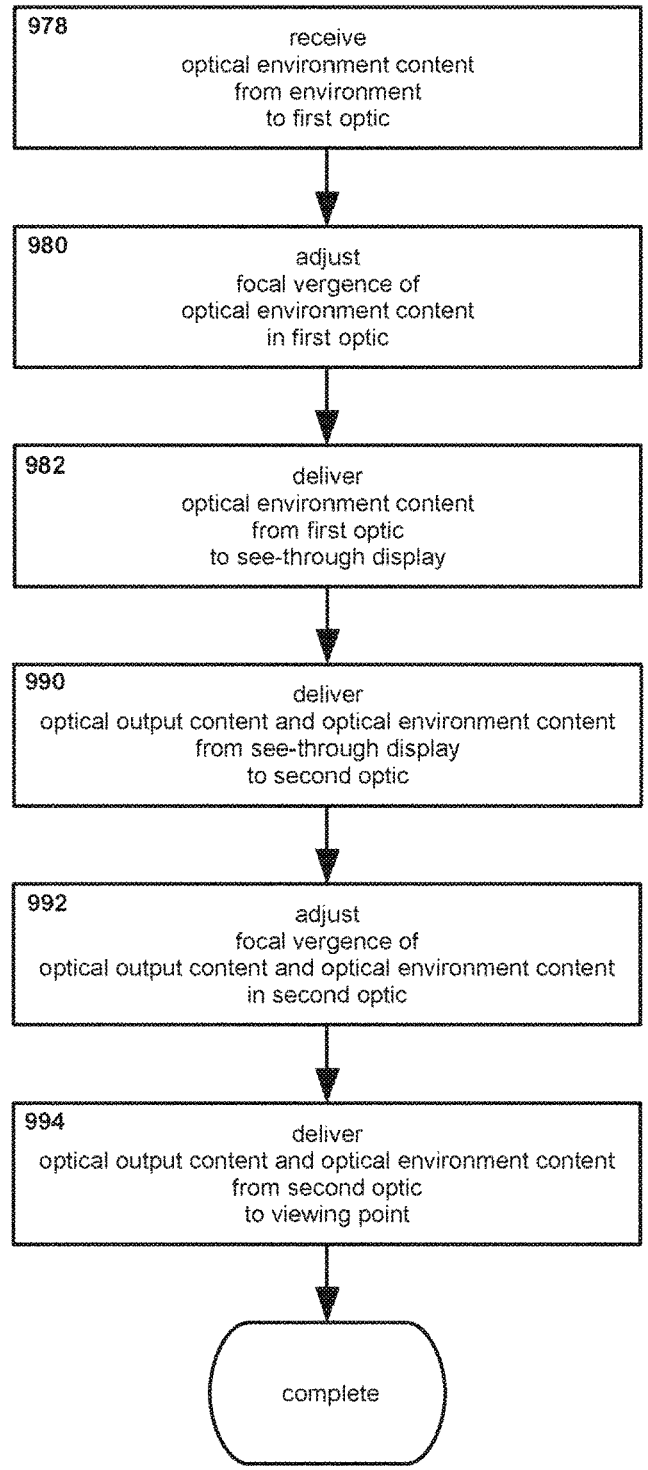
FIG. 9 shows an example method for controlling focal vergence.

Turning to FIG. 9, therein an example embodiment of a method is shown, in flow chart form.

In the method according to FIG. 9, optical environment content is received 978 from the environment to a first optic. As has been previously described herein with regard to apparatus embodiments, optical environment content may represent content not generated within the display system. For example, for a head mounted display optical environment content might include a view of the physical world surrounding the wearer of the head mounted display.

Continuing in FIG. 9, the focal vergence of the optical environment content is adjusted 980 in the first optic. Depending on the embodiment and other particulars, the focal vergence may be made more convergent or more divergent, and in varying amounts.

The optical environment content is delivered 982 from the first optic to a see-through display.

The optical environment content is then delivered 990 from the see-through display (e.g. passing therethrough) to a second optic. In addition, optical output content is also delivered 990 from the see-through display (e.g. generated and/or outputted by the display) to the second optic.

The focal vergence of both the optical output content and the optical environment content is adjusted 992 in the second optic.

The optical output content and optical environment content is then delivered 994 from the second optic to a viewing point. For example, the viewing point might be a location for a viewer to place his or her eyes so as to view the optical output content and optical environment content.

The method as shown in FIG. 9 is then complete. However, additional steps and/or repetition of steps already shown may be equally suitable for at least certain embodiments. (These and other comments as applied to FIG. 9 also may apply similarly to other methods shown and described herein.)

Likewise, as previously noted embodiments may include actuation of variable first and second optics, processor control of such actuation (e.g. wherein steps of adjusting focal vergence may be actively controlled within the processor), sensing of various parameters, etc.

In particular, different embodiments may vary in the particulars of the adjustment of focal vergences by the first and second optics in steps 980 and 992 (though other variations are not excluded).

For example, the focal vergence of the optical environment content as received in said first optic may be substantially equal to the focal vergence of said optical environment content as delivered from the second optic. That is, the focal vergence of the optical environment content may be substantially the same both before the first and second optics and after the first and second optics.

In addition or instead, the focal vergence of the optical output content as delivered from the second optic may be substantially equal to the focal vergence of the optical environment content as delivered from the second optic. That is, the focal vergences of the optical output content and optical environment content as delivered to the viewing point may be substantially the same.

The focal vergence of the output content as delivered from the see-through display may be substantially fixed. The focal vergence of the output content as delivered from the see-through display also or alternately may be substantially parallel.

With regard now to FIG. 10A through FIG. 10D, as described previously herein, certain embodiments may enable independent adjustment of the focal vergence (or more colloquially simply "the focus") of displayed optical content outputted from a display and the focal vergence of transmitted optical content passing through a display from an external environment. For certain previous examples, it has been considered that the entirety of the content may be so adjusted. That is, all of the displayed optical content and all of the transmitted optical content are adjusted together, so that the focal vergence of all displayed content is adjusted, and/or the focal vergence of all transmitted content is adjusted.

Uniformly refocusing all displayed content and/or uniformly refocusing all transmitted content may be useful in at least certain instances (and such uniform arrangements may be more simply described for illustrative purposes). However, it is not required that all displayed content be uniformly refocused, or that all transmitted content be uniformly refocused. Rather, some displayed content may be refocused while other displayed content is not refocused; likewise, some transmitted content may be refocused while other transmitted content is not.

One example arrangement for independently refocusing some optical display content and/or independently refocusing some optical environment content is to define a first optic, display, and/or second optic (as previously described) into regions, and adjust the optical content in those regions. To at least a certain degree, each region then may be considered to approximate a smaller version of an optic or display, and thus to perform at least somewhat similarly to the optics and displays as previously described herein. Thus with regard to FIG. 10A through FIG. 10D, certain details of functions already described with regard to a first optic, a see-through display, a second optic, and the behaviors and interactions thereof, may not be redundantly described in full.

Figure 10A:
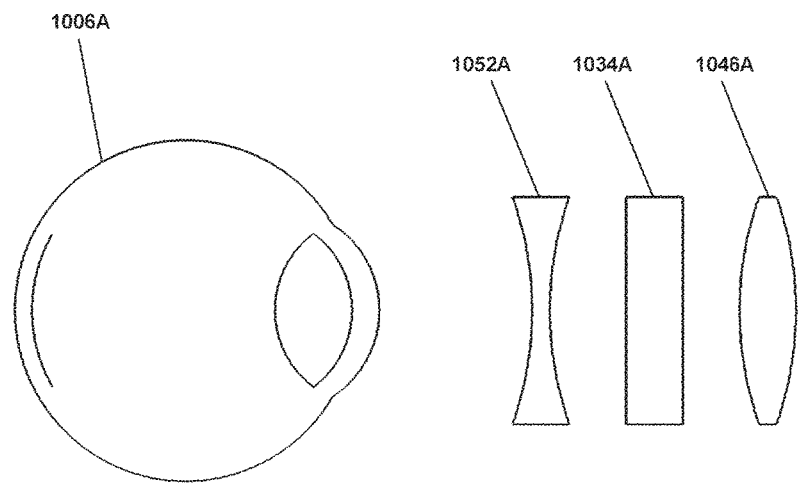
FIG. 10A shows an example arrangement of first optic, display, and second optic for controlling focal vergence.

Now specifically with reference to FIG. 10A, an arrangement similar to certain examples (such as FIG. 4D) is shown. An eye 1006A is shown, along with a first optic 1046A, a see-through display 1034A, and a second optic 1052A. (It is noted that embodiments are not limited only to an eye; a camera or other optical content receiver also may be suitable. For simplicity, certain examples herein refer to an eye, but substantially any device, system, etc. adapted to receive optical content may serve. In addition, it is emphasized that neither the eye 1006A nor any other optical content receiver is necessarily part of any given apparatus, and although an eye 1006A is shown in FIG. 10A and certain other examples for explanatory purposes it should not be considered to imply that the eye 1006A is or must be part of an apparatus. Although a camera (for example) could be incorporated into an apparatus, an apparatus in the form of a head mounted display (again as an example) may provide optical content to an eye without that eye or its owner being necessarily part of the apparatus in any sense.)

As has been described previously for other examples herein, in the arrangement of FIG. 10A optical environment content from an external environment may pass through both the first and second optics 1046A and 1052A to reach the eye 1006A, while optical display content provided by the display 1034A may pass through only the second optic 1052A to reach the eye. Thus through selection of the particular optical properties of the first and second optics 1046A and 1052A the focal vergences of optical environment content and optical display content may be independently adjusted.

However, as may be understood, if the first and second optics 1046A and 1052A are uniform, or behave uniformly with regard to affecting focal vergence, then typically the changes to focal vergence of optical environment content and optical display content likewise will be uniform. More colloquially, all the light passing through the first and second optics 1046A and 1052A from the environment will be refocused similarly, and all the light passing through the second optic 1052A only from the display 1034A will be refocused similarly; even if the environment content and display content are adjusted independently of one another, the changes in focus may be uniform in space.

Figure 10B:
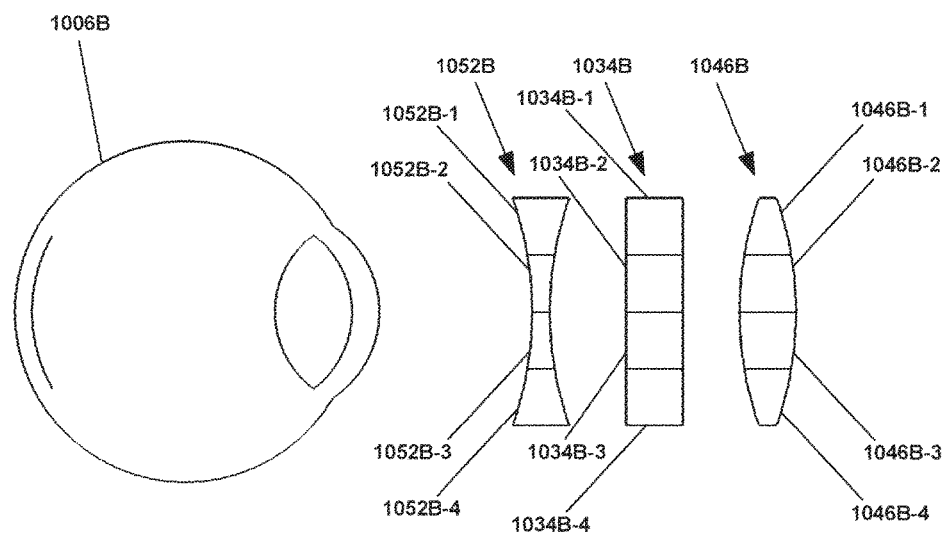
FIG. 10B shows an example arrangement of first optic with first optic regions, display with display regions, and second optic with second optic regions, for controlling focal vergence independently among the regions.

Turning to FIG. 10B, however, embodiments are not limited to such uniformity. Rather, changes in focal vergence may be varied across the field of view of the eye, as well as being different for the environment and display content.

In FIG. 10B, an arrangement at least somewhat similar to that of FIG. 10A is shown. In FIG. 10B, an eye 1006B is shown, along with a first optic 1046B, a see-through display 1034B, and a second optic 1052B. However, as may be seen the first optic 1046B is defined into four regions 1046B-1 through 1046B-4; similarly the display 1034B is defined into four regions 1034B-1 through 1034B-4 and the second optic 1052B is defined into four regions 1052B-1 through 1052B-4.

As previously noted, in the arrangement of FIG. 10A optical environment content from an external environment may pass through both the first and second optics 1046A and 1052A to reach the eye 1006A, while optical display content provided by the display 1034A may pass through only the second optic 1052A to reach the eye. Thus through selection of the particular optical properties of the first and second optics 1046A and 1052A the focal vergences of optical environment content and optical display content may be independently adjusted.

However, in the arrangement FIG. 10B the various regions of the first optic 1046B, display 1034B, and second optic 1052B may be adjusted independently of one another. For example, the changes to vergence imparted to optical content passing through the uppermost region 1046B-1 of the first optic 1046B may be different than the changes to vergence imparted to optical content passing through the next downward region 1046B-2 of the first optic 1046B. As a more concrete example, considering the first optic 1046B as a lens (or array of lenses), the uppermost region 1046B-1 and the next downward region 1046B-2 may exhibit different lens strengths and/or directions, applying different increases and/or decreases of convergence and/or divergence to light passing through those two regions 1046B-1 and 1046B-2. In more colloquial terms, each region 1046B-1 through 1046B-4 may act as a different and independent lens (or other optical element). Thus, the change in vergence as applied by the first optic 1046B may be spatially non-uniform, with each region 1046B-1 through 1046B-4 thereof being adapted to independently apply a different change in vergence.

The regions 1052B-1 through 1052B-4 of the second optic 1052B similarly are adapted to affect focal vergence independently of one another. Consequently, as delivered by the second optic 1052B (e.g. to the eye 1006B as shown in FIG. 10B) the changes in focal vergence of the optical environment content and the optical display content also may vary in a spatially independent manner, e.g. from one region to another.

Thus, for each region (or series of regions, as described in more detail below), the focal vergences of optical environment content and optical display content may be varied independently; and also, those focal vergences may be varied from one region to another.

Figure 10C:
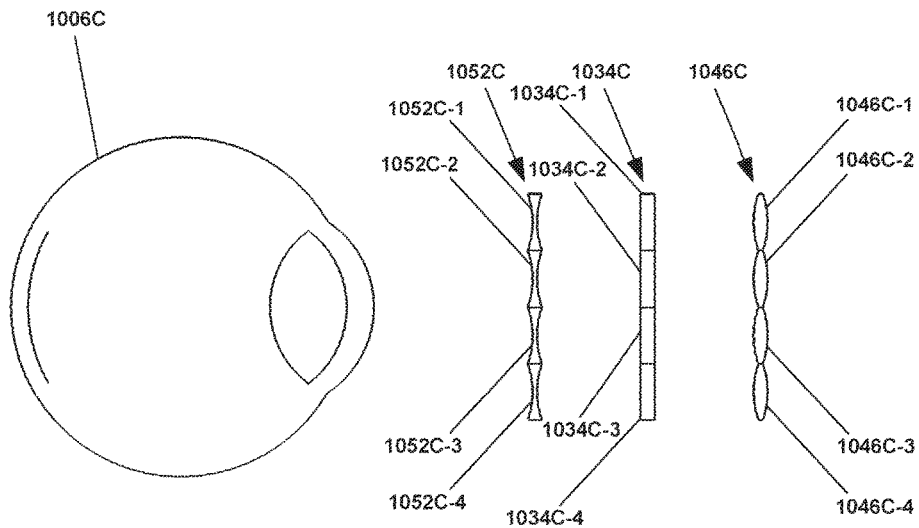
FIG. 10C shows another example arrangement of first optic with first optic regions, display with display regions, and second optic with second optic regions, showing regions as arrays of optics and displays.

Referring now to FIG. 10C, for illustrative purposes it may be useful to consider the first optic, display, and second optic not strictly as unitary (e.g. a first optic, a display, a second optic), but rather as being assemblies of smaller optics and displays, with each region thereof being its own independent optic and/or display. Such a depiction is presented in FIG. 10C.

As may be seen, FIG. 10C shows an eye 1006C, a first optic 1046C, a see-through display 1034C, and a second optic 1052C. As in FIG. 10B, the first optic 1046C is defined into four first optic regions 1046C-1 through 1046C-4, the display 1034C into four display regions 1034C-1 through 1034C-4, and the second optic 1052C into four second optic regions 1052C-1 through 1052C-4.

For explanatory purposes, each of the first optic regions 1046C-1 through 1046C-4 is illustrated as a smaller individual double-convex lens; each of the display regions 1034C-1 through 1034C-4 is illustrated as a smaller individual see-through display; and each of the second optic regions 1052C-1 through 1052C-4 is illustrated as a smaller individual double-concave lens.

Certain embodiments may literally use such an arrangement as that shown in FIG. 10C, wherein for some or all of the first optic 1046C, a see-through display 1034C, and a second optic 1052C the regions thereof are physically distinct smaller optics and/or displays. For example, it may be suitable in certain embodiments for the first optic 1046C and/or the second optic 1052C to be formed of arrays of microlenses, such that each of the first optic regions 1046C-1 through 1046C-4 and the second optic regions 1052C-1 through 1052C-4 is represented by a microlens in the respective array.

However, although such arrangements of distinct lenses and/or displays may be useful for certain embodiments, embodiments are not limited only to distinct lenses and/or displays. For example, certain liquid optical elements, deformable optical elements, etc. may be adapted to manifest different focal properties in different areas, e.g. by changing shape across the lenses' surfaces so as to converge weakly in one region, converge strongly in another region, diverge in yet another region, leave still another region unadjusted, etc. The manner by which variable convergence in different regions of a first and second optic 1046C and 1052C is not limited, so long as the functions described are enabled.

In addition, it is noted that the distinction between one element that is variable across its dimensions and an array or assembly of smaller elements may be at least somewhat flexible in any event. For example, a see-through LED display may be suitable for use as the display 1034C shown in FIG. 10C. However, what is sometimes colloquially referred to as a display, singular, may be formed of many individual LEDs arranged in a rectilinear array. Even if the individual LEDs may be too small to be readily distinguished by casual examination, in a strict sense it may be as reasonable to refer to "the" LED display as "an array" of LEDs. Thus, again, the elements are to be understood functionally; whether a given "display" in an embodiment is a unitary display that may vary output across the surface thereof, or an arrangement of smaller displays that each may vary output, is at best incidental, so long as regions may be defined wherein the optical content may be outputted/controlled independently (and likewise with regard to first and second optics).

Also, it is emphasized that the optical environment content and optical display content may be adjusted in one or more regions substantially independently of other regions, ideal or perfect independence is not required. For example, a first or second optic that includes a liquid lens or deformable lens may not deform completely independently in different regions thereof. As a more concrete example, a deformable lens split into upper and lower regions may approximate one curvature in the upper region, and a different curvature in the lower region, but the transition between regions may be imperfect, and even the curvature well within the regions themselves may be imperfect. Perfection is not required. So long as one region may be adjusted to provide a different change in focal vergence to light passing therethrough from the change in focal vergence provided by a different region, the regions may be understood as being at least substantially independent with regard to adjusting focal vergence. (Other standards may be imposed, for example for certain embodiments it may be desirable that the various regions adjust focal vergence such that a viewer is unable to tell that the regions are not perfectly independently variable, or such that the viewer is not distracted by the regions not being perfectly independently variable, etc.)

Figure 10D:
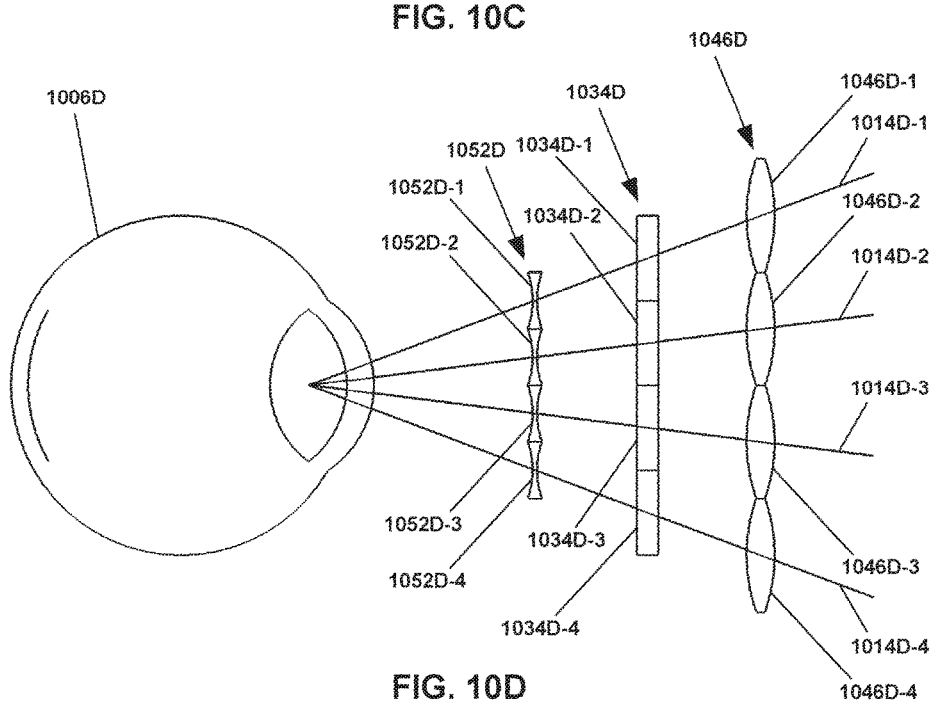
FIG. 10D shows an example arrangement of first optic with first optic regions, display with display regions, and second optic with second optic regions, with optics, display, and regions thereof sized for converging target lines.

Now with reference to FIG. 10D, for clarity the first optic, display, and second optic in certain examples herein have been shown in simple linear arrangements; that is, the first optic, display, and second optic may be illustrated as being of equal size, the respective regions of the first optic, display, and second optic may be illustrated as being of equal size, etc. However, while convenient for explanatory purposes such arrangements may not be (and are not required to be) true in practice, for all embodiments.

In FIG. 10D, an arrangement is shown with an eye 1006D, a first optic 1046D defining four first optic regions 1046D-1 through 1046D-4, a see-through display 1034D defining four display regions 1034D-1 through 1034D-4, and a second optic 1052D defining four second optic regions 1052D-1 through 1052D-4. However, as may be seen, the first optic 1046D, see-through display 1034D, and second optic 1052D and respective regions thereof are not all of equal size. Rather, the display 1034D and display regions 1034D-1 through 1034D-4 are smaller than the first optic 1046D and first optic regions 1046D-1 through 1046D-4, and the second optic 1052D and second optic regions 1052D-1 through 1052D-4 in turn are smaller than the display 1034D and display regions 1034D-1 through 1034D-4.

However, even though the first optic 1046D and first optic regions 1046D-1 through 1046D-4, display 1034D and display regions 1034D-1 through 1034D-4, and second optic 1052D and second optic regions 1052D-1 through 1052D-4 are not of equal size, nevertheless the respective regions correspond with one another.

As may be seen, several target paths 1014D-1 through 1014D-4 are shown in FIG. 10D. The target paths 1014D-1 through 1014D-4 show example paths along with optical content (e.g. light) may pass in reaching the eye 1006D. The first optic regions 1046D-1 through 1046D-4, display regions 1034D-1 through 1034D-4 second optic 1052D and second optic regions 1052D-1 through 1052D-4 may be seen to correspond, in that if a given target path 1014D-1 through 1014D-4 is oriented through a given display region 1034D-1 through 1034D-4, that target path 1014D-1 through 1014D-4 is also orientated through a corresponding first optic region 1046D-1 through 1046D-4 and a corresponding second optic region 1052D-1 through 1052D-4. As a more concrete example, consider the uppermost target path 1014D-1 shown in FIG. 10D. That target path 1014D-1 passes through display region 1034D-1; with the target path 1014D-1 passing through display region 1034D-1, that target path also passes through first optic region 1046D-1 and second optic region 1052D-1; thus first optic region 1046D-1, display region 1034D-1, and second optic region 1052D-1 may be said to correspond with one another.

However, although the arrangement in FIG. 10D shows one-to-one correspondence as an example—that is, each of the display regions 1034D-1 through 1034D-4 corresponds with exactly one of the first optic regions 1046D-1 through 1046D-4 and exactly one of the second optic regions 1052D-1 through 1052D-4—this is not required and should not be understood as limiting. For example, one display region could correspond with several first and/or second optic regions, one part of a display region could correspond with one first optic region while another part of the display region corresponds with a different first optic region, etc.

Typically, though not necessarily, first and second optic regions may correspond one-to-one. Such an arrangement may facilitate convenient changes to the optical environment content and optical display content in those regions. For example, if the aim for a given embodiment is to adjust the vergence of optical display content to match the vergence of optical environment content, then a one-to-one correspondence between regions of the first optic (which affect the vergence of the environment content but not the display content) with the regions of the second optic (which affect the vergence of both the environment content and the display content) may be useful. If the display itself is providing rather than modifying content however, a one-to-one correspondence between display regions and first and/or second optic regions may be of less significance. Regardless, so long as the specified functions are carried out, substantially any form and degree of such correspondence may be suitable.

Likewise, although for simplicity the target paths 1014D-1 through 1014D-4 shown in FIG. 10D are both linear and convergent on the center of the lens of the eye 1006D, these are examples only. In other embodiments a first optic, display, and/or second optic (and/or regions thereof) may affect a target path so that the target path is non-linear; for example, a prism or reflector could redirect or split light following the target path, and thus the target path itself may be redirected or split, etc.

As may be understood, a "target path" is in some sense an abstraction, referring to a direction of interest toward some target of consideration, whether that target is a feature of the environment, a displayed object, the direction in which the viewer is looking, the direction towards a hand the viewer is using to interact with the system, etc. In certain instances, it may be useful to distinguish among several different types, e.g. referring to a target path as general to some unspecified target, an environment path targeting some feature in the environment, a display path targeting some displayed entity, a sight path referring to a direction in which the viewer is looking, an interaction path targeting a viewer's hand (or other target of interaction), etc.

In addition, it is also noted that the arrangement of the first optic regions 1046D-1 through 1046D-4, display regions 1034D-1 through 1034D-4, and second optic regions 1052D-1 through 1052D-4 as shown in FIG. 10D is linear and continuous, but again this should not be understood as limiting. In other embodiments, the first optic regions 1046D-1 through 1046D-4, display regions 1034D-1 through 1034D-4, and second optic regions 1052D-1 through 1052D-4 may for example be curved in one or two dimensions, so as to approximate sections of a cylinder or sphere (or some other non-linear geometry); likewise the first optic regions 1046D-1 through 1046D-4, display regions 1034D-1 through 1034D-4 second optic 1052D and second optic regions 1052D-1 through 1052D-4 may be non-continuous, for example having gaps between regions.

Figure 11A:
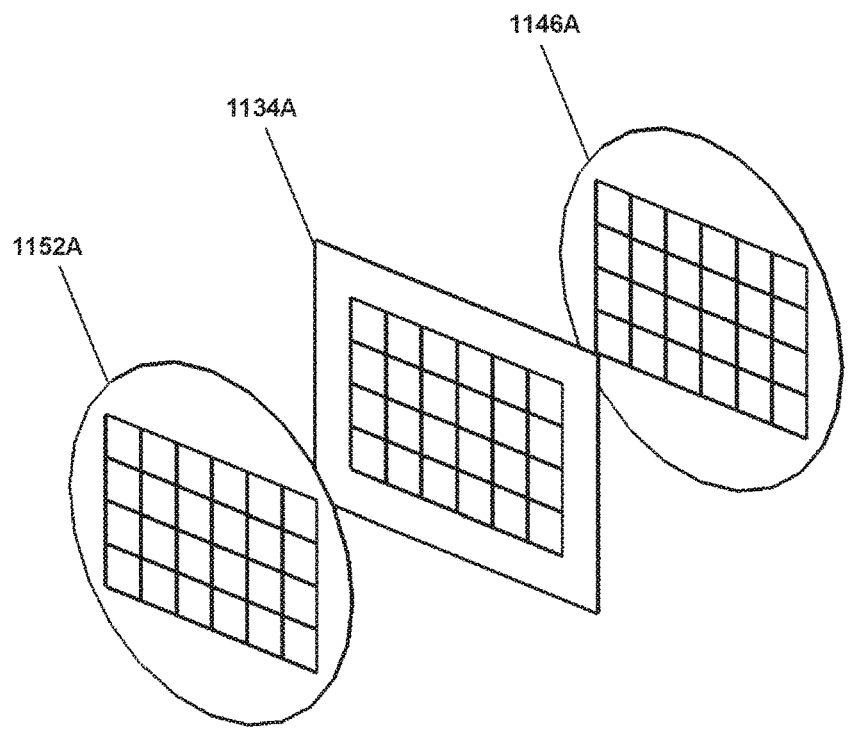
FIG. 11A shows an example arrangement of first optic with first optic regions, display with display regions, and second optic with second optic regions, with the regions disposed in 4×6 arrays.

With regard to FIG. 11A, a first optic 1146A (illustrated as a circular lens with square regions defined therein), a see-through display 1134A (illustrated as a rectangular framed display with square regions defined therein), and a second optic 1152A (illustrated as a circular lens with square regions defined therein) are shown therein in perspective view. As may be seen, the first optic 1146A, see-through display 1134A, and second optic 1152A are essentially "stacked", that is, arranged one in front of another. From the perspective of a viewer (not shown), the first optic 1146A, see-through display 1134A, and second optic 1152A and regions thereof may overlap; thus the viewer may not visually distinguish between content from or changes in the first optic 1146A, see-through display 1134A, and second optic 1152A, rather perceiving optical display content and optical environment content as overlapping and part of "the same view".

As noted previously first optic regions, display regions, and second optic regions may take many forms and configurations. Where certain previous examples showed a linear top-to-bottom arrangement of regions, In FIG. 11A a first optic 1146A is shown with a four by six array of square first optic regions (not individually numbered), a see-through display 1134A is shown with a four by six array of square display regions (not individually numbered), and a second optic 1152A is shown with a four by six array of square second optic regions (not individually numbered). Similar four by six arrays of regions are referenced in certain examples that follow.

As described previously, the first optic 1146A, display 1134A, and second optic 1152A are adapted to cooperate such that in corresponding regions, the focal vergence of optical environment content and the focal vergence of optical display content may be adjusted independently; and also independently among the various regions. Thus, for example, the focal vergence of optical display content displayed in the upper left most region of the display 1134A and passing through the upper left most region of the second optic 1152A may be adjusted independently of optical environment content passing through the upper left most regions of the first optic 1146A, display 1134A, and second optic 1152A, and independently of changes to focal vergence (if any) in other regions.

Figure 11B:
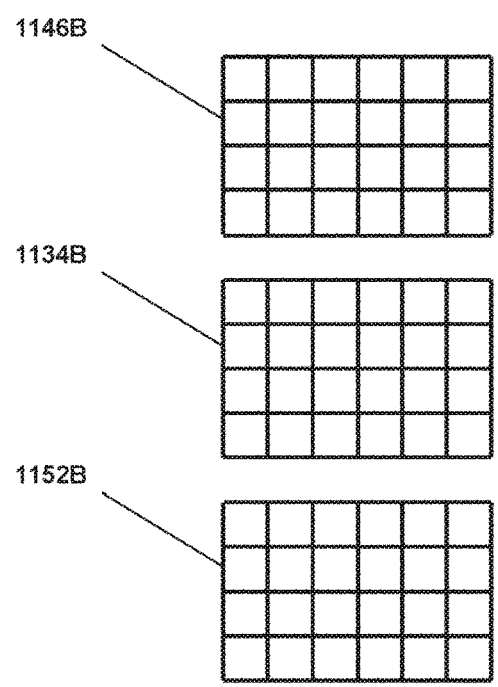
FIG. 11B shows an example arrangement of abstracted 4×6 arrays representing first optic regions, display regions, and second optic regions.

Now with reference to FIG. 11B, for descriptive purposes regarding changes to optical content (e.g. changing the focal vergence of optical display content and/or optical environment content, etc.), it may not be necessary to show an entire lens, display unit, etc. Rather, the first optic 1146B, display 1134B, and/or second optic 1152B may be abstracted to arrays of regions wherein such changes may take place. While such regions may not necessarily encompass the entirety of the first optic 1146B, display 1134B, and/or second optic 1152B, if no changes are made elsewhere (and/or if the first optic 1146B, display 1134B, and/or second optic 1152B are not adapted to make changes elsewhere) then it may be sufficient merely to consider the regions themselves for discussion. Thus, as shown in FIG. 11B only the arrays of regions of the first optic 1146B, display 1134B, and/or second optic 1152B are shown.

In addition, as noted with regard to FIG. 11A, a first optic, see-through display, and second optic may not be visually distinguished from one another as seen by a viewer. Thus from the perspective of the viewer, when referring to changes to optical content passing through a first optic, see-through display, and second optic, it may be sufficient to refer to what reaches the viewer via the second optic (typically closest to the eye or other optical content receiver, as shown in various examples herein). In addition, as noted regions of a second optic correspond with regions of a display and a first optic. Thus for simplicity, as shown in FIG. 11C the effects applied to optical content may be shown with regard to the second optic 1152C and second optic regions thereof 1152C-11 through 1152C-64 (as numbered in FIG. 11C), even though as described previously herein certain effects may be actually taking place in a first optic, see-through display, etc. (and thus it could be equally appropriate to define the entire effect with regard to the regions of a first optic, display, etc.).

Turning now to FIG. 12A, and in keeping with the arrangement described with regard to FIG. 11C, a second optic 1252A and second optic regions 1252A-11 through 1252A-64 are shown therein. (As may be understood, the numbering of the individual second optic regions follows a Cartesian scheme, wherein the first of the two suffix digits refer to the horizontal position and the second refers to the vertical position, considering the lower left corner of the display to be the origin for purposes of reference.)

Arrangements for and effects of independently adjusting the focal vergence of optical environment content and optical display content have been described in detail previously herein. With regard to FIG. 12A and certain subsequent figures, independent changes to properties among different regions is addressed. Thus, specifics of whether focal vergence of optical display content is being adjusted and to what degree, whether focal vergence of optical environment content is being adjusted and to what degree, etc. may not be repeated here.

In the arrangement shown in FIG. 12A, adjustments to focal vergence similar to certain previous examples is shown. Namely, as viewed through the second optic 1252A, the focal vergence of optical content passing therethrough has been changed (whether in the first optic, display, or second optic 1252A) in some manner represented by the marking $F_1$; and the focal vergence has been changed similarly in some manner $F_1$ for all of the second optic regions 1252A-11 through 1252A-64. That is, optical content has been adjusted uniformly across the entire second optic 1252A; from the point of view of a viewer, essentially everything that they see through the second optic 1252A has been adjusted in focal vergence. As a more concrete example, all optical display content may be shifted in focal vergence to match some particular depth, such as one corresponding with the focal vergence of optical environment content (or some portion thereof).

Figure 12B:

Moving on to FIG. 12B, however, as noted for each corresponding set of regions (e.g. a display region, a corresponding first optic region, and a corresponding second optic region), the focal vergence of optical display content and optical environment content may be adjusted independently not only of one another but also independently among the various corresponding sets of regions. Thus as seen in FIG. 12B, a second optic 1252B is shown with second optic regions 1252B-11 through 1252B-64; a single second optic region 1252B-53 exhibits a change to focal vergence indicated by $F_1$, however none of the other regions 1252B-11 through 1252B-52 and 1252B-54 through 1252B-64 exhibit changes in focal vergence. More colloquially, region 1252B-53 has been refocused, but the rest of the field of view has not been. Thus, region 1252B-53 has been adjusted in focus per $F_1$ (whatever the particulars of $F_1$ may be, e.g. optical display content aligned with region 1252B-53 may be matched in focal vergence with optical environment content aligned with region 1252B-53, so that the two appear to be at similar depths from the viewer), and has been so adjust in focus independently among the remaining regions of the second optic 1252B.

Which regions may be adjusted, how many, in what configuration, and in how many different focal vergence adjustments $F_1$, is not limited.

Figure 12C:

For example, turning to FIG. 12C, a second optic 1252C is shown with second optic regions 1252C-11 through 1252C-64. As in FIG. 12B region 1252C-53 is adjusted in focus per $F_1$. However, in FIG. 12C the surrounding regions 1252C-42 through 1252C-44, 1252C-52, 1252C-54, and 1252C-62 through 1252C-64 also have been adjusted in focus similarly per $F_1$.

As another example, in FIG. 12D a second optic 1252D is shown with second optic regions 1252D-11 through 1252D-64. As in FIGS. 12B and 12C region 1252D-53 is adjusted in focus per $F_1$; as in FIG. 12C the surrounding regions 1252D-42 through 1252D-44, 1252D-52, 1252D-54, and 1252D-62 through 1252D-64 have been adjusted in focus as well, but in FIG. 12D regions 1252D-42 through 1252D-44, 1252D-52, 1252D-54, and 1252D-62 through 1252D-64 have been adjusted per $F_2$, not per $F_1$.

The number of possible permutations is extremely large, and is not limited. Thus, an arrangement such as shown in FIG. 12E also may be considered; each of the second optic regions 1252E-11 through 1252E-64 is adjusted in focal vergence per some change $F_{11}$ through $F_{64}$ respectively; no two regions are adjusted in focus identically. While it is not required that a particular embodiment be physically capable of applying unique changes in focal vergence to every region individually, such capability is not excluded, and certain embodiments may indeed have and use such capability. (It is noted also that focal vergence is not required to change in any or all regions; thus, for example, $F_{52}$ could represent a "null case" with no change in focal vergence, as could any other F value shown.)

The arrangements shown in FIG. 12A through FIG. 12E are examples only, and other arrangements may be suitable. For example, all regions along a vertical or horizontal line may be adjusted (and/or may be adjusted equally), concentric rings of regions may be adjusted (and/or may be adjusted equally), etc. In addition, as noted arrangements of regions are not limited only to rectilinear arrays, thus embodiments may include permutations considering hexagonal arrays, radial arrays, other arrangements, etc.

In addition, the particulars of any given focal vergence adjustment (e.g. $F_1$, $F_2$, etc.) are not limited. Various arrangements of independent changes to the focal vergences of optical display content and optical environment content have been described previously, and similar arrangements (including arrangements not explicitly presented as examples) may be applied to each individual focal vergence adjustment for each region.

Furthermore, the reasons, mechanisms, and/or methods by which certain regions are selected for focal vergence adjustment are not limited, and may vary considerably.

For example, a region or regions may be adjusted based on where the viewer is looking (e.g. with the user's eye orientation having been determined through the user of a sensor, or otherwise acquired). As the ability of the human eye to discern fine details is limited to a relatively narrow region in the central vision, changes in focal vergence that provide for sharp detail (such as "bringing something into focus") may only be discerned by a viewer in one or a few regions. By adjusting focal vergence in only one or a few regions, it may not be necessary to devote processing power to determine suitable focal vergence changes in other regions, to devote electrical power (or other resources) to actually change the optical properties of the first and/or second optic for those regions, etc.

As another example, a region or regions may be adjusted based on whether there is content displayed in those regions. As a more concrete example, if focal vergence changes are applied to match the focal vergence of what is shown on the display to the background in the environment, then if no content is being displayed in a region there may be no need to adjust the focal vergence in that region.

As yet another example, a region or regions may be adjusted based on whether a user is interacting with something in those regions. For example, if images provided by the display represent an interactive augmented reality object, the viewer may "grab" that augmented reality object, manipulate it, etc. It may be useful to ensure that, for example, the displayed object (optical display content) exhibits the same or a similar focal vergence as the user's hand (which in this instance may be considered optical environment content, forming part of the background for the displayed content), so that the viewer may focus on both the augmented reality object and his or her hand together.

As another example, it may be useful simply to provide what amount to adaptive corrective lenses. As noted previously with regard to embodiments exhibiting uniform changes in focal vergence (rather than independent regions), various embodiments may act in effect as corrective lenses, changing the focal vergence of both optical environment content and optical display content to match the particulars of a given viewer's vision. Similar functions also may be useful with different changes to focal vergence being applied to various independent regions. For example, conventional bifocal lenses exhibit one focus change in one part of the lenses (e.g. for close viewing), and a different focus change in another part of the lenses (e.g. for distant viewing). It may be useful to control the focal vergence of different regions in similar fashion in various embodiments, for example providing a larger or smaller close viewing area (or configuring all or none of a given optic for close viewing) depending on the viewer's preferences, local conditions, etc. Such an arrangement may be considered "active bifocals", or "active prescription lenses", etc.

As still another example, a region or regions may be adjusted based on the environment, for example what objects are present in the environment, what actions are taking place in the environment, etc. Changes in focus may in at least some instances be eye-catching in themselves; thus, changing the focal vergence of some portion of the environment, of the display over some portion of the environment, or both may draw attention to that region. (Conversely, defocusing regions may draw attention away from regions. Such an arrangement may help soften visible transitions, such as the screen edge, the overlap between stereo displays, etc.) As a more concrete example, some change to focal vergence may be applied in a region where a stop light is present in the environment, so as to emphasize that stop light, etc.

Other reasons and approaches also may be equally suitable. In addition, any or all of such reasons may be combined; for example, a particular embodiment may adjust focal vergence for any region(s) that the user is looking at, and also for any regions where content is being displayed, etc.

As previously noted, changes in focal vergence may be useful for emphasizing and/or deemphasizing regions and/or features therein. In addition, embodiments may include other arrangements for affecting optical display content and/or optical environment content, whether for emphasis, de-emphasis, or some other end. For example, in addition to or in place of varying the focal vergence of optical display content and/or optical environment content, it may also be suitable to modify optical environment content in some other fashion, and/or to alter optical display content in some other fashion. (For clarity, changes to optical environment content other than adjustments to focal vergence typically are referred to herein as "modifications". Likewise, changes to optical display content other than adjustments to focal vergence are referred to herein as "alterations". As noted previously, changes to focal vergences typically are referred to herein as "adjustments".)

Figure 13A:
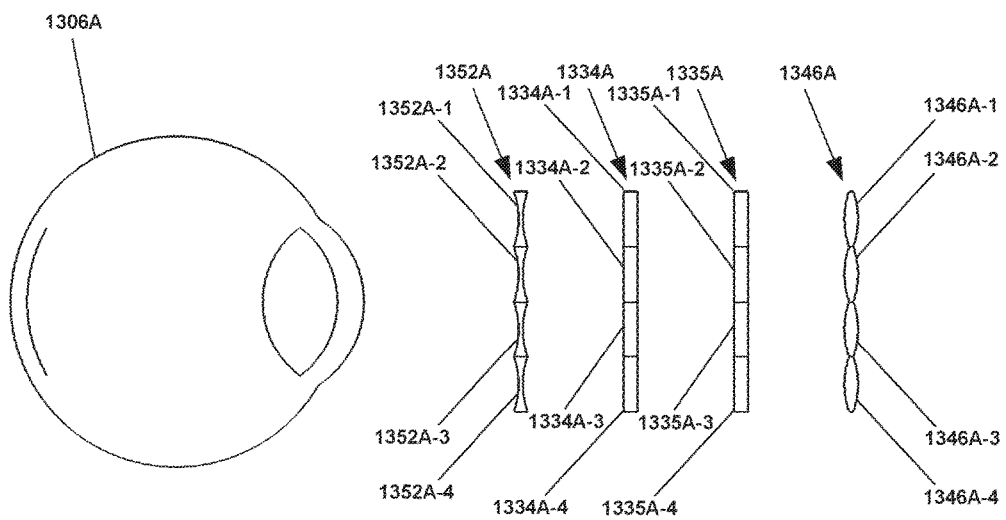
FIG. 13A shows an example arrangement of first optic with first optic regions, modifier with modifier regions, display with display regions, and second optic with second optic regions, for controlling focal vergence and optical environment content modification independently among regions.

Now with reference to FIG. 13A, an arrangement is shown that includes a first optic 1346A with first optic regions 1346A-1 through 1346A-4, a see-through display 1334A with display regions 1334A-1 through 1334A-4, and a second optic 1352A with second optic regions 1352A-1 through 1352A-4, disposed with respect to an eye 1306A. Similar arrangements have been shown and described previously herein.

However, in addition FIG. 13A shows a modifier 1335A, with modifier regions 1335A-1 through 1335A-4. The modifier 1335A is an element that in some manner changes light from the environment that passes therethrough. For example, the modifier 1335A may be or include a layer of film that darkens when an electrical voltage is applied; in such instance, optical environment content passing through the modifier 1335A may appear darker than otherwise would be the case. Typically though not necessarily, the modification will be variable. To continue the example of darkening, in certain embodiments optical environment content may be darkened not at all, to lesser or greater degrees, or may be completely blacked out. For example in the case of an electrically darkening film as referenced above, an analog-responsive film may be used wherein different applied voltages yield different levels of darkening, pulse width modulation may be used with a binary state film (either on or off, fully black or fully clear), etc. However, the arrangements for accomplishing and controlling such darkening (and likewise other modifications) are not limited.

In addition, while a modifier that darkens optical environment content may be suitable in certain embodiments, other arrangements also may be suitable. For example, content may be lightened or faded out, e.g. with a modifier that is or includes a partially reflective layer. Also, although it may be convenient in certain instances to consider or refer to the modification to be a "passive" effect such as shading or lightening the appearance of the environment, more active effects also may be suitable. For example, the modifier 1335A in FIG. 13A may be or include a display that saturates colors in the environment (as seen by the viewer), desaturates colors, speckles, applies "motion blur" or other visual effects, applies outlining or highlighting to features in the environment, etc. Other effects and arrangements also may be suitable.

Moreover, embodiments are not necessarily limited to only one type of modification, or to one modifier 1335A. A given embodiment may be adapted to darken optical environment content and to desaturate colors therein, for example.

As shown in FIG. 13A, the modifier 1335A defines four modifier regions 1335A-1 through 1335A-4 therein. As already described with regard to changing focal vergences independently in various first and second optic regions, the modifier 1335A may be adapted to apply modifications in various modifier regions 1335A-1 through 1335A-4 substantially independently among the modifier regions 1335A-1 through 1335A-4. Thus, uppermost region 1335A-1 may be completely blacked out, while region 1335A-2 is darkened but not fully blacked out, and regions 1335A-3 and 1335A-4 are left undarkened. As with independence in varying focal vergences, it is not required that the modifier regions 1335A-1 through 1335A-4 be perfectly or absolutely independent in darkening (or some other modification), only that modifier regions be adapted to modify independently to some notable degree. Thus, in certain embodiments it may be suitable if activating the modifier 1335A at all darkens all regions by (for example) 10%, with the regions thereof then being modifiable so as to be darkened from 10% to 100%; or if darkening any one region of the modifier 1335A requires darkening adjacent regions to a lesser degree, etc.

As may be seen in FIG. 13A, the modifier 1335A therein is shown as distinct from the display 1334A. While this may be true for certain embodiments, a modifier 1335A and display 1334A are not required to be distinct, either physically or operationally. For example, a see-through display 1334A may itself have a capability to darken or otherwise modify optical environmental content passing therethrough. Conversely, the modifier 1335A may itself be in at least some sense considered a display (for example desaturating colors by applying other colors to "grey out" optical environment content). Nevertheless for clarity the functions of displaying optical display content in a display 1334A, and of modifying optical environment content in a modifier 1335A, typically are referred to as distinct, and being provided by distinct elements. In practice however, a display and modifier may not be distinct elements, and functions thereof may not be distinct functions.

In addition as shown the modifier 1335A is disposed between the display 1334A and the first optic 1346A. Which such an arrangement may be suitable, this is an example only. Alternately, the modifier 1335A could be disposed to the right of the first optic 1346A, so that optical environment content passes through the modifier 1335A before reaching the first optic 1346A. Other arrangements also may be suitable.

Figure 13B:
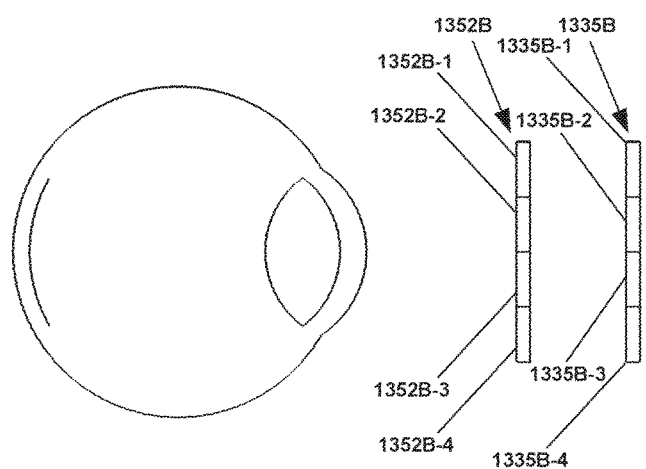
FIG. 13B shows an example arrangement of modifier with modifier regions and display with display regions for controlling optical environment content modification independently among regions.

Turning now to FIG. 13B, as may be understood arrangements for modifying optical environment content may be implemented in certain embodiments even without arrangements for varying the focal vergences of optical environment content and/or optical display content. Thus, embodiments may display content and shadow (or otherwise modify) the background, whether or not the embodiment in question affects apparent focus. Such an arrangement is shown in FIG. 13B. (In principle variable shadowing or other modification may be implemented even without a display.

As may be seen, in FIG. 13B a see-through display 1334B with display regions 1334B-1 through 1334B-4 and a modifier 1335B with modifier regions 1335B-1 through 1335B-4 are shown, disposed with respect to an eye 1306B. As may be understood, lacking first and second optics such an arrangement may not be adapted to adjust focal vergences, nevertheless such an arrangement may deliver optical display content from the display 1334B to the eye 1306B, and pass optical environment content through the modifier 1335B and the display 1334B to the eye 1306B.

Turning to FIG. 14A, certain functions of a modifier as visible to the viewer's eye (or some other optical content receiver) may be shown in similar manner to the effects of changing focal vergence (e.g. in FIG. 12A through FIG. 12E). Thus in FIG. 14A, an example arrangement is shown that considers a first optic, modifier, see-through display, and second optic in a uniform stack, each defining an array of four by six square regions. As may be understood, regions of the modifier may correspond with regions of the first and second optics and display, as previously described.

Also, as in FIG. 12A through FIG. 12E, from the point of view of a viewer the second optic may be closest to the eye, thus for convenience the array and regions illustrated in FIG. 14A are referred to as the second optic 1452A and second optic regions 1452A-11 through 1452A-64. However, this is presented for purposes of explanation only; it may be equally suitable to refer to the first optic and regions thereof, the display and regions thereof, the modifier itself and regions thereof, etc. Moreover, for embodiments lacking a first and/or second optic, there may be no first or second optic regions to reference. However, as may be understood a modifier may define regions likewise, and thus the description that follows also may apply to such embodiments (e.g. by considering modifier regions directly, rather than second optic regions corresponding with modifier regions). Nevertheless, it should be understood that even if output is shown for illustrative purposes (e.g. in FIG. 14A through FIG. 14D) as being visibly aligned with second optic regions, it should not be considered that modification must or even necessarily can be accomplished in the second optic or regions thereof; rather, the modifier applies the modification to the optical environment content, as previously described.

In the arrangement of FIG. 14A, a modification to optical environment content in one region 1452A-53 is shown, as represented by the marking $M_1$. This modification $M_1$ may include a darkening of the optical environment content passing through the modifier ("shadowing" some part of the environment, from the perspective of the viewer), but other modifications may be suitable. As seen, the modification $M_1$ is applied only in region 1452A-53; the remaining regions are not so modified (or otherwise modified by the modifier).

Thus as may be understood, the optical environment content is modified in some manner $M_1$ independently for region 1452A-53, as compared with other regions.

Many configurations of modification may be suitable. Uniform modification of all regions may be enabled for at least certain embodiments; considering shading as an example modification, such an arrangement may equate to simply disposing a uniform dark filter between the environment and the viewer, analogous to wearing sunglasses. Likewise, uniformly absent modification may be enabled for at least certain embodiments; such may equate to simply not having a modifier present at all. Such simple bounding cases may be readily understood, and are not illustrated.

However, turning to FIG. 14B, as may be seen the optical environment content in different regions may be modified independently, with certain regions having one modification, certain regions another, and yet other regions no modification. One such arrangement is shown in FIG. 14B. A second optic 1452B is shown with an array of second optic regions 1452B-11 through 1452B-64. As may be seen, one modification $M_1$ to optical environment content is applied in a modifier region corresponding with second optic region 1452B-53; a different modification $M_2$ to optical environment content is applied in modifier regions corresponding with second optic regions 1452B-42 through 1452B-44, 1452B-52 and 1452B-52, and 1452B-62 through 1452B-64; and no modification to optical environment content is applied in the remaining modifier regions.

As a more concrete example, the modification $M_1$ may represent a strong darkening of optical environment content as visible in second optic region 1452B-53, with the modification $M_2$ representing a weaker darkening visible in the eight second optic regions surrounding second optic region 1452B-53.

Now with reference to FIG. 14C, as another example a second optic 1452C is shown with second optic regions 1452C-11 through 1452C-64; wherein a first modification $M_1$ is made to optical environment content in modifier regions corresponding with second optic regions 1452C-14 through 1452C-64 (the top row of the array), and a second modification $M_2$ is made to optical environment content in modifier regions corresponding with second optic regions 1452C-13 through 1452C-63 (the second-to-top row of the array). To continue the example of darkening, the arrangement in FIG. 14C could represent a strong darkening along the top edge of the field of view, with darkening becoming less pronounced and disappearing altogether lower in the field of view.

Other arrangements than those shown may be equally suitable. As noted with regard to FIG. 12E, the number of possible permutations is extremely large, and is not limited. FIG. 14D for example shows an arrangement wherein the optical environment content is modified in some manner $M_{11}$ through $M_{64}$ in regions corresponding with each of second optic regions 1452D-11 through 1452D-64, with no two regions necessarily being modified identically. Again, although such capability is not required for all embodiments, embodiments are not limited with regard to how many regions may be present, how many regions may apply modifications, how many different modifications may be applied, etc.

Indeed, it is noted that a modifier may have a degree of "resolution" such that individual modifier regions are comparable with or equal in size to pixels in a corresponding see-through display (or even smaller). Although for simplicity regions of first optics, modifiers, see-through displays, and second optics are shown as being relatively few in number, the number of regions for any such element is not limited. In particular, regions may be extremely small, being on the scale of or even equating to individual display pixels. Thus, an embodiment with a 1920×1080 pixel see-through display may include a 1920×1080 microlens array within the first optic, with each microlens corresponding with one pixel; and/or the second optic likewise may include a 1920×1080 microlens array, and/or the modifier may include a 1920×1080 black and white LCD array for darkening.

Thus, individual features or parts of features of either or both optical environment content and optical display content may be controlled, by defining sufficiently fine regions in various elements of a given embodiment. As little as a single pixel (or pixel-sized area) may be so controlled as a region, and may be controlled independently of other regions. For example, a single traffic light in an environment might be adjusted in focal vergence without adjusting adjacent environmental features, the adjacent environmental features may be darkened without darkening the traffic light itself, etc. Although for clarity a conveniently small number of regions are illustrated and described, in practice degrees of resolution and discrimination are not limited.

Returning to FIG. 14A through FIG. 14D collectively, as already noted with changes to focal vergence embodiments are not limited with regard to the manner in which regions may be selected for modification of optical environment content therein, or the reasons for selecting certain regions as opposed to others.

For example, regions may be selected for modifying optical environment content based on where the viewer is looking, where displayed content may be present, what features or events are present in the environment, etc.

Notably, environmental features may be of particular interest when modifying optical environment content. For example, considering an arrangement where modification includes or is a darkening of optical environment content, certain embodiments may be adapted to function in some sense as "active sunglasses". Thus, if the overall brightness of an environment exceeds some maximum, the entire environment might be darkened (from the viewer's perspective). Alternately, the brightest portions might be darkened, with some portions being darkened more than other. Thus, as seen by a viewer the sun may be darkened or blacked out, likewise welding glare, other bright lights, bright reflection from water or polished objects, etc. However, because modifier regions may apply modifications independently of other modifier regions, such darkening may be local, i.e., the sun is "blacked out" but the rest of the environment is unchanged (or is darkened to a lesser degree).

Figure 15A:
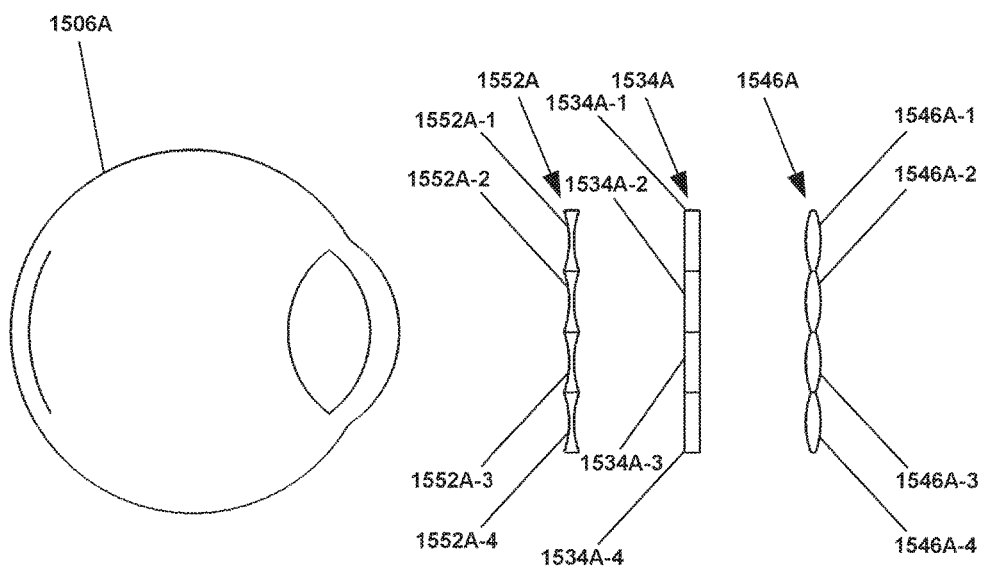
FIG. 15A shows an example arrangement of first optic with first optic regions, display with display regions, and second optic with second optic regions, for controlling focal vergence and optical display content alteration independently among regions.

Moving on to FIG. 15A, in addition to modifications to optical environment content, certain embodiments may apply alterations to optical display content. Thus, the appearance of the display output may be changed in addition to or instead of the environment being changed. Since content is delivered by the display itself, this may simply be a matter of modifying the display output (e.g. internally within the display, or within a processor controlling the display through executing instructions); consequently, there may be no externally visible difference between a display so adapted and a display that is not. However, the manner by which optical display content may be altered is not limited, and while physical differences to the display may not be required, neither are such physical differences prohibited.

FIG. 15A shows an arrangement visually similar to that in FIG. 10C, with a first optic 1546A defining first optic regions 1546A-1 through 1546A-4, a see-through display 1534A defining display regions 1534A-1 through 1534A-4, and a second optic 1552A defining second optic regions 1552A-1 through 1552A-4, disposed with respect to an eye 1506A. However, when the display 1534A is adapted to apply alternations to optical display content being outputted by the display 1534A, as may be understood through the arrangement in FIG. 15A that altered optical display content also may be aligned (e.g. along target paths, not shown) with corresponding regions of the first optic 1546A and second optic 1552A.

In the arrangement of FIG. 15A, the see-through display 1534A is adapted to change the output thereof in some manner, and to do so independently among the various display regions 1534A-1 through 1534A-4 thereof. For example, the display 1534A may enlarge or shrink content, bold content, underline or outline content, change the color of content, some combination thereof, etc. As noted, typically though not necessarily such alterations may be implemented through changing the internal operation of the display 1534A, including but not limited to changing executable instructions disposed on a processor that control the display 1534A. However, other arrangements, including but not limited to hardware modifications of a display 1534A, may be equally suitable.

As with changes to focal vergence and modification of optical environment content, alteration of optical display content may not be, and is not required to be, perfectly or completely independent among the display regions 1534A-1 through 1534A-4 of a display 1534A, so long as the display 1534A is adapted to modify content in the various display regions 1534A-1 through 1534A-4 thereof independently to some notable degree.

Figure 15B:
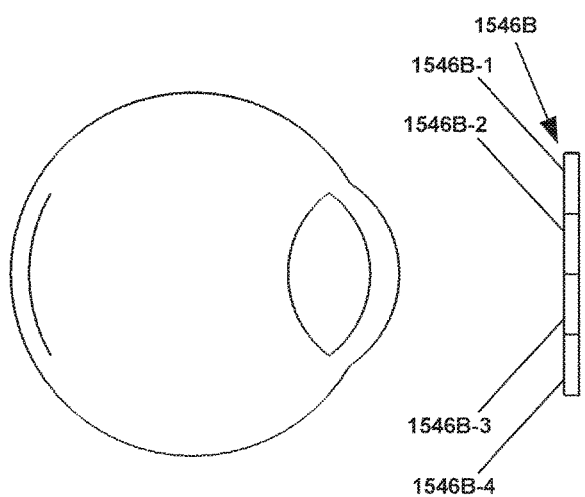
FIG. 15B shows an example arrangement of display with display regions for controlling optical display content alteration independently among regions.

With reference to FIG. 15B, as noted with regard to a modifier above, certain embodiments may exclude a first and/or second optic. In FIG. 15B, a see-through display 1534B defining display regions 1534B-1 through 1534B-4 is shown disposed with respect to an eye 1506B. Such an arrangement may not be adapted to adjust focal vergences, nevertheless such an arrangement may deliver optical display content from the display 1534B to the eye 1506B with alterations to that optical display content.

Turning to FIG. 16A, as with modifications to optical environment content, certain functions of alteration to optical display content as visible to the viewer's eye may be understood in similar manner to the effects of changing focal vergence (e.g. in FIG. 12A through FIG. 12E). Thus in FIG. 16A, an example arrangement is shown that considers a first optic, see-through display, and second optic in a uniform stack, each defining an array of four by six square regions. Also as in FIG. 12A through FIG. 12E, from the point of view of a viewer the second optic may be closest to the eye, thus for convenience the array and regions shown in FIG. 16A are referred to as the second optic 1652A and second optic regions 1652A-11 through 1652A-64.

In the arrangement of FIG. 16A, an alteration to optical display content in one region 1652A-53 is shown, as represented by the marking $A_1$. This alteration $A_1$ may include emphasis or de-emphasis of the optical display content outputted by the display, such as brightening, increasing contrast, outlining, changing color, etc., but other alterations may be suitable. As seen, the modification $A_1$ is applied only in region 1652A-53; the remaining regions are not so altered. Thus as may be understood, the optical display content is altered in some manner $A_1$ independently for region 1652A-53, as compared with other regions.

Many configurations of alteration may be suitable. Uniform alteration of all regions and/or uniform lack of alteration of any regions may be enabled for at least certain embodiments; such simple bounding cases may be readily understood, and are not illustrated.

In FIG. 16B, another example configuration for independently altering optical display content in different regions is shown, with certain regions having one alteration, certain regions another, and yet other regions no alteration. A second optic 1652B is shown with an array of second optic regions 1652B-11 through 1652B-64. One alteration $A_1$ to optical display content is applied in a display region corresponding with second optic region 1652B-53; a different alteration $A_2$ to optical display content is applied in display regions corresponding with second optic regions 1652B-42 through 1652B-44, 1652B-52 and 1652B-52, and 1652B-62 through 1652B-64; and no alteration to optical display content is applied in the remaining display regions.

Thus for example, the alteration $A_1$ may represent a strong emphasis of optical display content as visible in second optic region 1652B-53, with the alteration $A_2$ representing a lesser emphasis visible in the eight second optic regions surrounding second optic region 1452B-53.

It is noted that descriptions of alteration to optical display content may presume the presence of optical display content at least for purposes of explanation; however, such content is not necessarily required in all regions that may nominally specify alteration. That is, a region may simply be designated as one wherein if optical display content is present there, that optical display content is to be altered according to some parameter (e.g. $A_1$, $A_2$, $A_3$, etc.). If and when no optical display content is present, alterations may not be made or required. For example, an embodiment may be configured to alter optical display content on a sight path along which the viewer is looking; if an alteration specifies that optical display content is to be contrast-enhanced against the background thereof wherein the viewer looks, then in at least some sense an alteration may be said to be "there" (i.e. in the region that the viewer is looking at) even if no optical display content is present.

Now with reference to FIG. 16C, as another example a second optic 1652C is shown with second optic regions 1652C-11 through 1652C-64; wherein a first alteration $A_1$ is made to optical display content in display regions corresponding with second optic regions 1652C-31 through 1652C-34 and 1652C-41 through 1652C-44 (the center two columns of the array), and a second alteration $A_2$ is made to optical display content in display regions corresponding with second optic regions 1652C-21 through 1652C-24 and 1652C-51 through 1652C-54 (the columns on either side of those with alteration $A_2$). Considering color contrast increase as an example, the arrangement in FIG. 16C could represent a large enhancement in color contrast for optical display content that may be within the center of the field of view (whether or not optical display content is present there at any given time), with color contrast enhancements becoming less pronounced and disappearing altogether to the left and right in the field of view.

Other arrangements than those shown may be equally suitable. As noted with regard to FIG. 12E, the number of possible permutations is extremely large, and is not limited. FIG. 16D for example shows an arrangement wherein the optical display content is altered in some manner $A_{11}$ through $A_{64}$ in regions corresponding with each of second optic regions 1652D-11 through 1652D-64, with no two regions necessarily being altered identically. Again, although such capability is not required for all embodiments, embodiments are not limited with regard to how many regions may be present, how many regions may apply alterations, how many different alterations may be applied, etc.

Considering FIG. 16A through FIG. 16D collectively, again embodiments are not limited with regard to the manner in which regions may be selected for alteration of optical display content therein, or the reasons for selecting certain regions as opposed to others. Regions may be selected for alteration of optical display content therein for example based on where the viewer is looking, whether the viewer is interacting with content or has interacted recently with content, express user preferences, environmental features or events, etc.

In addition, with regard to changes in focal vergence, modifications to optical environment content, and alterations to optical display content, it is noted that time variance may be a factor in any or all such. That is, for certain examples herein changes to focal vergence, etc. may have been described as if static over time. However, variation of any such features in time and/or in space is expressly permitted for at least certain embodiments (though not necessarily required for all such embodiments). For example, although a modification to darken optical environment content in a certain region may be essentially static, i.e. "it gets darker and stays darker", changes in the degree of darkness over time also may be suitable. This may include such obvious changes as an on/off "blink" function (e.g. alternately applying and not applying a darkening to some portion of the environment as viewed by a user, such as to emphasize that portion of the environment), but may also include much more sophisticated and/or subtle arrangements. Changes to the adjustments of focal vergence of optical environment content and/or optical display content, the modifications to optical environment content, and/or the alterations to optical display content, over time or over space, are not limited.

Figures 17, 18:
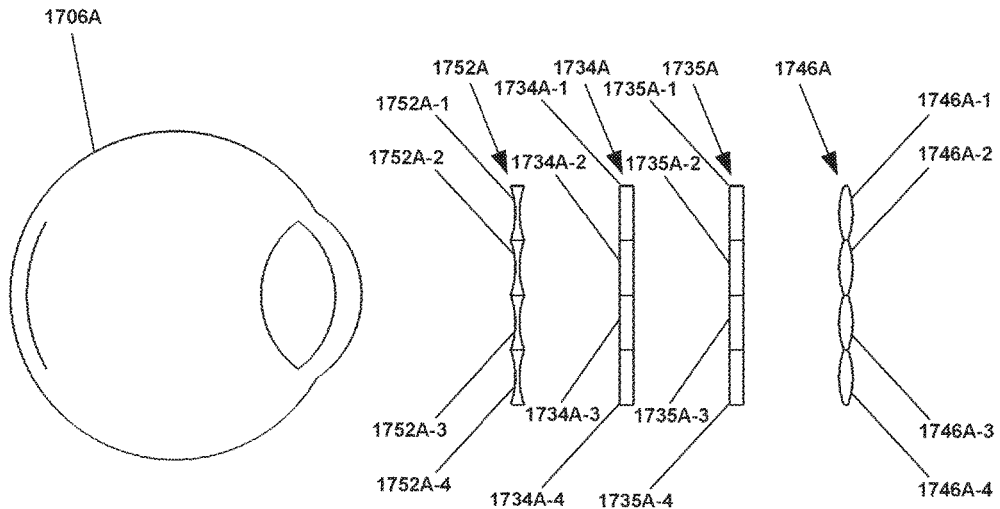
FIG. 17 shows an example arrangement of first optic with first optic regions, modifier with modifier regions, display with display regions, and second optic with second optic regions, for controlling focal vergence, optical environment content modification, and optical display content alteration independently among regions.
FIG. 18 shows an example of combined focal vergence adjustment, optical environment content modification, and optical display content alteration in corresponding regions.

In addition, as may be understood, adjustments of focal vergence of optical environment content and/or optical display content, modifications to optical environment content, and/or alterations to optical display content may be freely combined, as may physical arrangements for carrying out such functions. With reference to FIG. 17, an example arrangement is shown adapted for carrying out any or all of adjustments of focal vergence of optical environment content and optical display content, modifications to optical environment content, and alterations to optical display content. As may be seen, the arrangement visually resembles that in FIG. 13A, with a first optic 1746 with first optic regions 1746-1 through 1746-4, a modifier 1735 with modifier regions 1735-1 through 1735-4, a see-through display 1734 with display regions 1734-1 through 1734-4, and a second optic 1752 with second optic regions 1752-1 through 1752-4, disposed with respect to an eye 1706.

Thus, the arrangement in FIG. 17 may adjust focal vergences (through first and second optics 1746 and 1752), may modify optical environment content (through modifier 1735), and/or may alter optical display content (through display 1734); and may carry out each function substantially independently in corresponding regions thereof.

Turning to FIG. 18, an example of various combined changes as viewed by a viewer is shown therein (with a similar four by six array as shown in certain previous examples). A second optic 1852 is shown therein with second optic regions 1852-11 through 1852-64.

As may be seen, five regions exhibit focal vergence adjustments: 1852-13 exhibits adjustment $F_1$, 1852-64 exhibits adjustment $F_2$, 1852-63 exhibits adjustment $F_3$, 1852-62 exhibits adjustment $F_4$, and 1852-61 exhibits adjustment $F_5$. Such an arrangement may reflect for example the presence of optical display content in each of regions 1852-13 and 1852-61 through 1852-64, with that optical display content being adjusted in focal vergence to match the focal vergence of optical environment content in those respective regions; the distance to the environment in the various regions 1852-13 and 1852-61 through 1852-64 may be different, thus each focal vergence adjustment $F_1$ through $F_5$ likewise may be different.

Also, those same five regions exhibit optical display content alterations (though not all are unique): 1852-13 exhibits alteration $A_1$, 1852-64 exhibits alteration $A_2$, 1852-61 through 1852-63 exhibit adjustment $A_3$. Such an arrangement may reflect for example that a viewer is looking at or interacting with optical display content at region 1852-13, and that optical display content is altered to a strong degree $A_1$ (e.g. greatly emphasized), while region 1852-64 includes optical display content that is also of note and altered to a lesser degree $A_2$ (emphasized) while regions 1852-61 through 1852-63 contain optical display content not currently relevant that is altered $A_3$ to be less prominent (e.g. deemphasized).

In addition, regions 1852-14 through 1852-64 all exhibit optical environment content modification $M_1$, while regions 1852-61 through 1852-63 exhibit optical environment content modification $M_2$. Such an arrangement may reflect for example shading of glare in a brightly lit location (thus applying darkening $M_1$ to the regions along the top of the field of view), while also shading to a different degree $M_2$ the optical environment content in regions 1852-61 through 1852-63 along the right-hand edge of the field of view (e.g. to enhance the visibility of optical display content that may be present).

Thus, as may be understood, any region may include independently for various regions adjustments to focal vergences of optical display content and optical environment content (which may themselves be independently adjusted from one another within a given region), modifications to optical environment content, and/or alterations to optical display content. Any region may have none, one, or several such changes applied thereto. And any such change in any such property may be applied for a variety of reasons (e.g. darkening the top edge of the field of view because that area is uncomfortably bright, while darkening the right edge of the field of view because that area may be expected to have icons displayed in it).

With reference collectively to the three example changes addressed in FIG. 18—adjusting focal vergence, modifying optical environment content, and altering optical display content—it may be illuminating to address certain advantages of applying such changes (though not necessarily the only such advantages).

Typically though not necessarily, portable and wearable electronics may be developed from, and/or use similar display technologies to, devices such as desktop monitors. For example, a head mounted display (HMD) unit may utilize LCD displays that resemble LCD displays used for desktop computers, tablets, etc. However, while the physical technology may be similar, the practical "user environment" produced by portable and wearable displays may be radically different.

For example, consider that a desktop PC monitor typically occupies a relatively small portion of a user's field of view, and also is generally static. Thus, the user may look around to see other things; the monitor does not necessarily constitute a major obstruction. In addition, a PC monitor typically is opaque; a user does not expect to "see through" the monitor.

By contrast, head mounted displays and certain other portable display systems may be used (and may be designed to be used) so as to produce the appearance of an immersive environment. For example, a stereo head mounted display configured as a pair of glasses may move with the user as he or she turns his head; thus even though the literal display size is limited, the interaction space produced by that display may be effectively all-encompassing. More colloquially, there is nowhere the user can look that is not "display". In addition, such head mounted displays may be (and for certain applications such as augmented reality, may be required to be) see-through, so that a viewer may see what is beyond the display in the environment as well as what is being shown on the display.

While immersive interfacing and/or see-through interfacing may be useful, the approaches suitable for an immersive, see-through display may be different from those used for fixed, limited, opaque displays such as a desktop PC monitor. Again colloquially, what works for PCs may not translate well to HMDs.

Consequently, it may be useful to address both the concerns that may arise from combining two sets of content—display content with environment content (where an opaque display may provide only display content)—and displaying that content in an immersive or all-encompassing manner.

Each of the three functions described with regard to FIG. 18 (and elsewhere herein) may serve to address those concerns in some capacity.

Independently adjusting the focus of the display as compared to the environment may enable integrating the display content and environment content, emphasizing display content (or de-emphasizing environment content) for interaction with the display, or emphasizing environment content (or likewise de-emphasizing display content) for interaction with the environment.

Likewise, modifying the appearance of the environment, and/or altering the appearance of the display, also may enable integrating display content and environment content, or emphasizing one over the other.

Thus the two types of content may be used together, or either may be used in preference to the other; and because each type of content may be preferred over the other (or even viewed entirely alone, such as by blacking out the display to fully block transparency, or clearing the display so that the only content is that of the environment), the immersiveness of the display space may no longer be an obstacle.

Furthermore, independently changing the focus, environment, and display among multiple regions enables either or both types of content (display and environment) to be affected in a controlled manner, in some parts of the field of view but not others, and to different degrees in different parts of the field of view.

In sum, it may be desirable for content—whether displayed or transmitted—not to simply "be there", as may be the case for static content (such as a desktop icon), but for content to adapt or respond to changing circumstances, user interaction, operator preferences, etc. If the environment is dark, it may be useful for content to be brightened. If the environment is visually busy (or "noisy"), it may be useful to shade out or desaturate the environment to avoid distraction. If displayed content is not being used, looked at, or interacted with, it may be useful to render that content transparent, fade the content, shrink the content, move the content, etc., so that the unused content is not in the way.

Thus, in providing arrangements for changing both display and environment content (including multiple approaches, e.g. focus, modification, and alteration, as may be combined), an immersive, information rich interface as may be provided by a see-through head mounted display (or other system) may be made effective and convenient, as opposed to being a potential obstacle.

Figure 19:
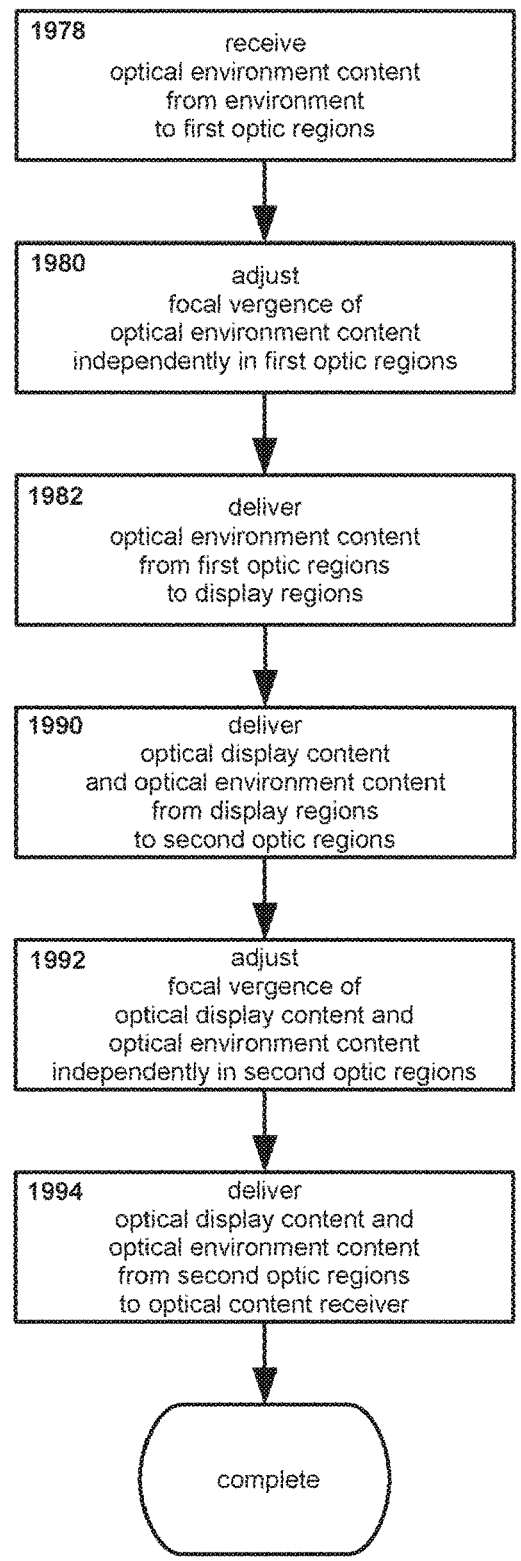
FIG. 19 shows an example method for controlling focal vergence independently in regions.

Now moving on to FIG. 19, an example method is shown, in flow chart form. The arrangement in FIG. 19 is at least somewhat similar to that in FIG. 9, and steps as shown in FIG. 19 (and subsequent illustrations) have been described previously herein. Thus, explanations for such steps will not necessarily be duplicated in full.

In FIG. 19, optical environment content is received 1978 from an environment to a plurality of first optic regions (or described alternately, to a first optic defining a plurality of first optic regions). The focal vergence of the optical environment content is adjusted 1980 in the first optic regions, independently among those first optic regions. Depending on the embodiment and other particulars, the focal vergence in a given first optic region may for example be made more convergent or more divergent in different regions, in varying amounts among regions, etc.

The optical environment content is delivered 1982 from the first optic regions to corresponding display regions of a see-through display. The optical environment content is then delivered 1990 from the see-through display (e.g. passing therethrough) to corresponding second optic regions of a second optic. In addition, optical display content is also delivered 1990 from the display regions (e.g. generated and/or outputted by the display, in various regions thereof) to the corresponding second optic regions.

The focal vergences of both the optical display content and the optical environment content are adjusted 1992 in the second optic regions, independently among the second optic regions. The optical display content and optical environment content are then delivered 1994 from the second optic regions to an optical content receiver, e.g. an eye, a camera, some specified viewing point, etc.

Thus overall in the arrangement of FIG. 19, the focus of the environment and/or display output as viewed at some viewing point (e.g. a viewer's eye) may be changed, and the changes in focus may be non-uniform. Stated differently, different parts of a field of view may be focused independently of one another, and displayed and transmitted content in those parts of the field of view also may be focused independently.

Figure 20:
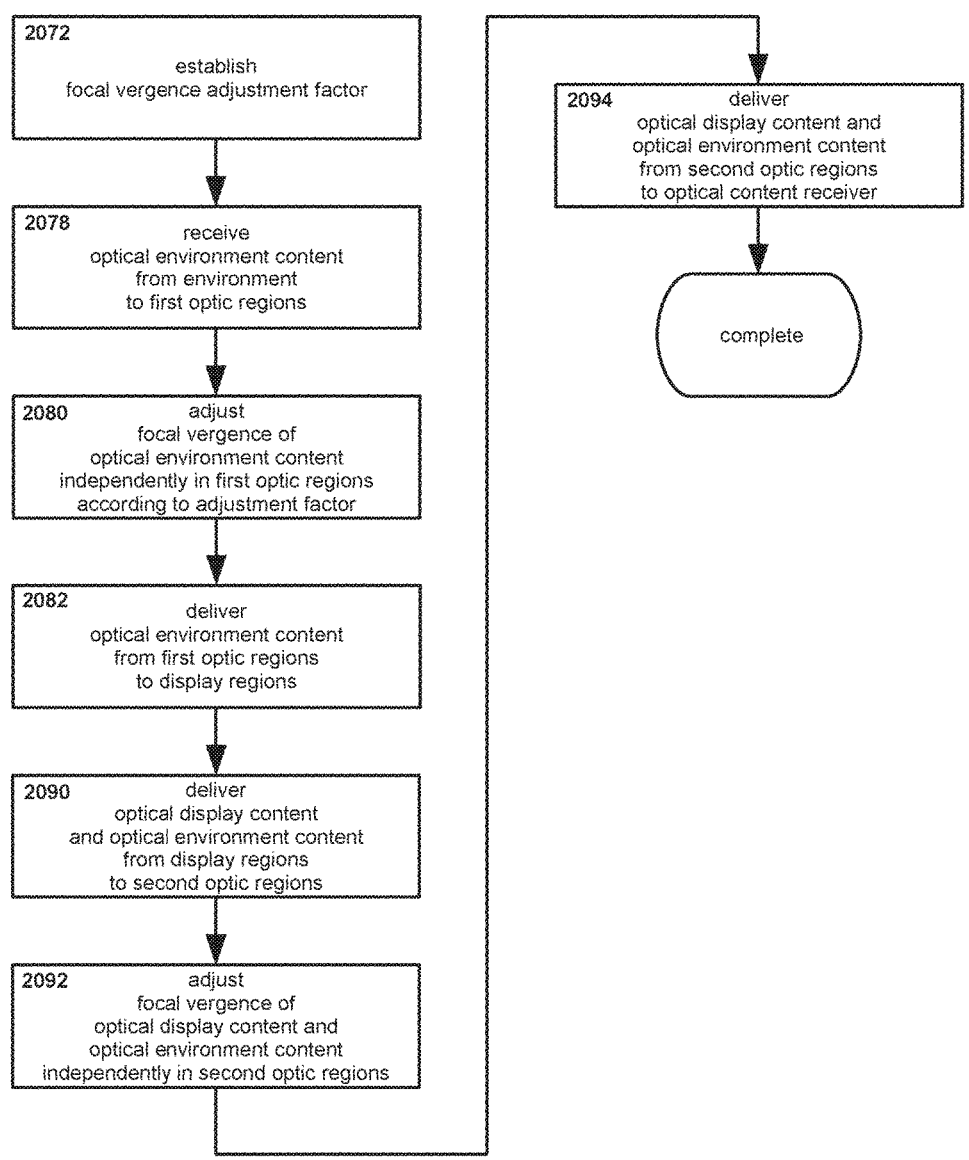
FIG. 20 shows an example method for controlling focal vergence independently in regions, according to a focal vergence adjustment factor.

Turning to FIG. 20, as noted previously focal vergences in first optic regions and/or second optic regions may be adjusted for a variety of reasons, in response to a variety of stimuli or other conditions, etc. For example, focal vergences may be adjusted in regions depending on where the viewer is looking, where content is displayed, where a user is interacting with content, environmental features, etc. So as to support such determinations of which regions (if any) are to have focal vergences adjusted, and to what degree focal vergences are to be adjusted, information regarding some relevant factor may be acquired and considered.

Thus in FIG. 20, a focal vergence adjustment factor is established 2072.

The particulars of what may serve as a focal vergence adjustment factor, and/or how such a focal vergence adjustment factor may be established 2072, may vary considerably and are not limited. For example, if focal vergence is to be adjusted based on where the viewer is looking, then the focal vergence adjustment factor may be or include the position/orientation of the viewer's eye(s), and determining that focal vergence adjustment factor may be carried out by using a sensor to track the eye(s) of the viewer. However, in addition or instead of eye tracking, a depth sensor also may be used to determine the depth to relevant portions of the environment (i.e., if matching the focal vergence of optical display content to the focal vergence of optical environment content, it may be useful to know the original focal vergence of the optical environment content that is to be matched).

However, while a focal vergence adjustment factor may be sensed with one or more sensors, this is an example only, and other arrangements also may be suitable. For example, eye orientation may be predicted algorithmically rather than sensed, depth to environmental features and/or focal vergence of light from those environmental features may be computed or acquired without direct measurement (e.g. by receiving GPS or other position data for the system and some target in the environment), information may be retrieved from storage or communicated from some external source, etc.

It is emphasized that the focal vergence adjustment factor, while at least potentially determining (in whole or in part) what adjustments are made to focal vergence, the focal vergence adjustment factor is not itself required to relate directly to focal vergence. For example, eye orientation (where the viewer is looking) may be considered as a focal vergence adjustment factor, even though eye position is not a measure of focal vergence and does not necessarily determine focal vergence. However, focal vergence adjustment factors that do measure or determine focal vergence, such as depth to a target in the environment, also are not prohibited.

In addition, it is noted that optical environment content modification factors and optical display content modification factors (described below) and the establishment thereof should be understood as similarly broad.

Returning to FIG. 20, regardless of the particulars of what focal vergence adjustment factor(s) are established and how, optical environment content is received 2078 to a plurality of first optic regions. The focal vergence of the optical environment content is adjusted 2080 in the first optic regions, independently among those first optic regions. The adjustment 2080 is performed according to the specifics of the focal vergence adjustment factor. That is, if the focal vergence adjustment factor relates to where the viewer is looking, certain first optic regions may adjust the focal vergence of the optical environment content passing therethrough differently from others based (at least in part) upon the orientation of the viewer's eye(s) (e.g. as determined from an eye tracking sensor). Thus, some first optic regions may apply a first adjustment (e.g. $F_1$) to the focal vergence of optical environment passing therethrough, other first optic regions may apply a different second adjustment (e.g. $F_2$), still other first optic regions may apply no adjustment, etc.

The optical environment content then is delivered 2082 from the first optic regions to corresponding display regions of a see-through display. The optical environment content is delivered 2090 from the see-through display to corresponding second optic regions of a second optic, and optical display content is also delivered 2090 from the display regions to the corresponding second optic regions.

The focal vergences of both the optical display content and the optical environment content then are adjusted 2092 in the second optic regions, independently among the second optic regions, according to the focal vergence adjustment factor. The optical display content and optical environment content are delivered 2094 from the second optic regions to an optical content receiver.

Thus in the arrangement of FIG. 20, similarly to FIG. 19 the focus of the environment and/or display output may be changed independently of one another, and independently in various regions, however with some governing factor such as where a viewer is looking affecting where and how content is refocused.

Figure 21:
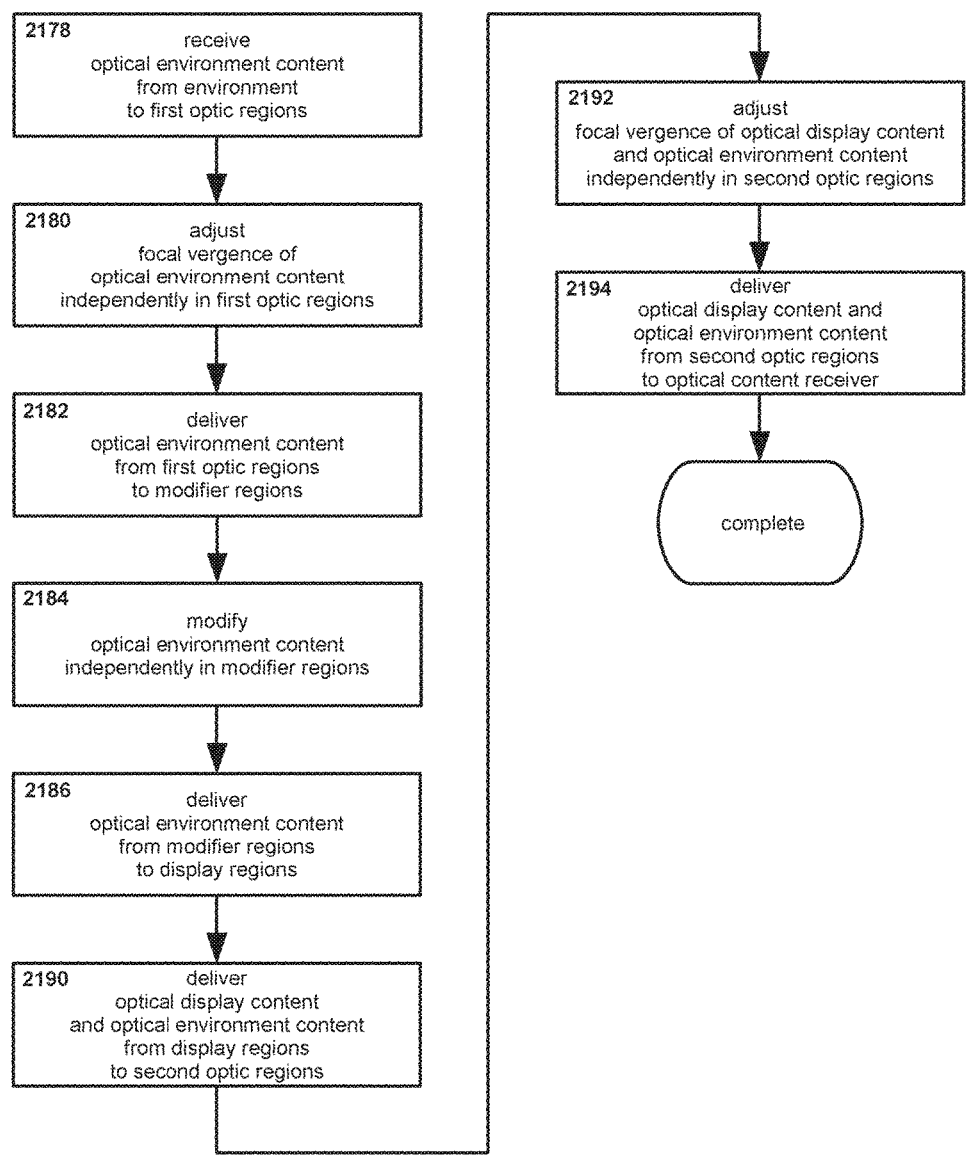
FIG. 21 shows an example method for controlling focal vergence and optical environment content modification independently in regions.

With reference now to FIG. 21, an example method that includes adjusting focal vergences and modifying optical environment content is shown. In the method of FIG. 21, optical environment content is received 2178 to a plurality of first optic regions. The focal vergence of the optical environment content is adjusted 2180 in the first optic regions, independently among those first optic regions.

The optical environment content is delivered 2182 from the first optic regions to corresponding modifier regions of a modifier. In the modifier, the optical environment content is modified 2184, independently among the modifier regions. For example, considering a modification of darkening a background, the optical environment content may be darkened by one degree $M_1$ in some modifier regions, darkened by another degree $M_2$ in other regions, darkened not at all in still other regions, etc.

Continuing in FIG. 21, the optical environment content (now modified) is delivered 2186 from the modifier regions of the modifier to corresponding display regions of a see-through display. The optical environment content is delivered 2190 from the see-through display to corresponding second optic regions of a second optic, and optical display content is also delivered 2190 from the display regions to the corresponding second optic regions.

The focal vergences of both the optical display content and the optical environment content then are adjusted 2192 in the second optic regions, independently among the second optic regions. The optical display content and optical environment content are delivered 2194 from the second optic regions to an optical content receiver.

Thus in the arrangement of FIG. 21, the focus of the environment and/or display output may be changed independently of one another, and independently in various regions; and in addition, the environment as viewed also may be changed in some other manner, such as by darkening different parts to different degrees.

Figure 22:
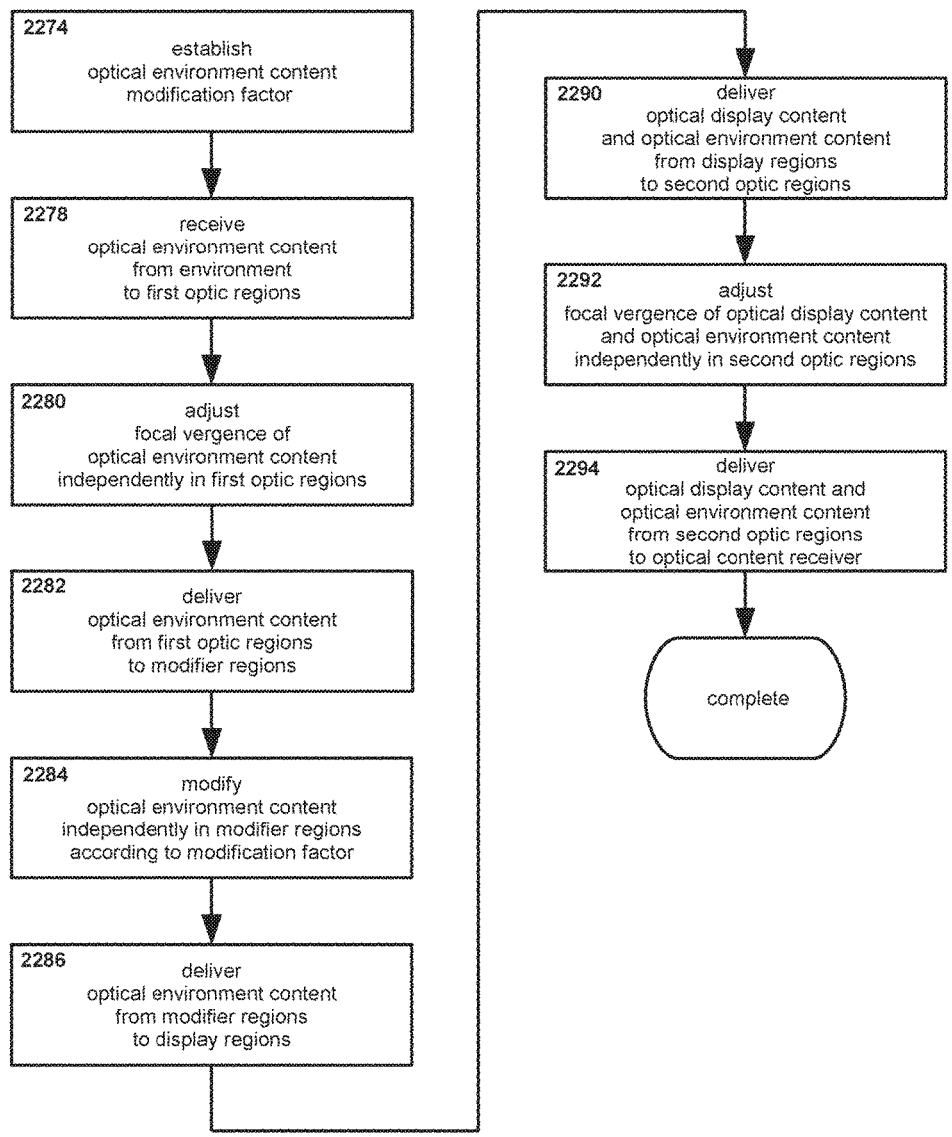
FIG. 22 shows an example method for controlling focal vergence and optical environment content modification independently in regions, according to an optical environment content modification factor.

Now addressing FIG. 22, an example method that modifies optical environment content based on some modification factor is shown. An optical environment content modification factor is established 2274. The optical environment content modification factor represents some attribute or event that may be used to select what parts of optical environment content are modified, the degree of modification, the type of modification, etc. For example, if a background is to be darkened to highlight displayed augmented reality objects, an optical environment content modification factor may include the location of augmented reality objects in the field of view. Such an example factor may be determined for instance by querying the display outputting the augmented reality objects or a processor controlling that display, etc. However, this is an example only, and as noted previously with regard to a focal vergence factor, the optical environment content modification factor is not limited with regard to what factors may be considered, how factors may be established, etc.

Continuing in FIG. 22, optical environment content is received 2278 to a plurality of first optic regions. The focal vergence of the optical environment content is adjusted 2280 in the first optic regions, independently among those first optic regions. The optical environment content is delivered 2282 from the first optic regions to corresponding modifier regions of a modifier.

In the modifier, the optical environment content is modified 2284, independently among the modifier regions, and according to the optical environment content modification factor (whatever the particulars of that optical environment content modification may be for a given embodiment).

The optical environment content (now modified) is delivered 2286 from the modifier regions of the modifier to corresponding display regions of a see-through display. The optical environment content and optical display content are delivered 2290 from the see-through display to corresponding second optic regions of a second optic. The focal vergences of both the optical display content and the optical environment content are adjusted 2292 in the second optic regions, independently among the second optic regions. The optical display content and optical environment content are delivered 2294 from the second optic regions to an optical content receiver.

Thus in the arrangement of FIG. 22, the focus of the environment and/or display output may be changed independently of one another, and independently in various regions; and in addition, the environment as viewed also may be changed in some other manner, such as by darkening different parts to different degrees. Moreover, those changes to the environment as viewed may be made responsive to some governing factor that determines (at least in part) how and where the environment is changed.

Figure 23:
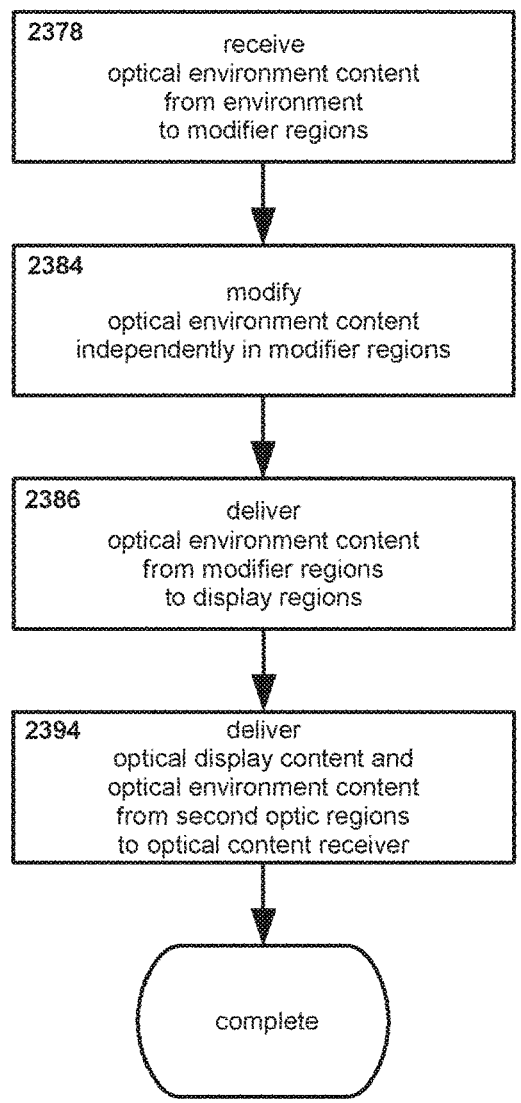
FIG. 23 shows an example method for controlling optical environment content modification independently in regions.

With reference to FIG. 23, an example method that modifies optical environment content, but without necessarily adjusting focal vergences, is shown. Optical environment content is received 2378 to a plurality of modifier regions. The optical environment content is modified 2384 in the modifier regions, independently among the modifier regions. The optical environment content (now modified) is delivered 2386 from the modifier regions of the modifier to corresponding display regions of a see-through display. The optical environment content and optical display content are delivered 2394 from the display regions to an optical content receiver.

Thus in the arrangement of FIG. 23, the environment as viewed through a see-through display may be changed in some manner (e.g. in addition to the overlay of displayed objects against that environment), such as by darkening different parts to different degrees.

It should be understood that an arrangement similar to FIG. 23 but also including an optical environment content modification factor, though not illustrated individually, also may be suitable, as may other variations.

Figure 24:
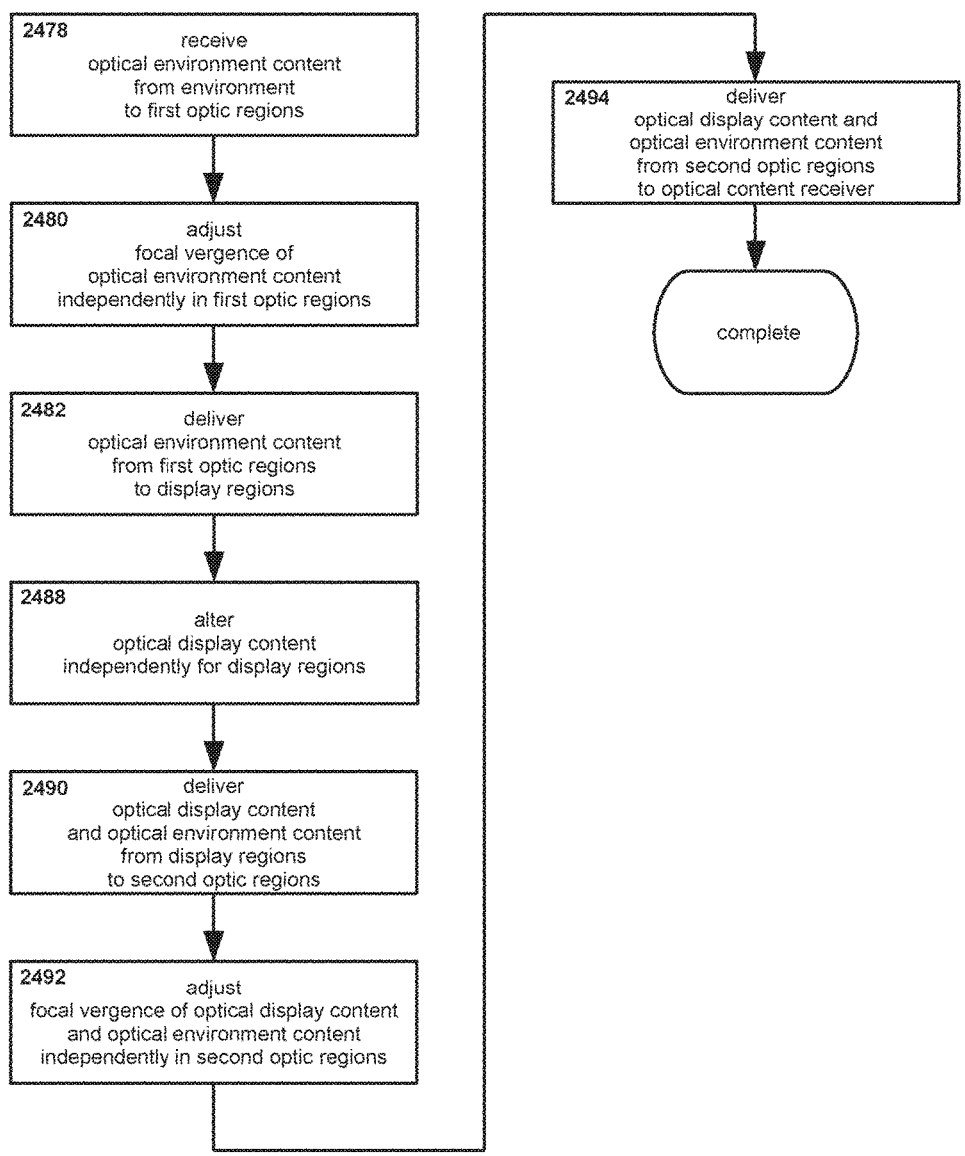
FIG. 24 shows an example method for controlling focal vergence and optical display content alteration independently in regions.

Turning now to FIG. 24, an example method that includes adjusting focal vergences and altering optical display content is shown. In the method of FIG. 24, optical environment content is received 2478 to a plurality of first optic regions. The focal vergence of the optical environment content is adjusted 2480 in the first optic regions, independently among those first optic regions.

The optical environment content is delivered 2482 from the first optic regions to corresponding display regions of a see-through display. In the see-through display, optical display content is altered 2488 for the display regions, independently among the display regions. For example, considering a modification of decreasing transparency of displayed augmented reality objects, optical display content visible in various regions may be decreased in transparency by one degree $A_1$ in some modifier regions, decreased in transparency by another degree $A_2$ in other regions, lefty unchanged in still other regions, etc.

As has been noted, the alteration 2488 may or may not occur literally within the display, or various portions of the display; although altering 2488 optical display content literally within a display is not prohibited, altering 2488 optical display content in (for example) a processor controlling the display (e.g. so as to figuratively but not necessarily literally alter the content physically within the confines of the display), also may be suitable.

Continuing in FIG. 24, the optical environment content is delivered 2490 from the see-through display to corresponding second optic regions of a second optic, along with optical output content (now altered) also delivered 2490 from the display regions to the corresponding second optic regions.

The focal vergences of both the optical display content and the optical environment content are adjusted 2492 in the second optic regions, independently among the second optic regions. The optical display content and optical environment content are delivered 2494 from the second optic regions to an optical content receiver.

Thus in the arrangement of FIG. 24, the focus of the environment and/or display output may be changed independently of one another, and independently in various regions; and in addition, displayed objects/features as viewed also may be changed in some other manner, such as by changing transparency, changing brightness, changing color, etc. different parts of those displayed objects/features.

Figure 25:
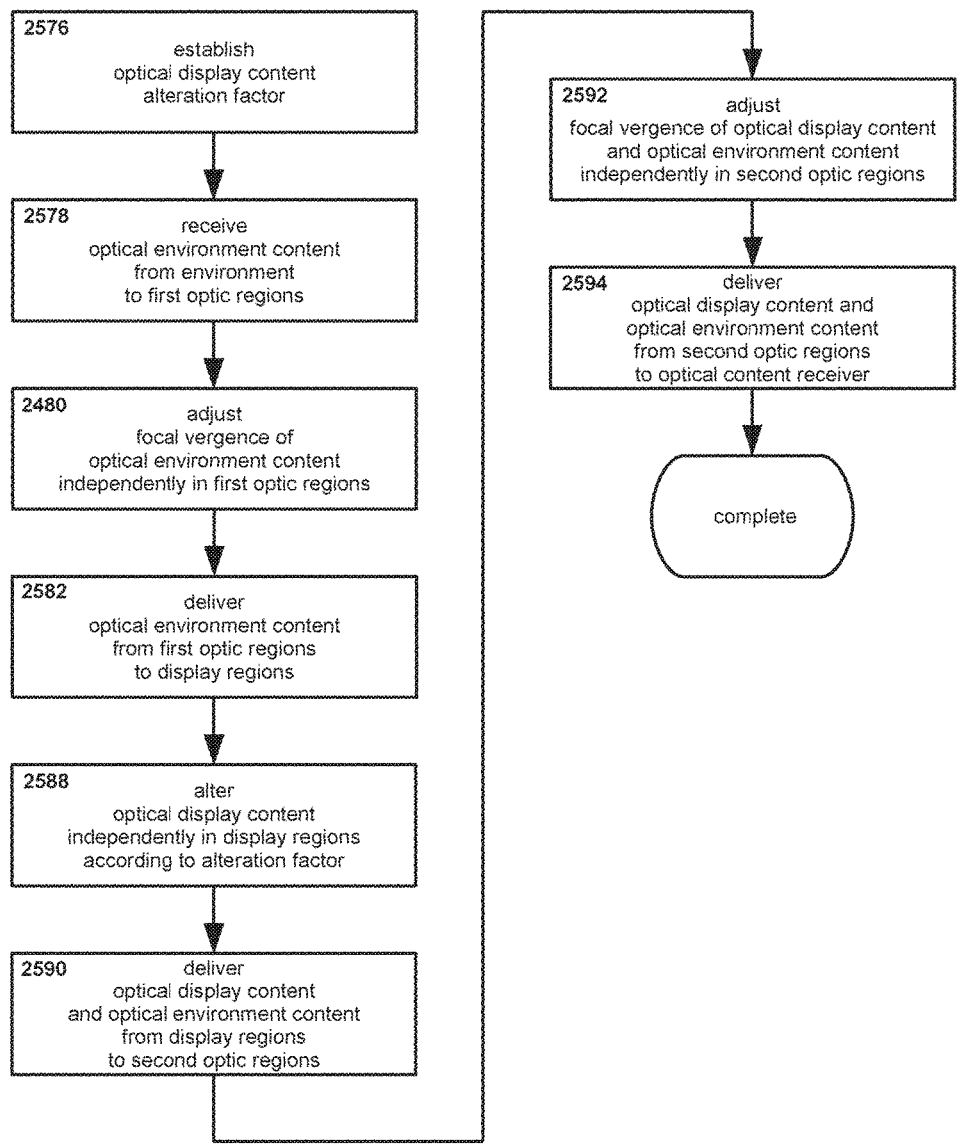
FIG. 25 shows an example method for controlling focal vergence and optical display content alteration independently in regions, according to an optical display content alteration factor.

Now in FIG. 25, an example method that alters optical display content based on some modification factor is shown. An optical display content alteration factor is established 2576. The optical display content alteration factor represents some attribute or event for selecting what parts of optical display content are altered, the degree and/or type of alteration, etc. For example, if a displayed augmented reality object is to be made transparent for de-emphasis if a viewer is not interacting with that object (e.g. not "gripping", "holding", gesturing at, etc. that augmented reality object), then an optical display content alteration factor may include the location and/or configuration of the viewer's hand within the field of view. Such an example factor may be determined for instance by sensing the external environment, such as with an RGB or depth camera, so as to detect whether hands are present, where, and in what configuration (which fingers extended, etc.). However, this is an example only, and as noted previously with regard to focal vergence and modification factors, the optical display content alteration factor is not limited with regard to what factors may be considered, how factors may be established, etc.

Continuing in FIG. 25, optical environment content is received 2578 to a plurality of first optic regions. The focal vergence of the optical environment content is adjusted 2580 in the first optic regions, independently among those first optic regions. The optical environment content is delivered 2582 from the first optic regions to corresponding display regions of a see-through display. In the see-through display, optical display content is altered 2588 for the display regions, independently among the display regions, according to the optical display content alteration factor.

The optical environment content and the optical display content (now altered) are delivered 2590 from the see-through display to corresponding second optic regions of a second optic. The focal vergences of both the optical display content and the optical environment content are adjusted 2592 in the second optic regions, independently among the second optic regions. The optical display content and optical environment content are delivered 2594 from the second optic regions to an optical content receiver.

Thus in the arrangement of FIG. 25, the focus of the environment and/or display output may be changed independently of one another, and independently in various regions; and in addition, displayed objects/features as viewed also may be changed in some other manner, such as by changing transparency to different degrees. Those changes to the displayed objects/features as viewed may be made responsive to some governing factor that determines (at least in part) how and where the displayed content is changed.

Figure 26:
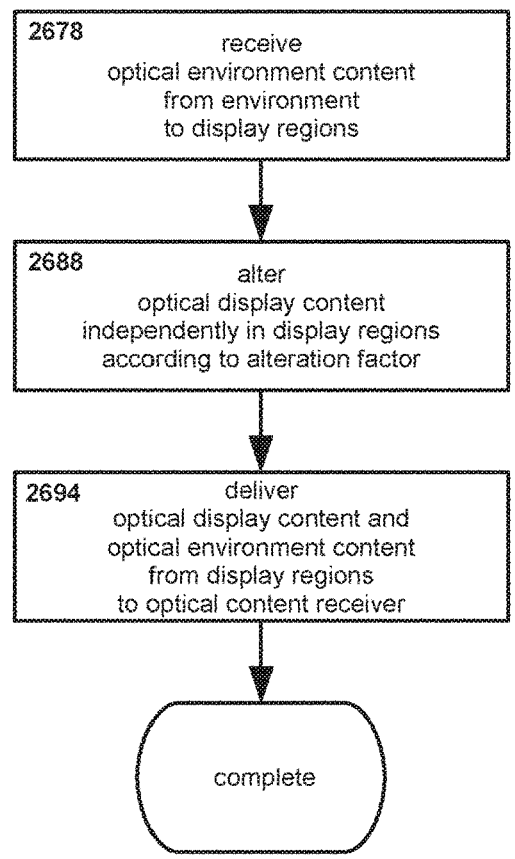
FIG. 26 shows an example method for controlling optical display content alteration independently in regions.

Moving on to FIG. 26, an example method that alters optical display content, but without necessarily adjusting focal vergences, is shown. Optical environment content is received 2678 to a plurality of display regions of a see-through display. In the see-through display, optical display content is altered 2688 for the display regions, independently among the display regions. The optical environment content and optical display content (now altered) are delivered 2694 from the display regions to an optical content receiver.

Thus in the arrangement of FIG. 26, displayed features/objects as viewed on see-through display may be changed in some manner, such as by changing in brightness, transparency, color, blinking, etc., in different parts of the field of view to different degrees.

It should again be understood that an arrangement similar to FIG. 26 but also including an optical display content alteration factor, though not illustrated individually, also may be suitable, as may other variations.

Various combinations of features, e.g. focus adjustment with background modification, have been shown and described in previous examples. Such combinations are not limited; any changes not logically or physically impossible may be implemented in various embodiments. In particular, an arrangement combining all three of focus adjustment, background modification, and display alteration, each as influenced by relevant factors, is shown for example purposes in FIG. 27.

Figure 27:
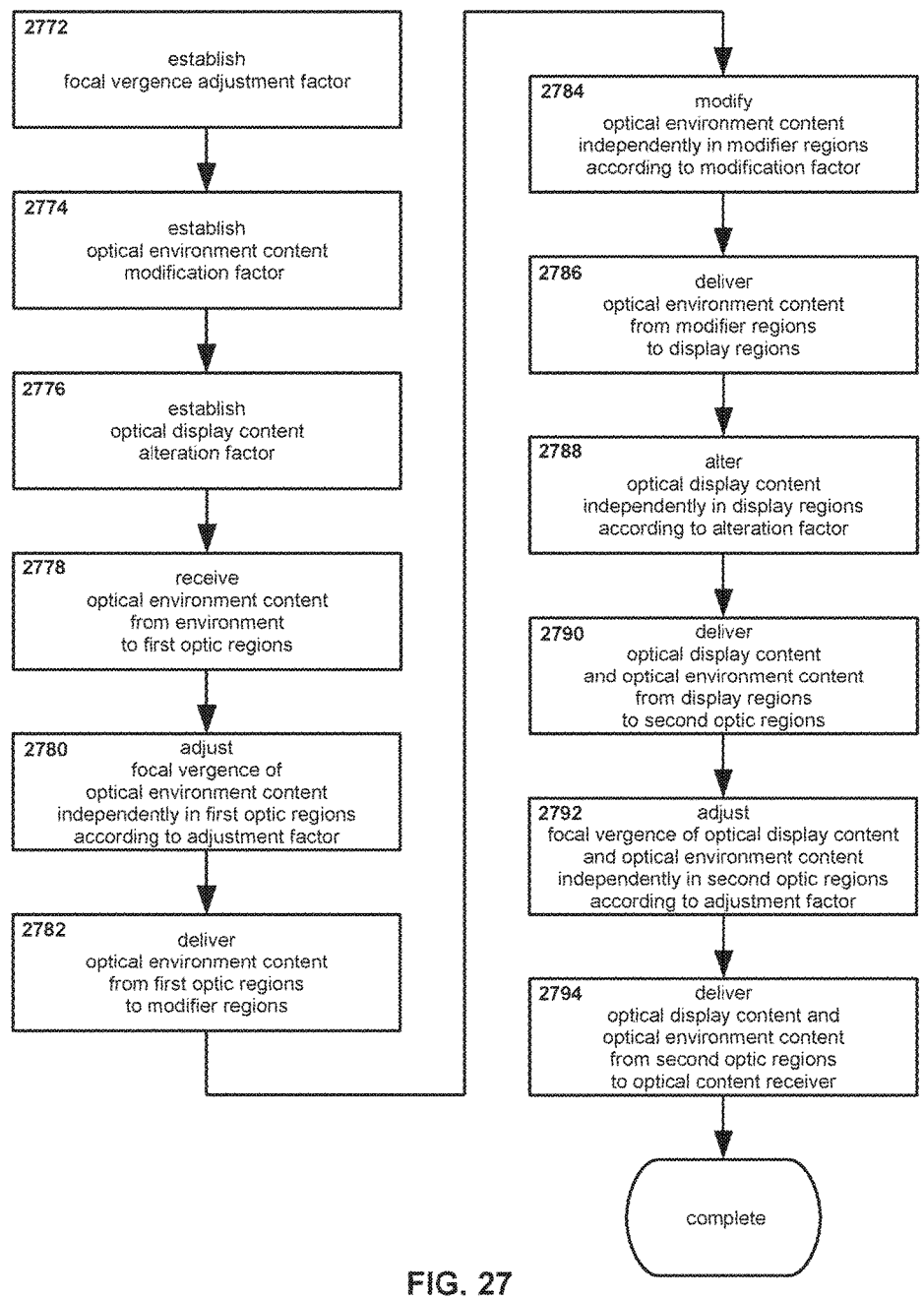
FIG. 27 shows an example method for controlling focal vergence, optical environment content modification, and optical display content alteration independently in regions, according to a focal vergence factor, an optical environment content modification factor, and an optical display content alteration factor, respectively.

In the example of FIG. 27, a focal vergence adjustment factor is established 2772. An optical environment content modification factor also is established 2774, and an optical display content alteration factor is established 2776.

Optical environment content is received 2778 to a plurality of first optic regions of a first optic. The focal vergence of the optical environment content is adjusted 2780 in the first optic regions, independently among those first optic regions. The adjustment 2780 is performed according to the specifics of the focal vergence adjustment factor.

The optical environment content is delivered 2782 from the first optic regions to corresponding modifier regions of a modifier. In the modifier, the optical environment content is modified 2784, independently among the modifier regions and according to the particulars of the optical environment content modifier factor. The optical environment content (now modified) is delivered 2786 from the modifier regions of the modifier to corresponding display regions of a see-through display. In the see-through display, optical display content is altered 2788 for the display regions, independently among the display regions and according to the optical display content alteration factor.

The optical environment content and optical display content (now altered) are delivered 2790 from the display regions to corresponding second optic regions of a second optic. The focal vergences of both the optical display content and the optical environment content then are adjusted 2792 in the second optic regions, independently among the second optic regions, again according to the focal vergence adjustment factor. The optical display content and optical environment content are delivered 2794 from the second optic regions to an optical content receiver.

Thus in the arrangement of FIG. 27 the focus of displayed and background visuals may be changed independently of one another (e.g. so as to match focus for convenient viewing), and independently in different areas of the field of view, based at least in part on some relevant factor; and also, both the displayed and background visuals also may be changed in some other manner (e.g. for emphasis, user comfort, etc.), and may be so changed independently in different areas of the field of view, again based on corresponding relevant factors.

Figure 28:
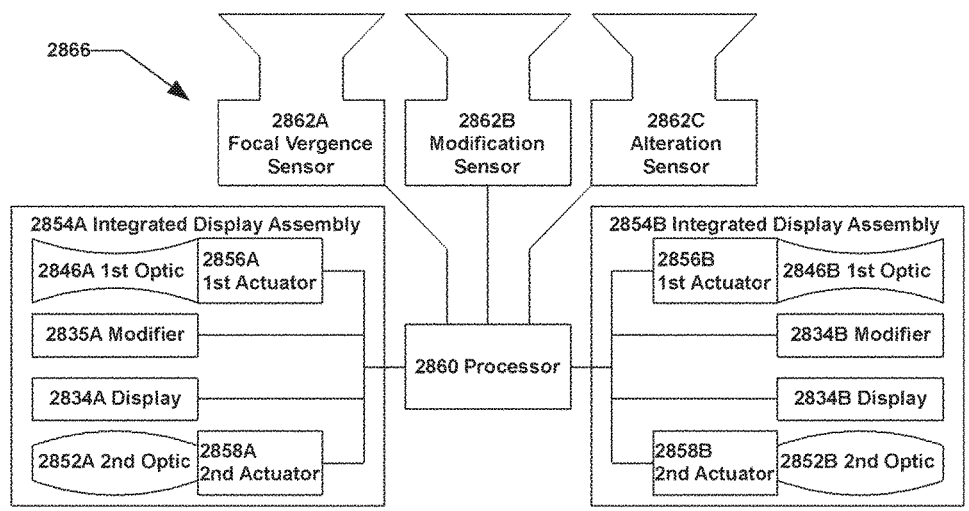
FIG. 28 shows an example arrangement of an apparatus in schematic form, with left and right integrated optical assemblies.

Now with reference to FIG. 28, an example apparatus 2866 is shown. The example apparatus therein includes an integrated display assembly 2854A with a first optic 2846A, a modifier 2835A, a see-through display 2834A, and a second optic 2852A. Although not illustrated individually, the first optic 2846A may include first optic regions, the modifier 2835A may include modifier regions, the display 2834A may include display regions, the second optic 2852A may include second optic regions, etc.

The integrated display assembly 2854A in FIG. 28 also includes a first actuator 2856A adapted to vary the optical properties of the first optic 2846A, e.g. changing the focal length thereof (thus changing the degree and/or direction by which the first optic 2846A adjusts focal vergence), substantially independently changing the focal lengths of first optic regions of the first optic 2846A, etc. The integrated display assembly 2854A further includes a second actuator 2858A similarly adapted to vary the optical properties of the second optic 2852A, and to do so substantially independently in regions thereof.

The apparatus in FIG. 28 also includes another integrated display assembly 2854B similar to the integrated display assembly 2854A already described. This other integrated display assembly 2854B includes a first optic 2846B, modifier 2835B, display 2834B, and second optic 2852B (wherein the first optic 2846B, modifier 2835B, display 2834B, and second optic 2852B likewise may define respective regions thereof), along with a first actuator 2856B, and second actuator 2858B similarly adapted to vary focal vergence adjustments in the first and second optics 2846B and 2852B respectively (along with regions thereof, independently among those regions).

Such a configuration as shown in FIG. 28 may be suited for example for an arrangement wherein each of a viewer's eyes is provided with an integrated display assembly 2854A and 2854B, such as might be the case for a stereo display system. However, this is an example, and other arrangements also may be suitable.

The arrangement of FIG. 28 also includes a processor 2860 in communication with the integrated display assemblies 2854A and 2854B, in communication with the first actuators 756A and 756B and second actuators 758A and 758B therein, and in communication with the modifiers 2835A and 2835B and the displays 2834A and 2834B therein. Such an arrangement may for example facilitate control of the first actuators 2856A and 2856B and second actuators 2858A and 2858B, and thus control of the first optics 2846A and 2846B and second optics 2852A and 2852B therewith. The processor 2860 may also control the modifiers 2835A and 2835B, and/or the displays 2834A and 2834B, depending on the particulars of an embodiment. For such an arrangement, the processor thus may control adjustments to focal vergence, modifications to optical environment content, and/or alterations to optical display content, as described previously herein.

In addition, the arrangement of FIG. 28 includes a focal vergence sensor 2862A, a modification sensor 2862B, and an alteration sensor 2826C, in communication with the processor 2860. The focal vergence sensor 2862A may be adapted to sense (or otherwise establish) a focal vergence adjustment factor; the modification sensor 2862B may be adapted to sense (or otherwise establish) an optical environment content modification factor; and/or the alteration sensor 2862C may be adapted to sense (or otherwise establish) an optical display content alteration factor. Thus the processor may control adjustments to focal vergence, modifications to optical environment content, and/or alterations to optical display content, according an adjustment factor, a modification factor, and/or an alteration factor, respectively.

Sensors 2862A, 2862B, and 2863C are shown as distinct sensors, and as cameras, for illustrative purposes. However, it may be suitable in some embodiments for a single sensor to determine two or more factors, for two or more sensors to cooperate to determine one factor, for sensors other than cameras to be utilized, etc. In addition, 2862A, 2862B, and 2863C are not limited only to establishing adjustment, modification, and alteration factors as described, and may serve in providing a variety of data for facilitating operation of the apparatus and/or for other purposes.

Furthermore, although for descriptive purposes with regard to FIG. 28 the sensors 2862A, 2862B, and 2863C are referred to with regard to purpose—that is, a focal vergence sensor for determining focal vergence—it may be equally suitable to consider and/or reference sensors with regard to other features. For example, a sensor that detects the orientation and/or position of an eye or other optical content receiver may be considered as a receiver sensor, a sensor that detects distance to or some other factor relating to the environment may be considered an environment sensor, a sensor that detects interaction between (for example) a hand and an augmented reality object may be considered an interaction sensor, etc.

Figure 29:
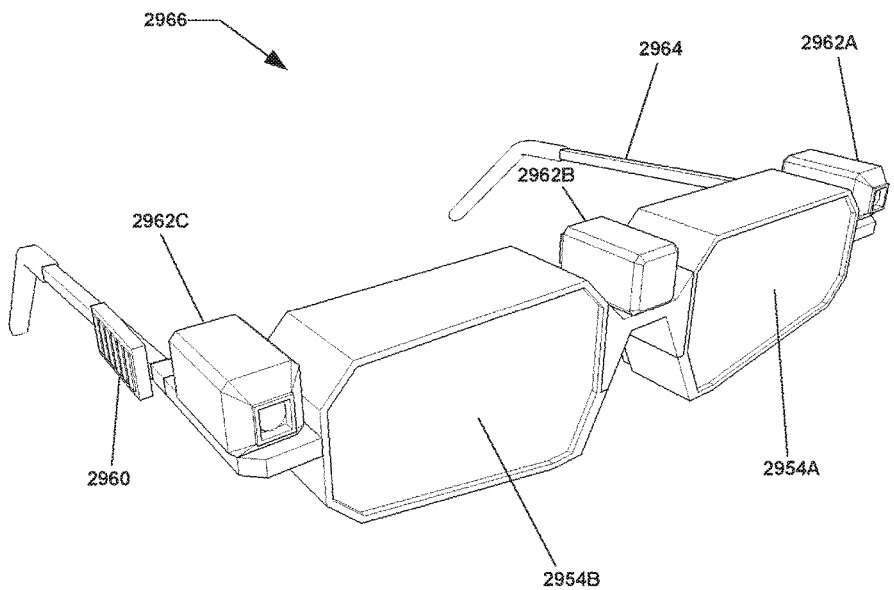
FIG. 29 shows an example arrangement of an apparatus in perspective view.

Now with regard to FIG. 29, embodiments of an apparatus may be implemented in many embodiments taking many forms. One such form is illustrated as an example in FIG. 29, in perspective view. Therein, the apparatus 2966 is configured in the form of a head mounted display resembling a pair of glasses. The apparatus shown therein includes integrated display assemblies 2954A and 2954B, arranged such that when the apparatus 2966 is worn the integrated display assemblies 2954A and 2954B would be disposed near to and in front of a viewer's eyes. Though not visible in FIG. 29, the integrated display assemblies 2954A and 2954B may include therein first optics, modifiers, displays, and second optics (and regions thereof), first and second actuators, etc.

The apparatus 2966 also includes a processor 2960, and sensors 2962A, 2962B, and 2962C. A body 2964 supports the integrated display assemblies 2954A and 2954B, processor 2960, and sensors 2962A, 2962B, and 2962C so as to make the apparatus readily wearable in a useful fashion. It is emphasized that the arrangement shown in FIG. 29 is an example only, and that other configurations may be equally suitable.

Figure 30:
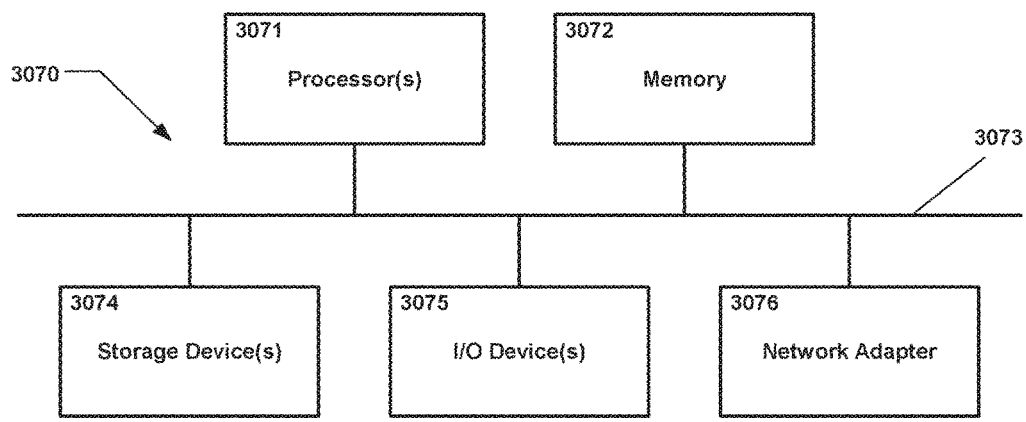
FIG. 30 shows a block diagram of a processing system that may implement certain example operations as described.

Moving on to FIG. 30, therein is shown a block diagram of an apparatus that may perform various operations, and store various information generated and/or used by such operations, according to an embodiment of the disclosed technique. The apparatus may represent any computer or processing system described herein. The processing system 3070 is a hardware device on which any of the other entities, components, or services depicted in the examples of FIG. 1 through FIG. 29 (and any other components described in this specification) may be implemented. The processing system 3070 includes one or more processors 3071 and memory 3072 coupled to an interconnect 3073. The interconnect 3073 is shown in FIG. 30 as an abstraction that represents any one or more separate physical buses, point to point connections, or both connected by appropriate bridges, adapters, or controllers. The interconnect 3073, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 3071 is/are the central processing unit of the processing system 3070 and, thus, control the overall operation of the processing system 3070. In certain embodiments, the processor(s) 3071 accomplish this by executing software or firmware stored in memory 3072. The processor(s) 3071 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 3072 is or includes the main memory of the processing system 3070. The memory 3072 represents any form of random access memory (RAM), read-only memory (ROM), flash memory, or the like, or a combination of such devices. In use, the memory 3072 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 3074, a storage device(s) 3075, and I/O device(s) 3076, are also connected to the processor(s) 3071 through the interconnect 3073 The network adapter 3074 provides the processing system 3070 with the ability to communicate with remote devices over a network and may be, for example, an Ethernet adapter or Fibre Channel adapter. The network adapter 3074 may also provide the processing system 3070 with the ability to communicate with other computers within the cluster. In some embodiments, the processing system 3070 may use more than one network adapter to deal with the communications within and outside of the cluster separately.

The I/O device(s) 3076 can include, for example, a keyboard, a mouse or other pointing device, disk drives, printers, a scanner, and other input and/or output devices, including a display device. The I/O device(s) 3076 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 3072 may be implemented as software and/or firmware to program the processor(s) 3071 to carry out actions described herein. In certain embodiments, such software or firmware may be initially provided to the processing system 3070 by downloading from a remote system through the processing system 3070 (e.g., via network adapter 3074).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 3075 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include for example programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus, comprising:
a first optic comprising a plurality of first optic regions;
a see-through display comprising a plurality of display regions;
a second optic comprising a plurality of second optic regions;
an environment sensor adapted to sense a distance to an environment external to said apparatus along a target path;
wherein:
said first optic regions, said display regions, and said second optic regions correspond such that if said target path is oriented through a target display region of said display regions, said target path is also oriented through a corresponding target first optic region of said first optic regions and a corresponding target second optic region of said second optic regions;

said first optic is adapted to receive optical environment content from said environment in said first optic regions and deliver said optical environment content to said see-through display correspondingly in said display regions;

said see-through display is adapted to receive said optical environment content from said first optic in said display regions and deliver said optical environment content to said second optic correspondingly in said second optic regions, and to deliver optical display content in said display regions to said second optic correspondingly in said second optic regions;

said second optic is adapted to receive said optical environment content and said optical display content from said see-through display in said second optic regions and deliver said optical environment content and said optical display content to an optical content receiver;

said first optic is adapted to alter a focal vergence of said optical environment content in said first optic regions; and said second optic is adapted to alter said focal vergence of said optical environment content and to alter a focal vergence of said optical display content in said second optic regions; and such that said focal vergence of said optical display content as delivered to said optical content receiver by said second optic and said focal vergence of said optical environment content as delivered to said optical content receiver by said second optic are alterable substantially independently of one another.

2. The apparatus of claim 1, wherein:

said first optic is adapted to alter said focal vergence of said optical environment content in said first optic regions substantially independently among said first optic regions; and said second optic is adapted to alter said focal vergence of said optical environment content and to alter said focal vergence of said optical display content in said second optic regions substantially independently among said second optic regions; and such that said focal vergence of said optical display content and said optical environment content as delivered by said second optic regions to said optical content receiver are alterable substantially independently among said second optic regions.

3. The apparatus of claim 2, wherein:

said first optic is adapted to alter said focal vergence of said optical environment content in all of said first optic regions substantially concurrently;

said second optic is adapted to alter said focal vergence of said optical environment content and to alter said focal vergence of said optical display content in all of said second optic regions substantially concurrently; and such that said focal vergence of said optical display content and said optical environment content as delivered by said second optic regions to said optical content receiver are alterable substantially independently among said second optic regions for all said second optic regions substantially concurrently.

4. The apparatus of claim 2, comprising:
a receiver sensor adapted to sense an orientation of a sight path of the optical content receiver;
wherein:
said first optic is adapted to alter said focal vergence of said optical environment content substantially exclusively in one of said first optic regions along said sight path; and
said second optic is adapted to alter said focal vergence of said optical environment content and to alter said focal vergence of said optical display content substantially exclusively in one of said second optic regions along said sight path; and
such that said focal vergence of said optical display content and said optical environment content as delivered by said second optic regions to said optical content receiver are alterable substantially exclusively in said one of said second optic regions along said sight path.

5. The apparatus of claim 2, comprising:
a receiver sensor adapted to sense an orientation of a sight path of the optical content receiver;
wherein:
said first optic is adapted to alter said focal vergence of said optical environment content in a plurality of said first optic regions comprising one of said first optic regions along said sight path; and
said second optic is adapted to alter said focal vergence of said optical environment content and to alter said focal vergence of said optical display content in a plurality of said second optic regions comprising one of said second optic regions along said sight path; and
such that said focal vergence of said optical display content and said optical environment content as delivered by said second optic regions to said optical content receiver are alterable for a plurality of said second optic regions comprising said one of said second optic regions along said sight path.

6. The apparatus of claim 2, wherein:
for at least one of said second optic regions, said first optic and said second optic are adapted such that:
said focal vergence of said optical environment content as delivered by said second optic regions after alteration by both said first and second optics is substantially equal to said focal vergence of said optical environment content as received by said first optic regions before alteration by either said first or second optics; and
said focal vergence of said optical display content as delivered by said second optic regions after alteration by said second optic is substantially equal to said focal vergence of said optical environment content as delivered by said second optic regions after alteration by both said first and second optics.

7. The apparatus of claim 2, wherein:
said first optic is adapted to alter said focal vergence of said optical environment content in at least one of said first optic regions along a display path from said optical content receiver to said optical display content; and
said second optic is adapted to alter said focal vergence of said optical environment content and to alter said focal vergence of said optical display content as delivered by at least one of said second optic regions along said display path.

8. The apparatus of claim 2, wherein:
said first optic is adapted to alter said focal vergence of said optical environment content in at least one of said first optic regions along an interaction path from said optical content receiver to an interaction entity external to said apparatus; and
said second optic is adapted to alter said focal vergence of said optical environment content and to alter said focal vergence of said optical display content as delivered by at least one of said second optic regions along said interaction path.

9. The apparatus of claim 1, comprising:
a see-through modifier comprising a plurality of modifier regions;
wherein:
said see-through modifier is adapted to receive optical environment content from said environment in said modifier regions and deliver said optical environment content to said optical content receiver; and
said see-through modifier is adapted to apply a modification to an optical property of said optical environment content in said modifier regions, substantially independently among said modifier regions.

10. The apparatus of claim 9, wherein:
said display regions and said modifier regions correspond such that when said target path is oriented toward said target display region of said display regions, said target path is also oriented toward a corresponding target modifier region of said modifier regions.

11. The apparatus of claim 9, wherein:
said modification comprises at least one of a darkening, a change in opacity, a lightening, and a color change applied to said optical environment content.

12. The apparatus of claim 9, wherein:
said see-through modifier is adapted to apply said modification substantially independently among said modifier regions responsive to said optical display content in said display regions corresponding with said modifier regions.

13. The apparatus of claim 9, comprising:
a receiver sensor adapted to sense an orientation of a sight path of said optical content receiver; and
wherein said see-through modifier is adapted to apply said modification substantially independently among said modifier regions responsive to whether said sight path is oriented toward said modifier regions.

14. The apparatus of claim 9, comprising:
an environment sensor adapted to sense a distance to an environment external to said apparatus along said target path, and to determine an initial status of said optical property of said optical environment content; and
wherein said see-through modifier is adapted to apply said modification substantially independently among said modifier regions responsive to said initial status of said optical property of said optical environment content in said modifier regions.

15. The apparatus of claim 9, comprising:
an interaction sensor adapted to sense an interaction with said optical display content; and
wherein said see-through modifier is adapted to apply said modification substantially independently among said modifier regions responsive to whether said interaction with said optical display content is present in said optical display regions.

16. The apparatus of claim 9 wherein said see-through display is adapted to apply an alteration to a display property of said optical display content in said display regions, substantially independently among said display regions.

17. The apparatus of claim 1, wherein:
said see-through display is adapted to apply an alteration to a display property of said optical display content in said display regions, substantially independently among said display regions.

18. The apparatus of claim 17, comprising:
a receiver sensor adapted to sense an orientation of a sight path of said optical content receiver; and
wherein said display is adapted to apply said alteration substantially independently among said display regions responsive to whether said sight path is oriented toward said display regions.

19. The apparatus of claim 17, comprising:
an environment sensor adapted to sense a status of an optical property of said optical environment content; and
wherein said see-through display is adapted to apply said alteration substantially independently among said display regions responsive to said status of said optical property of said optical environment content in said display regions.

20. The apparatus of claim 17, comprising:
an interaction sensor adapted to sense an interaction with said optical display content; and
wherein said see-through display is adapted to apply said alteration substantially independently among said display regions responsive to whether said interaction with said optical display content is present in said optical display regions.

21. A method, comprising:
determining a distance from an optical content receiver to an environment along a target path;
receiving optical environment content in a target first optic region of a plurality of first optic regions of a first optic along said target path;
altering a focal vergence of said optical environment content in a target first region of said first optic substantially independently of a remainder of said first optic regions, and delivering said optical environment content from said first optic to a see-through display;
receiving said optical environment content in a target display region of a plurality of display regions of said see-through display along said target path, and delivering optical display content and said optical environment content from said see-through display to a second optic;
receiving said optical environment content and said optical display content in a target second region of a plurality of second optic regions of said second optic along said target path; and
altering said focal vergence of said optical environment content and a focal vergence of said optical display content in said target second region of said second optic substantially independently of a remainder of said second optic regions, and delivering said optical environment content and said optical display content to said optical content receiver along said target path;
wherein:
said focal vergence of said optical display content as delivered by said second optic along said target path after alteration by said second optic is alterable substantially independently of said focal vergence of said optical environment content as delivered by said second optic along said target path after alteration by both said first and second optics; and
said focal vergence of said optical display content and said focal vergence of said optical environment content as delivered by said second optic along said target path are alterable for said target second optic region substantially independently of said remainder of said second optic regions.

22. The method of claim 21, comprising:
receiving optical environment content in a target modifier region of a plurality of modifier regions of a modifier along said target path;
applying a modification to an optical property of said optical environment content in said target modifier region, substantially independently among said modifier regions; and
receiving said optical environment content in said target display region of said plurality of display regions of said see-through display along said target path from said modifier.

23. The method of claim 21, wherein:
said see-through display is adapted to apply an alteration to a display property of said optical display content in said display regions, substantially independently among said display regions.

24. The method of claim 21, wherein:
said see-through display is adapted to apply an alteration to a display property of said optical display content in said display regions, substantially independently among said display regions.

25. An apparatus, comprising:
means for determining a distance from an optical content receiver to an environment along a target path;
means for receiving optical environment content in a target first optic region of a plurality of first optic regions of a first optic along said target path;
means for altering a focal vergence of said optical environment content in a target first region of said first optic substantially independently of a remainder of said first optic regions, and delivering said optical environment content from said first optic to a see-through display;
means for receiving said optical environment content in a target display region of a plurality of display regions of said see-through display along said target path, and delivering optical display content and said optical environment content from said see-through display to a second optic;
means for receiving said optical environment content and said optical display content in a target second region of a plurality of second optic regions of said second optic along said target path; and
means for altering said focal vergence of said optical environment content and a focal vergence of said optical display content in said target second region of said second optic substantially independently of a remainder of said second optic regions, and delivering said optical environment content and said optical display content to said optical content receiver along said target path;
wherein:
said focal vergence of said optical display content as delivered by said second optic along said target path after alteration by said second optic is alterable substantially independently of said focal vergence of said optical environment content as delivered by said second optic along said target path after alteration by both said first and second optics; and
said focal vergence of said optical display content and said focal vergence of said optical environment content as delivered by said second optic along said target path are alterable for said target second optic region substantially independently of said remainder of said second optic regions.

26. The apparatus of claim 25, comprising:

means for receiving optical environment content in a target modifier region of a plurality of modifier regions of a modifier along said target path; and means for applying a modification to an optical property of said optical environment content in said target modifier region, substantially independently among said modifier regions.

27. The apparatus of claim 25, comprising:

means for applying an alteration to an optical property of said optical display content in said target display region, substantially independently among said display regions.

28. The apparatus of claim 25, comprising:

means for applying an alteration to an optical property of said optical display content in said target display region, substantially independently among said display regions.

* * * * *